United States Patent
Takagi et al.

(10) Patent No.: US 9,223,137 B2
(45) Date of Patent: Dec. 29, 2015

(54) VIRTUAL IMAGE DISPLAY APPARATUS

(75) Inventors: Masayuki Takagi, Shiojiro (JP); Toshiaki Miyao, Matsumoto (JP); Takahiro Totani, Suwa (JP); Akira Komatsu, Kamiina-gun (JP); Takashi Takeda, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 179 days.

(21) Appl. No.: 13/252,564

(22) Filed: Oct. 4, 2011

(65) Prior Publication Data

US 2012/0086623 A1 Apr. 12, 2012

(30) Foreign Application Priority Data

Oct. 8, 2010 (JP) ................................. 2010-228183
Aug. 10, 2011 (JP) ................................. 2011-174638

(51) Int. Cl.
G09G 5/00 (2006.01)
G02B 27/01 (2006.01)
G02B 27/22 (2006.01)
F21V 8/00 (2006.01)

(52) U.S. Cl.
CPC .......... G02B 27/0172 (2013.01); G02B 6/0053 (2013.01); G02B 27/2214 (2013.01); G02B 6/002 (2013.01); G02B 6/0045 (2013.01); G02B 6/0055 (2013.01); G02B 2027/0121 (2013.01); G02B 2027/0178 (2013.01)

(58) Field of Classification Search
None
See application file for complete search history.

(56) References Cited

U.S. PATENT DOCUMENTS

| | | | |
|---|---|---|---|
| 7,778,508 B2 | 8/2010 | Hirayama | |
| 8,403,490 B2* | 3/2013 | Sugiyama et al. | 353/28 |
| 2003/0086135 A1* | 5/2003 | Takeyama | 359/13 |
| 2003/0165017 A1 | 9/2003 | Amitai | |
| 2004/0085649 A1 | 5/2004 | Repetto et al. | |
| 2007/0064294 A1 | 3/2007 | Hoshino et al. | |
| 2010/0027289 A1 | 2/2010 | Aiki et al. | |
| 2010/0039796 A1 | 2/2010 | Mukawa | |
| 2010/0245211 A1 | 9/2010 | Iba et al. | |
| 2011/0164294 A1* | 7/2011 | Shimizu | 359/13 |
| 2012/0287675 A1 | 11/2012 | Mukawa | |
| 2014/0078591 A1 | 3/2014 | Mukawa | |

FOREIGN PATENT DOCUMENTS

| | | |
|---|---|---|
| CN | 1795403 A | 6/2006 |
| EP | 1 385 023 A1 | 1/2004 |
| JP | H07-318729 A | 12/1995 |

(Continued)

*Primary Examiner* — Nicholas Lee
*Assistant Examiner* — Duane N Taylor, Jr.
(74) *Attorney, Agent, or Firm* — Oliff PLC

(57) ABSTRACT

An advantage of some aspects of the invention is to provide a virtual image display apparatus in which occurrence of luminance spots is suppressed to improve efficiency of use of illumination light. In the virtual image display apparatus of the invention, an optical-directivity changing section forms a non-uniform distribution concerning the directivity of image lights GL emitted from an image display device. Therefore, even when an angle of a light beam emitted from the image display device and effectively captured into the eye EY of an observer is substantially different depending on a position of the image display device, it is possible to form the image lights GL having directivity corresponding to such an angle characteristic of light beam capturing. It is possible to suppress occurrence of luminance spots to improve efficiency of use of illumination light.

21 Claims, 25 Drawing Sheets

(56) References Cited

FOREIGN PATENT DOCUMENTS

| JP | A-2003-536102 | 12/2003 |
| JP | A-2004-157520 | 6/2004 |
| JP | 2005-302458 A | 10/2005 |
| JP | A-2005-309125 | 11/2005 |
| JP | A-2007-012530 | 1/2007 |
| JP | A-2007-079297 | 3/2007 |
| JP | 2010-044172 A | 2/2010 |
| JP | A-2010-039086 | 2/2010 |
| JP | A-2010-044326 | 2/2010 |
| JP | 2010-152370 A | 7/2010 |
| JP | 2010-224473 A | 10/2010 |

* cited by examiner

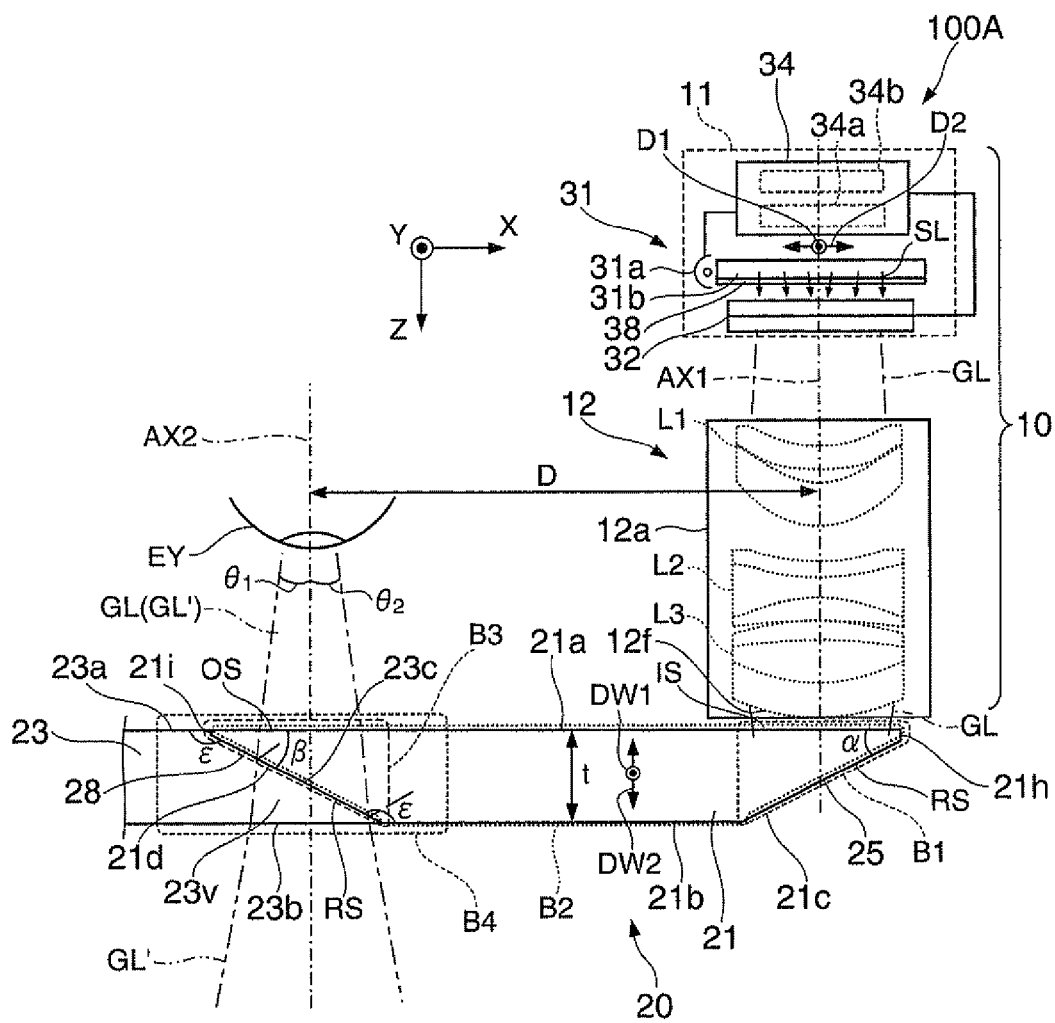
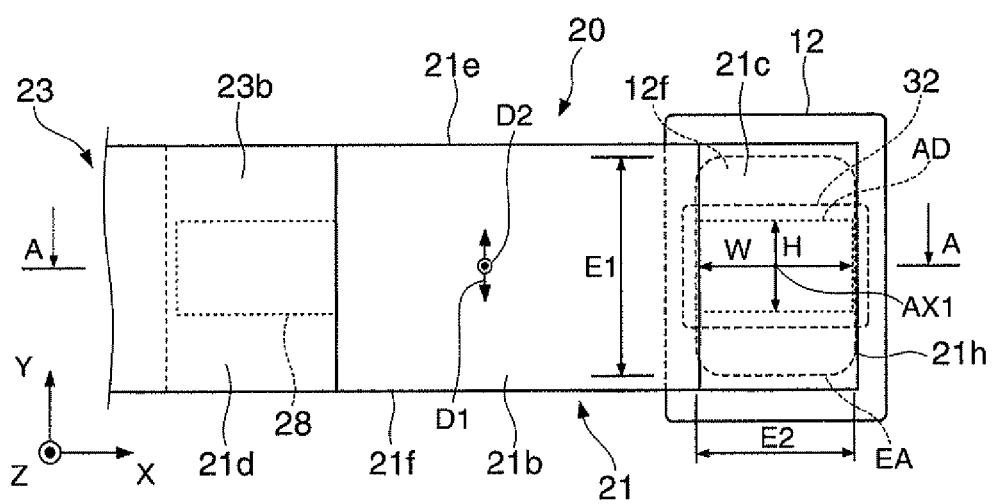
FIG. 2A
FIG. 2B

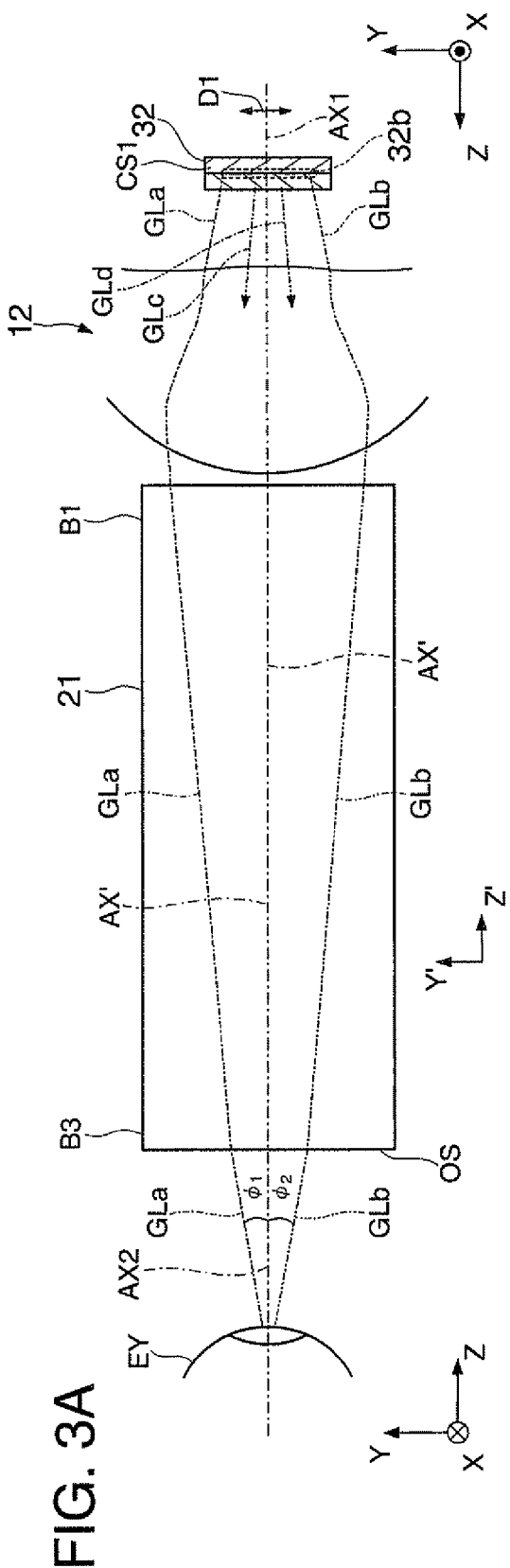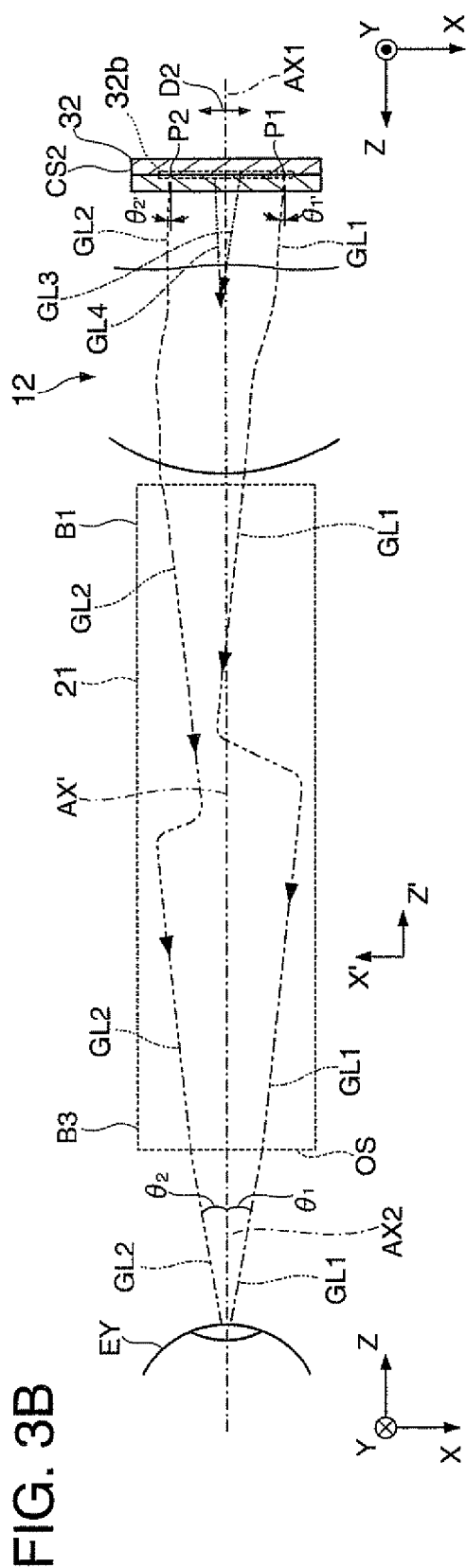

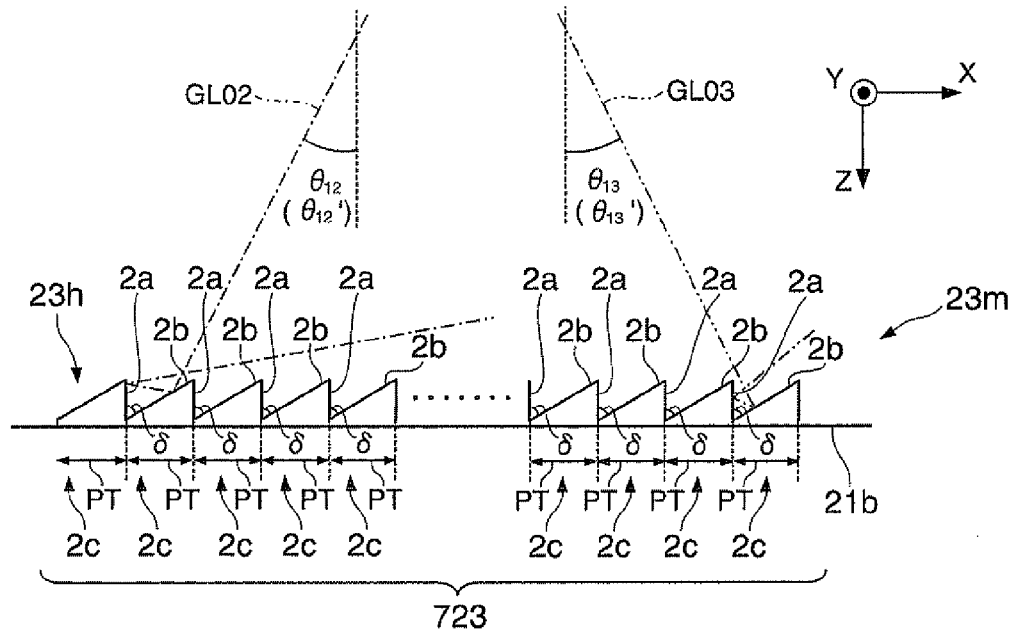
FIG. 21A
FIG. 21B
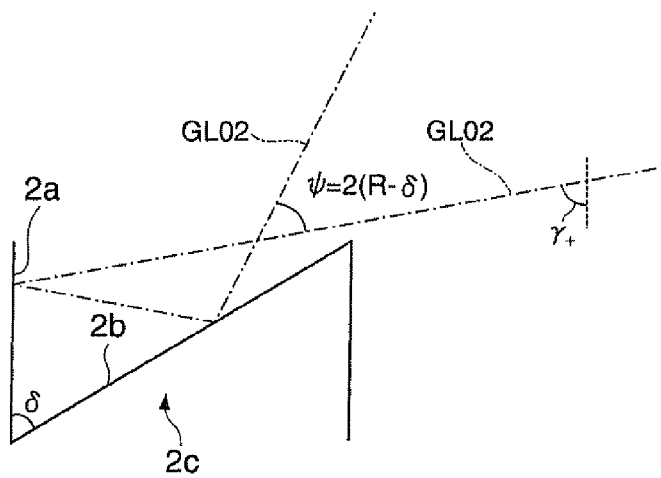
FIG. 21C
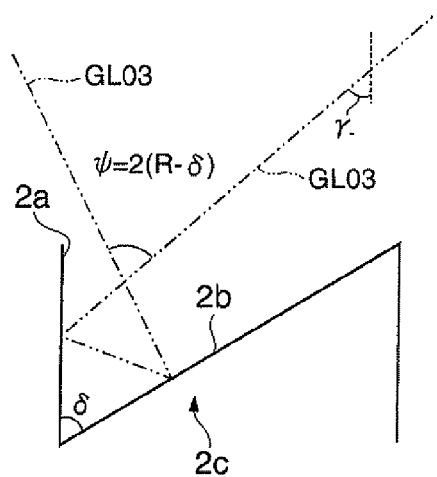

VIRTUAL IMAGE DISPLAY APPARATUS

BACKGROUND

1. Technical Field

The present invention relates to a virtual image display apparatus such as a head-mounted display worn on the head and used.

2. Related Art

In recent years, as a virtual image display apparatus that enables formation and observation of a virtual image such as a head-mounted display, various virtual image display apparatuses of a type for guiding video light from a display element to the pupils of an observer with a light guide plate are proposed. As the light guide plate for such virtual image display apparatuses, there is known a light guide plate that guides video light making use of total reflection and reflects the video light on plural partial reflection surfaces arranged in parallel to one another at a predetermined angle with respect to a principal plane of the light guide plate and extracts the video light to the outside from the light guide plate to thereby cause the video light to reach the retinas of the observer (see JP-T-2003-536102 (the term "JP-T" as used herein means a published Japanese translation of a PCT application) and JP-A-2004-157520).

In the virtual image display apparatus explained above, for example, light beams from upper and lower ends of a longitudinal cross-section of the display element need to be made incident on the pupils of the observer at a large tilt angle corresponding to an angle of view. The light beams are emitted from the display element at a relatively large tilt angle. A light beam from the center of the display element is made incident on the pupils of the observer without being tilted from the front. Therefore, the light beam is emitted in the front direction from the display element. When the display element is obtained by combining, for example, an illuminating device and a liquid crystal panel, in general, a distribution of light of the illuminating device is substantially uniform in a screen having an intensity peak in a direction perpendicular to the liquid crystal panel. Therefore, even if luminance is high in the center of an image where the tilt of illumination light is small, luminance falls at upper and lower ends of the image where the tilt of the illumination light increases. This causes luminance spots of the image. In this case, the illumination light is not effectively utilized at upper and lower ends of the screen. It can be said that efficiency of use of the illumination light falls.

On the other hand, concerning a light beam from a lateral cross-section of the display element, an angle direction in which the light beam is captured by the light guide plate and used for display substantially tilts from the front direction of the display element according to a lateral position of the light beam. Therefore, a phenomenon could occur in which, even if luminance is high in a lateral position where the tilt of the illumination light is small, luminance falls in another lateral position where the tilt of the illumination light increases. In this case, the illumination light is not efficiently used and belt-like luminance spots extending in the longitudinal direction occur.

SUMMARY

An advantage of some aspects of the invention is to provide a virtual image display apparatus in which occurrence of luminance spots is suppressed to improve efficiency of use of illumination light.

According to an aspect of the invention, a virtual image display apparatus includes: (a) an image display device that forms image light; (b) a projection optical system that forms a virtual image with the image light emitted from the image display device; (c) a light guide device including a light incident section that captures the image light passed through the projection optical system into the inside of the light incident section, a light guide section that guides the image light captured from the light incident section using total reflection on first and second reflection surfaces extending while being opposed to each other, and a light emitting section that extracts the image light passed through the light guide section to the outside; and (d) an optical-directivity changing section that changes the directivity of the image light emitted from the image display device and forms a non-uniform distribution. The directivity of the image light means that the luminance center of the image light emitted from the image display device deviates to a specific direction (specifically, a specific tilt angle and a specific azimuth).

In the virtual image display apparatus, the optical-directivity changing section forms a non-uniform distribution concerning the directivity of the image light emitted from the image display device. Therefore, even when an angle of a light beam emitted from the image display device and effectively captured into the eye of an observer is substantially different depending on a position of the image display device, it is possible to form image light having directivity corresponding to such an angle characteristic of light beam capturing. It is possible to suppress occurrence of luminance spots to improve efficiency of use of illumination light. The angle characteristic of light beam capturing occurs depending on, for example, specifications of the projection optical system and the light guide device. For example, the tilt tends to be larger on a peripheral side than a center side of a display area of the image display device or larger on the center side than the peripheral side of the display area.

In a specific aspect of the invention, in the virtual image display apparatus, the optical-directivity changing section bends, concerning a first direction, light at a different angle according to a position of the image display device. In this case, an angle characteristic of the light can be adjusted according to bending of the illumination light and the image light corresponding to the position in the first direction. Even if, in the angle characteristic of light beam capturing, the tilt locally increases in a cross-section in the first direction, it is possible to suppress luminance spots to improve light use efficiency.

In another aspect of the invention, the optical-directivity changing section bends, concerning a second direction perpendicular to the first direction, light at a different angle according to the position of the image display device. In this case, an angle characteristic of the light can be adjusted according to bending of the illumination light and the image light corresponding to the position in the second direction. Even if, in the angle characteristic of light beam capturing, the tilt locally increases in a cross-section in the second direction, it is possible to suppress luminance spots to improve light use efficiency.

In still another aspect of the invention, in the optical-directivity changing section, a light distribution characteristic, which is an angle distribution of directivity, is different concerning the first direction and the second direction. In some case, the angle characteristic of light beam capturing is different in the first direction and the second direction (e.g., the longitudinal direction and the lateral direction) because of, for example, the structure of the light guide section. Even in such a case, it is possible to suppress occurrence of luminance spots over the entire screen.

In still another aspect of the invention, the image display device includes an illuminating device and an image-light forming section that controls light from the illuminating device and forms image light.

In still another aspect of the invention, the illuminating device includes a light emitting section and a backlight guide section that spreads a light beam from the light emitting section in a surface light source shape. The optical-directivity changing section is arranged between the backlight guide section and the image-light forming section. In this case, even if a light distribution characteristic of the illumination light emitted from a light emission surface of the backlight guide section is uniform, a light distribution characteristic of the illumination light made incident on the image-light forming section can be adjusted to a desired state by the optical-directivity changing section. It is possible to set the directivity of the image light emitted from the image display device to directivity corresponding to the angle characteristic of light beam capturing.

In still another aspect of the invention, the illuminating device includes a surface-light-source-like light emitting section. The optical-directivity changing section is arranged between the surface-light-source-like light emitting section and the image-light forming section. In this case, even if a light distribution characteristic of the illumination light emitted from the surface-light-source-like light emitting section is uniform, a light distribution characteristic of the illumination light made incident on the image-light forming section can be adjusted to a desired state by the optical-directivity changing section. It is possible to set the directivity of the image light emitted from the image display device to directivity corresponding to the angle characteristic of light beam capturing.

In still another aspect of the invention, the optical-directivity changing section is at least one of a prism array sheet, a Fresnel lens, a diffractive optical element, and a micro lens array.

In still another aspect of the invention, the optical-directivity changing section is bonded to the backlight guide section or the surface-light-source-like light emitting section and integrated with the backlight guide section or the surface-light-source-like light emitting section. In this case, it is easy to assemble the optical-directivity changing section in the image display device.

In still another aspect of the invention, the optical-directivity changing section includes plural area sections for causing illumination light from the backlight guide section or the surface-light-source-like light emitting section to pass such that main directivity directions having highest luminance are different from each other. In this case, it is possible to set a light distribution characteristic of the illumination light to an appropriate state for each of the plural area sections.

In still another aspect of the invention, the optical-directivity changing section includes a prism array having different shapes to correspond to the plural area sections. In this case, it is possible to adjust the light distribution characteristic of the illumination light to a target light distribution characteristic by adjusting a wedge angle of prism elements included in the prism array in the area sections.

In still another aspect of the invention, the first direction corresponds to a returning direction perpendicular to the first and second reflection surfaces of the light guide device and the second direction corresponds to a non-returning direction parallel to the first and second reflection surfaces of the light guide device and perpendicular to the first direction. In at least one of the first direction and the second direction, plural peak directions in which luminance is the maximum are set.

In still another aspect of the invention, in the second direction, plural peak directions in which luminance is the maximum are set. Concerning the second direction corresponding to the non-returning direction of the light guide device, a tilt angle of the image light captured on the peripheral side of the display area of the image display device does not uniformly tend to be larger than that on the center side of the display area of the image display device and a tile angle of the image light captured in positions in the second direction non-uniformly changes. Therefore, it is possible to reduce luminance spots by adjusting the directivity of the image light concerning the second direction.

In still another aspect of the invention, the optical-directivity changing section is incorporated in or externally attached to the image-light forming section.

In still another aspect of the invention, the image-light forming section is an EL display element and the optical-directivity changing section is arranged, for example, near a light emission side of a pixel portion of the EL display element.

In still another aspect of the invention, the image-light forming section is a liquid crystal display element of a light-transmissive type and the optical-directivity changing section is arranged, for example, near at least one of a light incident side and a light emission side of a pixel portion of the liquid crystal display element. In this case, even if a light distribution characteristic of the illumination light emitted from the light emission surface of the backlight guide section is uniform, the direction of the illumination light made incident on the image-light forming section and the direction of the image light emitted from the image-light forming section can be adjusted by the optical-directivity changing section. In other words, it is possible to set the directivity of the image light emitted from the image display device to directivity corresponding to the angle characteristic of light beam capturing.

In still another aspect of the invention, the light guide section has a first reflection surface and a second reflection surface that are arranged in parallel to each other and enable light guide by total reflection. The light incident section has a third reflection surface formed at a predetermined angle with respect to the first reflection surface. The light emitting section has a fourth reflection surface formed at a predetermined angle with respect to the first reflection surface. In this case, the image light reflected on the third reflection surface of the light incident section is propagated while being totally reflected on the first and second reflection surfaces of the light guide section and is reflected on the fourth reflection surface of the light emitting section and made incident on the eye of the observer, as a virtual image.

In still another aspect of the invention, the light emitting section includes an angle converting section that has plural reflection surfaces and converts an angle of the image light through reflection on the plural reflection surfaces to enable the image light to be extracted to the outside. In this case, it is possible to divide a light beam from the thin light guide section and extract the light beam in an appropriate direction.

In still another aspect of the invention, the angle converting section includes plural reflection units that respectively have first reflection surfaces and second reflection surfaces formed at a predetermined angle with respect to the first reflection surfaces and are arrayed in a predetermined array direction. The reflection units reflect, with the first reflection surfaces, the image light made incident through the light guide section and further reflect, with the second reflection surfaces, the image light reflected by the first reflection surfaces to thereby bend an optical path of the image light and enable the image light to be extracted to the outside. In this case, the image light having a large reflection angle propagated through the light guide section can be extracted on the depth side of the angle converting section and the image light having a small reflection angle propagated through the light guide section can be extracted on the entrance side of the angle converting section. Therefore, it is possible to display a high-quality image in which a luminance fall and luminance spots due to the angle converting section are surely suppressed.

BRIEF DESCRIPTION OF THE DRAWINGS

The invention will be described with reference to the accompanying drawings, wherein like numbers reference like elements.

FIG. 2A is a plan view of a main body section of a first display device included in the virtual image display apparatus.

FIG. 2B is a front view of the main body section.

FIG. 3A is an exploded conceptual diagram of an optical path concerning a longitudinal first direction.

FIG. 3B is an exploded conceptual diagram of an optical path concerning a lateral second direction.

FIGS. 21A to 21C are schematic diagrams for explaining the structure of an angle converting section and an optical path of image light in the angle converting section.

DESCRIPTION OF EXEMPLARY EMBODIMENTS

First Embodiment

A virtual image display apparatus according to an embodiment of the invention is explained in detail below with reference to the accompanying drawings.

A. External View of the Virtual Image Display Apparatus

Figure 1:
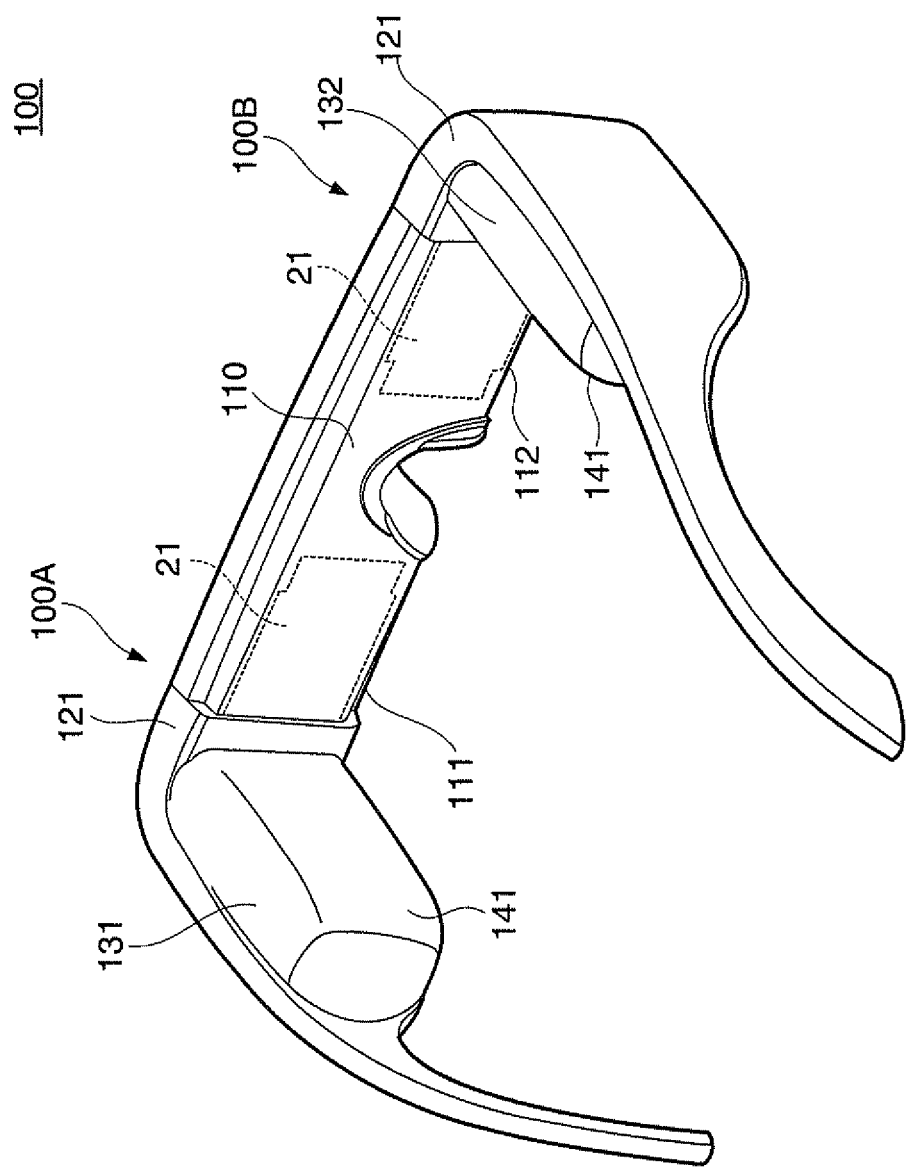
FIG. 1 is a perspective view showing a virtual image display apparatus according to a first embodiment.

A virtual image display apparatus 100 according to a first embodiment shown in FIG. 1 is a head-mounted display having an external appearance like eyeglasses. The virtual image display apparatus 100 can cause an observer wearing the virtual image display apparatus 100 to recognize image light by a virtual image and cause the observer to observe an external view seeing through the virtual image display apparatus 100. The virtual image display apparatus 100 includes an optical panel 110 that covers the front of the eye of the observer, a frame 121 that supports the optical panel 110, and first and second driving sections 131 and 132 added to a section extending from an armor to a temple of the frame 121. The optical panel 110 includes a first panel section 111 and a second panel section 112. Both the panel sections 111 and 112 are tabular components integrally coupled in the center thereof. A first display device 100A obtained by combining the first panel section 111 and the first driving section 131 on the left side on the drawing is a section that forms a virtual image for the left eye. The first display device 100A independently functions as a virtual image display apparatus as well. A second display device 100B obtained by combining the second panel section 112 and the second driving section 132 on the right side on the drawing is a section that forms a virtual image for the right eye. The second display device 100B independently functions as a virtual image display apparatus as well. The first driving section 131 and the second driving section 132 are individually housed in cases 141 for light blocking and protection.

B. Structure of the Display Device

As shown in FIG. 2A and the like, the first display device 100A includes an image forming device 10 and a light guide device 20. The image forming device 10 is equivalent to the first driving section 131 in FIG. 1. The light guide device 20 is equivalent to the first panel section 111 in FIG. 1. Concerning the image forming device 10, a main part section excluding the case 141 in FIG. 1 is shown. In FIG. 2A, the section of the light guide device 20 is an A-A arrow sectional view of FIG. 2B. The second display device 100B shown in FIG. 1 has a structure same as the structure of the first display device 100A and is obtained by simply reversing the left and the right. Therefore, detailed explanation of the second display device 100B is omitted.

The image forming device 10 includes an image display device 11, a projection optical system 12, and an optical-directivity changing section 38. The image display device 11 includes an illuminating device 31 that emits two-dimensional illumination lights SL, a liquid crystal display device (a liquid crystal display element) 32, which is a transmissive image-light forming section, and a driving control section 34 that controls the operations of the illuminating device 31 and the liquid crystal display device 32.

The illuminating device 31 includes a light source 31a, which is a light emitting section that generates light including three colors of red, green, and blue, and a backlight guide section 31b that diffuses the light from the light source 31a and changes the light to a light beam having a two-dimensional spread of a rectangular section. The liquid crystal display device (the image-light forming section) 32 spatially modulates the illumination lights SL from the illuminating device 31 and forms image light that should be a display target such as a moving image. The driving control section 34 includes a light-source driving circuit 34a and a liquid crystal driving circuit 34b. The light source driving circuit 34a supplies electric power to the light source (the light emitting section) 31a of the illuminating device 31 and causes the light source 31a to emit the illumination lights SL having stable luminance. The liquid crystal driving circuit 34b outputs an image signal or a driving signal to the liquid crystal display device (the image-light forming section) 32 to thereby form, as a transmittance pattern, color image light that is a source of a moving image or a still image. An image processing function can be imparted to the liquid crystal driving circuit 34b. However, the image processing function can be imparted to an externally-attached control circuit as well.

The optical-directivity changing section 38 is arranged between the illuminating device 31 and the liquid crystal display device 32. The optical-directivity changing section 38 is a deflecting element for correcting an angle distribution or a light distribution characteristic of the directivity of illumination light emitted from the illuminating device 31 to an appropriate angle distribution or an appropriate light distribution characteristic that takes into account efficiency of use. The optical-directivity changing section (the deflecting element) 38 adjusts the directivity of image light emitted from the liquid crystal display device 32 to directivity corresponding to an effective emission angle range (an angle characteristic of light beam capturing explained later) in which the image light emitted from the liquid crystal display device 32 is resultantly made incident on an eye EY of the observer.

In the liquid crystal device 32, a first direction D1 corresponds to a direction in which a longitudinal cross-section including a first optical axis AX1 passing through the projection optical system 12 and a specific line parallel to a third reflection surface 21c of a light guide member 21 explained later extends. A second direction D2 corresponds to a direction in which a lateral cross-section including the first optical axis AX1 and the normal of the third reflection surface 21c extends. In other words, the first direction D1 is a direction parallel to a line of intersection of a first reflection surface 21a and the third reflection surface 21c of the light guide member 21. The second direction D2 is a direction parallel to a plane of the first reflection surface 21a and perpendicular to the line of intersection of the first reflection surface 21a and the third reflection surface 21c. In short, in a position of the liquid crystal display device 32, the first direction D1 is equivalent to a longitudinal Y direction and the second direction D2 is equivalent to a lateral X direction. An effective size H in the longitudinal first direction D1 of the liquid crystal display device 32 is smaller than an effective size W in the lateral second direction D2 of the liquid crystal display device 32 (see FIG. 2B). In other words, an image forming area AD of the liquid crystal display device 32 is laterally long. The first direction D1 is parallel to the Y direction in both of the image forming device 10 and the light guide member 21 explained later and corresponds to a non-returning direction or a non-confining direction DW2 of the light guide member 21. The second direction D2 is parallel to the X direction in the image forming device 10 but is parallel to a Z direction in the light guide member 21 explained later and corresponds to a returning direction or a confining direction DW1.

The projection optical system 12 is a collimate lens that changes image light emitted from respective points on the liquid crystal display device 32 to a light beam in a parallel state. The projection optical system 12 includes, for example, lens groups L1 to L3. A lens barrel 12a that supports the lens groups L1 to L2 around the same is housed in the case 141 shown in FIG. 1. Optical surfaces of lenses included in the lens groups L1 to L3 have a spherical or aspherical shape rotationally symmetrical around the first optical axis AX1. A focusing property in the first direction D1 and a focusing property in the second direction D2 are equal. An optical surface 12f of the lens group L3 is exposed in an emission aperture EA at the end of a light emission side of the lens barrel 12a that houses the lens groups L1 to L3. Emission aperture width E1 in the first direction D1 of the emission aperture EA is larger than emission aperture width E2 in the second direction D2 of the emission aperture EA (see FIG. 2B). This is because of a difference between longitudinal and lateral optical paths explained in detail later and because, concerning the longitudinal first direction D1, i.e., the Y direction, image light GL needs to be made incident on the light guide device 20 at relatively large light beam width and, concerning the lateral second direction D2, the image light GL needs to be made incident on the light guide device 20 at relatively small light beam width.

The light guide device 20 is obtained by bonding the light guide member 21 and a light transmission member 23. The light guide device 20 configures a tabular optical member extending in parallel to an XY plane as a whole.

In the light guide device 20, the light guide member 21 is a prism-like member having a trapezoidal shape in plan view. The light guide member 21 has, as sides, the first reflection surface 21a, a second reflection surface 21b, the third reflection surface 21c, and a fourth reflection surface 21d. The light guide member 21 has an upper surface 21e and a lower surface 21f adjacent to the first, second, third, and fourth reflection surfaces 21a, 21b, 21c, and 21d and opposed to each other. The first and second reflection surfaces 21a and 21b extend along the XY plane and are spaced apart by thickness t of the light guide member 21. The third reflection surface 21c tilts at an acute angle α equal to or smaller than 45° with respect to the XY plane. The fourth reflection surface 21d tilts at an acute angle β equal to or smaller than, for example, 45° with respect to the XY plane. The first optical axis AX1 passing through the third reflection surface 21c and a second optical axis AX2 passing through the fourth reflection surface 21d are arranged in parallel and spaced apart by a distance D. An end face 21h is provided to remove a ridge between the first reflection surface 21a and the third reflection surface 21c. An end face 21i is provided to remove a ridge between the first reflection surface 21a and the fourth reflection surface 21d. The light guide member 21 including the end faces 21h and 21i has an external shape of a polyhedron having eight surfaces.

The light guide member 21 performs light guide making use of total reflection by the first and second reflection surfaces 21a and 21b. In the light guide member 21, there is a direction in which light is returned by reflection in the light guide and a direction in which light is not returned by reflection in the light guide. When an image guided by the light guide member 21 is considered, the lateral direction, i.e., the confining direction DW2 in which the image is propagated while being returned by plural times of reflection in the light guide is perpendicular to the first and second reflection surfaces 21a and 21b (parallel to a Z axis) and, when an optical path is expanded to a light source side, equivalent to the second direction D2 of the liquid crystal display device 32. On the other hand, the longitudinal direction, i.e., the non-confining direction DW1 in which the image is propagated without being returned in the light guide is parallel to the first and second reflection surfaces 21a and 21b and the third reflection surface 21c (parallel to a Y axis) and, when the optical path is expanded to the light source side as explained later, equivalent to the first direction D1 of the liquid crystal display device 32. In the light guide member 21, a main light guide direction in which a propagated light beam travels as a whole is parallel to a −X direction.

The light guide member 21 is formed of a resin material showing high optical transparency in a visible range. The light guide member 21 is a block-like member integrally molded by injection molding. The light guide member 21 is formed by, for example, injecting a resin material of a thermal or optical polymerization type into a molding die and thermosetting or photo-setting the resin material. The light guide member 21 is an integral molded product in this way. However, functionally, the light guide member 21 can be considered to be divided into a light incident section B1, a light guide section B2, and a light emitting section B3.

The light incident section B1 is a triangular prism-like section and has a light incident surface IS, which is a part of the first reflection surface 21a, and the third reflection surface 21c opposed to the light incident surface IS. The light incident surface IS is a plane on the rear side or the observer side for capturing the image light GL from the image forming device 10. The light incident surface IS is opposed to the projection optical system 12 and extends perpendicularly to the first optical axis AX1. The third reflection surface 21c has a rectangular contour and has, in an entire area of the rectangle, a total reflection mirror layer 25 for reflecting the image light GL, which has passed through the light incident surface IS, and leading the image light GL into the light guide section B2. The total reflection mirror layer 25 is formed by applying film formation onto a slope RS of the light guide member 21 with vapor deposition of aluminum or the like. The third reflection surface 21c tilt at, for example, an acute angle α=25° to 27° with respect to the first optical axis AX1 of the projection optical system 12 or the XY plane. The third reflection surface 21c bends the image light GL, which is made incident from the light incident surface IS and travels in a +Z direction as a whole, to travel in a −X direction closer to a −Z direction as a whole to surely focus the image light GL in the light guide section 32.

The light guide section B2 includes, as two planes opposed to each other and extending in parallel to the XY plane, the first reflection surface 21a and the second reflection surface 21b that totally reflect the image light bent by the light incident section B1. The space between the first and second reflection surfaces 21a and 21b, i.e., the thickness t of the light guide member 21 is set to, for example, about 9 mm. It is assumed that the first reflection surface 21a is present on the rear side or the observer side close to the image forming device 10 and the second reflection surface 21b is present on the front side or the external side far from the image forming device 10. In this case, the first reflection surface 21a is a surface section common to the light incident surface IS and a light emission surface OS explained later. The first and second reflection surfaces 21a and 21b are total reflection surfaces that make use of a refractive index difference. A reflection coat such as a mirror layer is not applied to the surfaces of the first and second reflection surfaces 21a and 21b. However, to prevent damage to the surfaces and a resolution fall of a video, coating of a hard coat layer is applied. The hard coat layer is formed by forming a coat material containing resin or the like on the light guide member 21 through dipping or spray coating.

The image light GL reflected on the third reflection surface 21c of the light incident section B1 is first made incident on the first reflection surface 21a and totally reflected. Subsequently, the image light GL is made incident on the second reflection surface 21b and totally reflected. This operation is repeated, whereby the image light GL as a whole is guided in a main light guide direction on the depth side of the light guide device 20, i.e., to a −X side on which the light emitting section B3 is provided. Since a reflection coat is not applied to the first and second reflection surfaces 21a and 21b, the external light or the natural light made incident on the second reflection surface 21b from the external side passes through the light guide section B2 at high transmittance. In other words, the light guide section B2 is a see-through type through which an external image can be seen.

The light emitting section B3 is a triangular prism-like section and has a light emission surface OS, which is a part of the first reflection surface 21a, and the fourth reflection surface 21d opposed to the light emission surface OS. The light emission surface OS is a plane on the rear side for emitting the image light GL to the eye EY of the observer. Like the light incident surface IS, the light emission surface OS is a part of the first reflection surface 21a and extends perpendicularly to the second optical axis AX2. The distance D between the second optical axis AX2 passing through the light emission section B3 and the first optical axis AX1 passing through the light incident section B1 is set to, for example, 50 mm taking into account, for example, the width of the head of the observer. The fourth reflection surface 21d is a substantially rectangular flat surface for reflecting the image light GL, which is made incident through the first and second reflection surfaces 21a and 21b, and emitting the image light GL to the outside of the light emitting section B3. A half mirror layer 28 is attached to the fourth reflection surface 21d. The half mirror layer 28 is a reflection film (i.e., a semi-transparent reflection film). The half mirror layer (the semi-transparent reflection film) 28 is formed by forming a metal reflection film or a dielectric multilayer film on the slope RS of the light guide member 21. The reflectance for the image light GL of the half mirror layer 28 is set to 10% or more and 50% or less in an assumed incident angle range of the image light GL from the viewpoint of facilitating observation of external light GL' by see-through. The reflectance for the image light GL of the half mirror layer 28 in a specific example is set to, for example, 20% and the transmittance for the image light GL is set to, for example, 80%.

The fourth reflection surface 21d tilts at, for example, the acute angle α=25° to 27° with respect to the second optical axis AX2 perpendicular to the first reflection surface 21a or the XY plane. The fourth reflection surface 21d partially reflects the image light GL with the half mirror layer 28, which is made incident through the first and second reflection surfaces 21a and 21b of the light guide section B2 and bends the image light GL to travel in the −Z direction as a whole to cause the image light GL to pass through the light emission surface OS. The image light GL passed through the fourth reflection surface 21d is made incident on the light transmission member 23 and is not used for formation of a video.

The light transmission member 23 has a refractive index same as that of a main body of the light guide member 21 and has a first surface 23a, a second surface 23b, and a third surface 23c. The first and second surfaces 23a and 23b extend along the XY plane. The third surface 23c tilts with respect to the XY plane and is arranged to be opposed to and parallel to the fourth reflection surface 21d of the light guide member 21. In other words, the light transmission member 23 is a member having a wedge-like section 23v provided between the second surface 23b and the third surface 23c. Like the light guide member 21, the light transmission member is formed of a resin material showing high optical transparency in a visible range. The light transmission member 23 is a block-like member integrally molded by injection molding. The light transmission member 23 is formed by, for example, injecting a resin material of a thermal polymerization type into a molding die and thermosetting the resin material.

In the light transmission member 23, the first surface 23a is arranged on an extended plane of the first reflection surface 21a provided in the light guide member 21 and is present on the rear side close to the eye EY of the observer. The second surface 23b is arranged on an extended plane of the second reflection surface 21b provided in the light guide member 21 and is present on the front side far from the eye EY of the observer. The third surface 23c is a rectangular transmission surface bonded to the fourth reflection surface 21d of the light guide member 21 by an adhesive. An angle formed by the first surface 23a and the third surface 23c is equal to an angle ε formed by the second reflection surface 21b and the fourth reflection surface 21d of the light guide member 21. An angle formed by the second surface 23b and the third surface 23c is equal to an angle β formed by the first reflection surface 21a and the third reflection surface 21c of the light guide member 21.

The light transmission member 23 and the light guide member 21 form, in a bonded section thereof or near the bonded section, a see-through section B4 in a region opposed to the eye of the observer. In the light transmission member 23, the wedge-like section 23v provided between the second surface 23b and the third surface 23c, which form an acute angle, and spreading in the −X direction is bonded to the light emitting section B3, which is also wedge-like, to thereby form a center section with respect to the X direction in the tabular see-through section B4 as a whole. Since a reflection coat such as a mirror layer is not applied to the first and second surfaces 23a and 23b, like the light guide section B2 of the light guide member 21, the first and second surfaces 23a and 23b transmit the external light GL' at high transmittance. The third surface 23c can also transmit the external light GL' at high transmittance. However, since the fourth reflection surface 21d of the light guide member 21 includes the half mirror layer 28, the external light GL' passing through the third surface 23c is reduced by, for example, 20% in the half mirror layer 28. In other words, the observer observes, through the half mirror layer 28, light obtained by superimposing the image light GL reduced to 20% and the external light GL' reduced to 80%.

C. Overview of an Optical Path of Image Light

FIG. 3A is a diagram for explaining an optical path in the first direction D1 corresponding to a longitudinal cross-section CS1 of the liquid crystal display device (the image-light forming section) 32. On a longitudinal cross-section along the first direction D1, i.e., a YZ plane (a Y'Z' plane after expansion), in image light emitted from the liquid crystal display device 32, a component indicated by an alternate long and short dash line in the figure emitted from the upper end side (a +Y side) of a display area 32b is represented as image light GLa and a component indicated by an alternate long and two short dashes line emitted from the lower end side (a −Y side) of the display area 32b is represented as image light GLb. In FIG. 3A, for reference, image light GLc emitted from a position on an upper inner side and image light GLd emitted from a position on a lower inner side near the liquid crystal display device 32 are shown.

The image light GLa on the upper side is converted into parallel light beams by the projection optical system 12, passes through the light incident section B1, the light guide section B2, and the light emitting section B3 of the light guide member 21 substantially along an expanded optical axis AX', and is made incident on the eye EY of the observer in the parallel light beam state from an upward direction at an angle $\phi_1$ on the tilt. On the other hand, the image light GLb on the lower side is converted into parallel light beams by the projection optical system 12, passes through the light incident section B1, the light guide section B2, and the light emitting section B3 of the light guide member 21 substantially along the expanded optical axis AX', and is made incident on the eye EY of the observer in the parallel light beam state from a downward direction at an angle $\phi_2$ ($|\phi_2|=|\phi_1|$) on the tilt. The angles $\phi_1$ and $\phi_2$ are equivalent to upper and lower half angles of view and set to, for example, 6.5°.

Concerning the longitudinal direction of the first direction D1, the light guide device 20 does not substantially affect focusing by the projection optical system 12. The projection optical system 12 forms an infinite image of the liquid crystal display device 32 and makes image light corresponding to the infinite image incident on the eye EY of the observer.

FIG. 3B is a diagram for explaining an optical path in the second direction (a confining direction or a combining direction) D2 corresponding to a lateral cross-section CS2 of the liquid crystal display device (the image-light forming section) 32. On the lateral cross-section CS2 along the second direction (the confining direction or the combining direction) D2, i.e., an XZ plane (an X'Z' plane after expansion), in image light emitted from the liquid crystal display device 32, a component emitted from a first display point P1 on the right end side (a +X side) facing the display area 32b indicated by an alternate long and short dash line in the figure is represented as image light GL1 and a component emitted from a second display point P2 on the left end side (a −X side) facing the display area 32b indicated by an alternate long and two short dashes line is represented as image light GL2. In FIG. 3B, for reference, image light GL3 emitted from a position on a right inner side facing the display area 32b and image light GL4 emitted from a position on a left inner side facing the display area 32b near the liquid crystal display device 32 are added.

The image light GL1 from a first display point P1 on the right side is converted into parallel light beams by the projection optical system 12, passes through the light incident section B1, the light guide section B2, and the light emitting section B3 of the light guide member 21 substantially along the expanded optical axis and is made incident on the eye EY of the observer in the parallel light beam state from a right direction at an angle $\theta_1$ on the tilt. On the other hand, the image light GL2 from the second display point P2 on the left side is converted into parallel light beams by the projection optical system 12, passes through the light incident section B1, the light guide section B2, and the light emitting section B3 of the light guide member 21 substantially along the expanded optical axis AX', and is made incident on the eye EY of the observer in the parallel light beam state from a left direction at an angle $\theta_2$ ($|\theta_2|=|\theta_1|$) on the tilt. The angles $\theta_1$ and $\theta_2$ are equivalent to left and right half angles of view and set to, for example, 10°.

Concerning the lateral direction of the second direction D2, the light guide member 21 returns the image lights GL1 and GL2 by reflecting the image lights. The numbers of times of reflection are different depending on positions. Therefore, the image lights GL1 and GL2 are discontinuously represented in the light guide member 21. As a result, concerning the lateral direction, a screen is reversed left and right as a whole. However, since the light guide member 21 is highly accurately processed as explained in detail later, an image on the right half of the liquid crystal display device 32 and an image on the left half of the liquid crystal display device 32 are continuously joined without a gap. An emission angle $\theta_1'$ of the image light GL1 on the right side and an emission angle $\theta_2'$ of the image light GL2 on the left side are set to different angles taking into account the fact that the numbers of times of reflection of the image lights GL1 and GL2 in the light guide member 21 are different from each other.

Consequently, the image lights GLa, GLb, GL1, and GL2 made incident on the eye EY of the observer are virtual images from the infinite. Concerning the longitudinal first direction D1, a video formed on the liquid crystal display device 32 is upright. Concerning the lateral second direction D2, a video formed on the liquid crystal display device 32 is reversed.

D. Optical Path of Image Light Concerning the Lateral Direction

Figure 4:
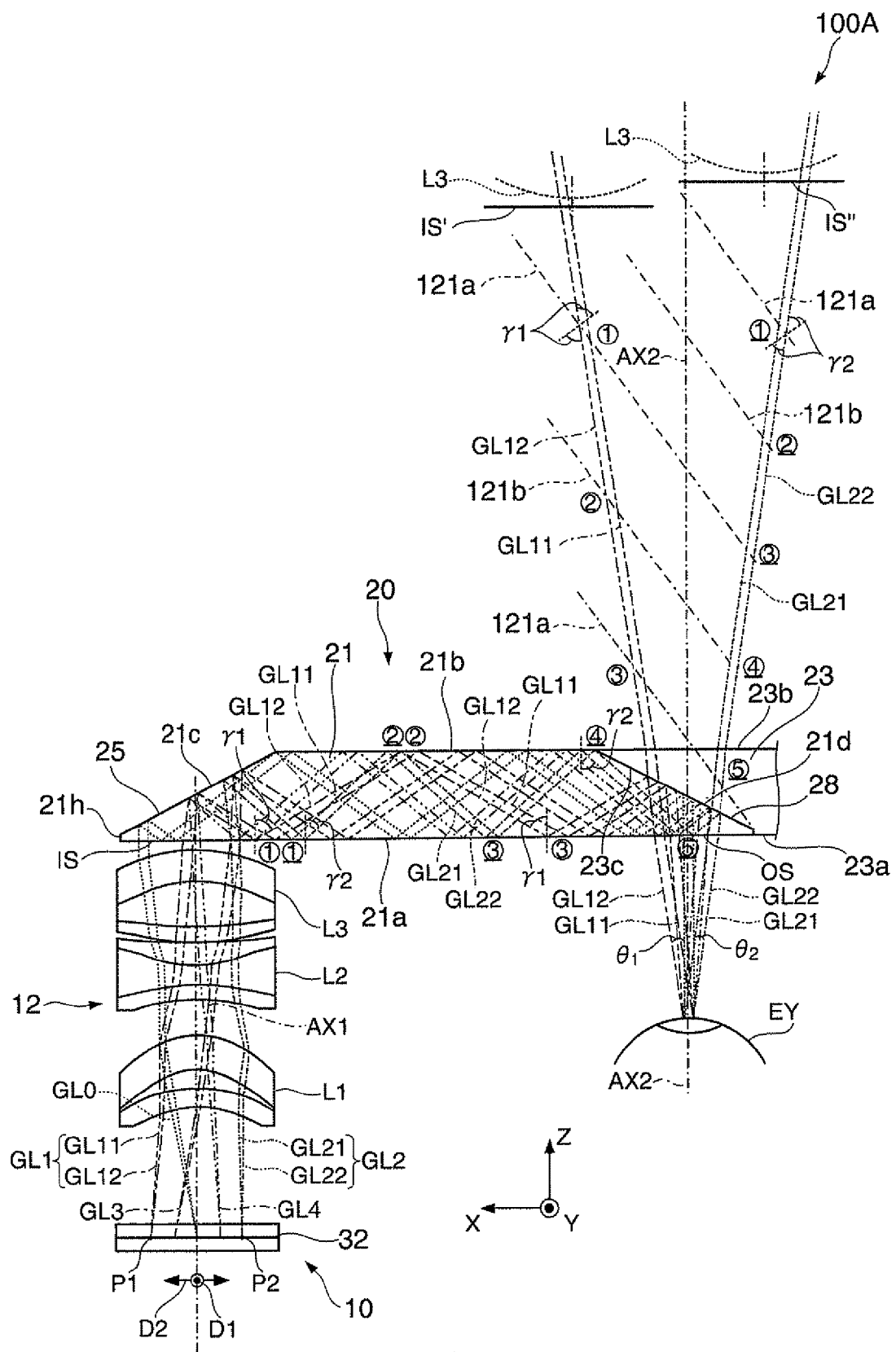
FIG. 4 is a plan view for specifically explaining an optical path in an optical system of the virtual image display apparatus.

FIG. 4 is a sectional view for explaining a specific optical path in the lateral second direction D2 in the first display device 100A.

Image lights GL11 and GL12 from the first display point P1 on the left side of the liquid crystal display device 32 pass through the lens groups L1, L2, and L3 of the projection optical system 12 to be converted into parallel light beams and are made incident on the light incident surface IS of the light guide member 21. The image lights GL11 and GL12 guided into the light guide member 21 repeat total reflection at an equal angle on the first and second reflection surfaces 21a and 21b and are finally emitted from the light emission surface OS as parallel light beams. Specifically, after being reflected on the third reflection surface 21c of the light guide member 21 as the parallel light beams, the image lights GL11 and GL12 are made incident on the first reflection surface 21a of the light guide member 21 at a first reflection angle $\gamma_1$ and totally reflected (first total reflection). Thereafter, the image lights GL11 and GL12 are made incident on the second reflection surface 21b and totally reflected while keeping the first reflection angle $\gamma_1$ (second total reflection) and subsequently made incident on the first reflection surface 21a again and totally reflected (third total reflection). As a result, the image lights GL11 and GL12 are totally reflected on the first and second reflection surfaces 21a and 21b three times in total and made incident on the fourth reflection surface 21d. The image lights GL11 and GL12 are reflected on the fourth reflection surface 21d at an angle same as the angle of reflection on the third reflection surface 21c and emitted from the light emission surface OS as parallel light beams at a tilt of the angle $\theta_1$ with respect to the second optical axis AX2 direction perpendicular to the light emission surface OS.

Image lights GL21 and GL22 from the second display point P2 on the right side of the liquid crystal display device 32 pass through the lens groups L1, L2, and L3 of the projection optical system 12 to be converted into parallel light beams and are made incident on the light incident surface IS of the light guide member 21. The image lights GL21 and GL22 guided into the light guide member 21 repeat total reflection at an equal angle on the first and second reflection surfaces 21a and 21b and are finally emitted from the light emission surface OS as parallel light beams. Specifically, after being reflected on the third reflection surface 21c of the light guide member 21 as the parallel light beams, the image lights GL21 and GL22 are made incident on the first reflection surface 21a of the light guide member 21 at a second reflection angle $\gamma_2$ ($\gamma_2<\gamma_1$) and totally reflected (first total reflection). Thereafter, the image lights GL21 and GL22 are made incident on the second reflection surface 21b and totally reflected while keeping the second reflection angle $\gamma_2$ (second total reflection), made incident on the first reflection surface 21a again and totally reflected (third total reflection), made incident on the second reflection surface 21b again and totally reflected (fourth total reflection), and made incident on the first reflection surface 21a again and totally reflected (fifth total reflection). As a result, the image lights GL21 and GL22 are totally reflected on the first and second reflection surfaces 21a and 21b five times in total and made incident on the fourth reflection surface 21d. The image lights GL21 and GL22 are reflected on the fourth reflection surface 21d at an angle same as the angle of reflection on the third reflection surface 21c and emitted from the light emission surface OS as parallel light beams at a tilt of the angle $\theta_2$ with respect to the second optical axis AX2 direction perpendicular to the light emission surface OS.

In FIG. 4, an imaginary first surface 121a corresponding to the first reflection surface 21a when the light guide member 21 is expanded and an imaginary second surface 121b corresponding to the second reflection surface 21b when the light guide member 21 is expanded are drawn. It is seen that, by expanding the light guide member 21 in this way, after passing through an incident equivalent surface IS' corresponding to the light incident surface IS, the image lights GL11 and GL12 from the first display point P1 pass through the first surface 121a twice, pass through the second surface 121b once, and are emitted from the light emission surface OS and made incident on the eye EY of the observer. It is seen that, after passing through an incident equivalent surface IS" corresponding to the light incident surface IS, the image lights GL21 and GL22 from the second display point P2 pass through the first surface 121a three times, pass through the second surface 121b twice, and are emitted from the light emission surface OS and made incident on the eye EY of the observer. From a different perspective, the observer superimposedly observes the lens groups L3 at an emission end of the projection optical system 12 present near the incident equivalent surfaces IS' and IS" in different two positions.

Light beams emitted from other positions are explained. The image light GL3 emitted from a position on the right side of the liquid crystal display device 32 as one faces the same and closer to the center than the first display point P1 is converted into parallel light beams by the projection optical system 12, made incident on the light guide member 21 from the light incident surface IS, and, like the image lights GL11 and GL12, totally reflected on the first and second reflection surfaces 21a and 21b of the light guide member 21 three times in total and emitted from the light emission surface OS as parallel light beams at a tilt smaller than the angle $\theta_1$.

The image light GL4 emitted from a position on the left side of the liquid crystal display device 32 as one faces the same and closer to the center than the second display point P2 is converted into parallel light beams by the projection optical system 12, made incident on the light guide member 21 from the light incident surface IS, and, like the image lights GL21 and GL22, totally reflected on the first and second reflection surfaces 21a and 21b of the light guide member 21 five times in total and emitted from the light emission surface OS as parallel light beams at a tilt smaller than the angle $\theta_2$.

Figure 5A:
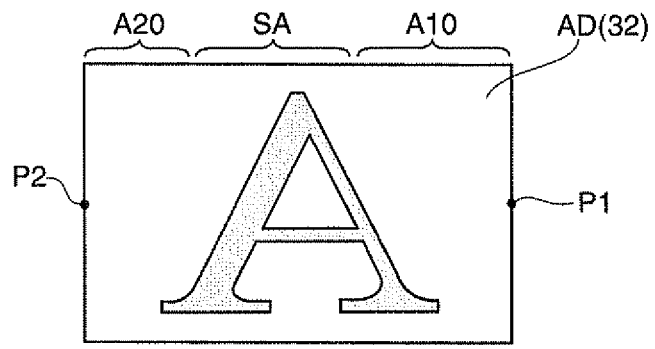
FIG. 5A is a diagram showing a display surface of a liquid crystal display device.
Figure 5B:
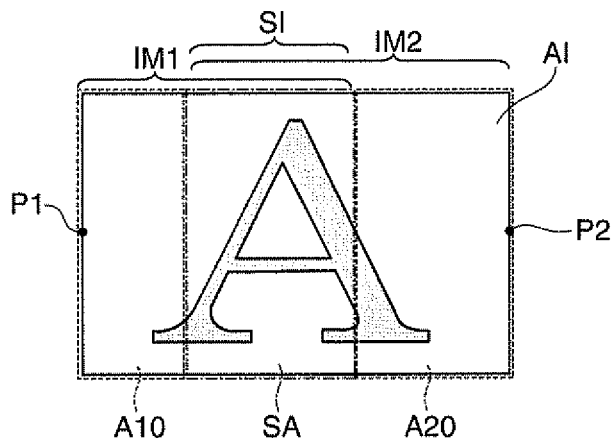
FIG. 5B is a diagram for conceptually explaining a virtual image of a liquid crystal display device visible to an observer.
Figure 5C:
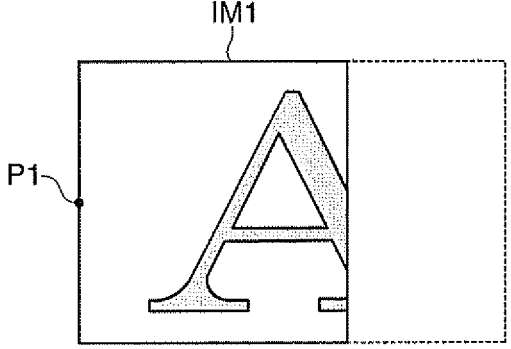
FIGS. 5C and 5D are diagrams for explaining partial images forming the virtual image.
Figure 5D:
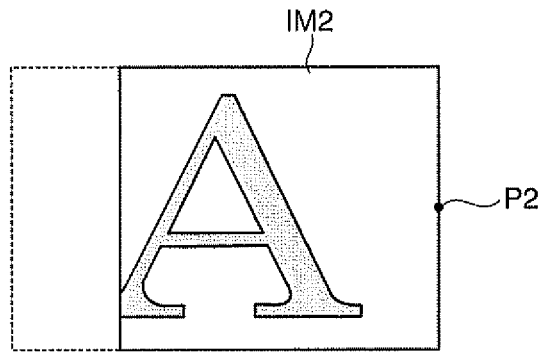

FIG. 5A is a diagram for conceptually explaining a display surface of the liquid crystal display device (the image-light forming section) 32. FIG. 5B is a diagram for conceptually explaining a virtual image of the liquid crystal display device 32 visible to the observer. FIGS. 5C and 5D are diagrams for explaining partial images forming the virtual image. A rectangular image forming area AD provided in the liquid crystal display device 32 shown in FIG. 5A is observed as a virtual image display area AI shown in FIG. 5B. On the left side of the virtual image display area AI, a first projected image IM1 equivalent to a section from the center to the right side of the image forming area AD is formed (see FIG. 5C). The first projected image IM1 is a partial image with the right side thereof cut off. On the right side of the virtual image display area AI, a projected image IM2 equivalent to a section from the center to the left side of the image forming area AD of the liquid crystal display device 32 is formed as a virtual image (see FIG. 5D). The second projected image IM2 is a partial image with the left side thereof cut off.

A first partial area A10 where only the first projected image (the virtual image) IM1 is formed in the liquid crystal display device 32 shown in FIG. 5A includes, for example, the first display point P1 at the right end of the liquid crystal display device 32. The first partial area A10 emits the image lights GL11 and GL12 totally reflected three times in total in the first light guide section B2 of the light guide member 21. A second partial area A20 where only the second projected image (the virtual image) IM2 is formed in the liquid crystal display device 32 includes, for example, the second display point P2 at the left end of the liquid crystal display device 32. The second partial area A20 emits the image lights GL21 and GL22 totally reflected five times in total in the light guide section B2 of the light guide member 21. Image light from a band SA provided between the first and second partial areas A10 and A20 and extending longitudinally in a place closer to the center of the image forming area AD of the liquid crystal display device 32 forms an overlapping image SI shown in FIG. 5B. In other words, the image light from the band SA of the liquid crystal display device 32 changes to the first projected image IM1 formed by the image light GL3 totally reflected three times in total in the light guide section B2 and the second projected image IM2 formed by the image lights GL0 and GL4 totally reflected five times in total in the light guide section B2, which are superimposed on the virtual image display area AI. If the processing of the light guide member 21 is precise and a light beam accurately collimated by the projection optical system 12 is formed, concerning the overlapping image SI, it is possible to prevent a shift and a blur due to the superimposition of the two projected images IM1 and IM2.

E. Directivity of Image Light

Figure 6A:
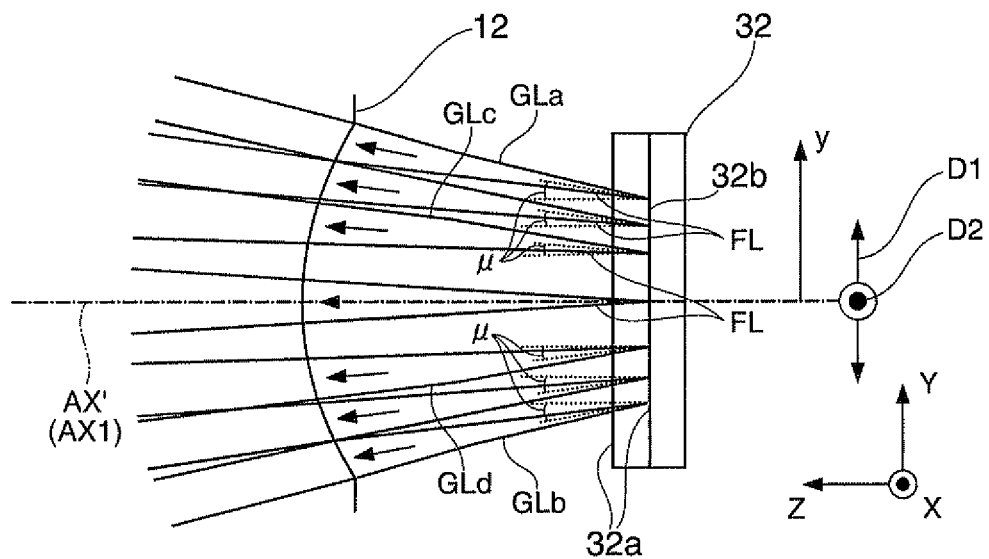
FIG. 6A is a side view for explaining an emission angle concerning the longitudinal direction of image light emitted from the liquid crystal display device.

A relation between a position in the longitudinal direction of the display area 32b of the liquid crystal display device 32 and an emission angle of image light (an angle characteristic of light beam capturing into the projection optical system 12 or the like) is explained with reference to FIG. 6A. In an upper half of the liquid crystal display device 32, when an emission position (object height in the longitudinal direction) y in the first direction D1 becomes large while gradually separating from the center of the liquid crystal display device 32 in the longitudinal direction, an emission angle $\mu$ of image lights FL from the display area 32b gradually increases according to the emission position y. As a result, although not explained in detail, an angle of the image lights FL made incident on the eye EY of the observer also gradually increases. The same phenomenon occurs in a lower half of the liquid crystal display device 32.

Figure 6B:
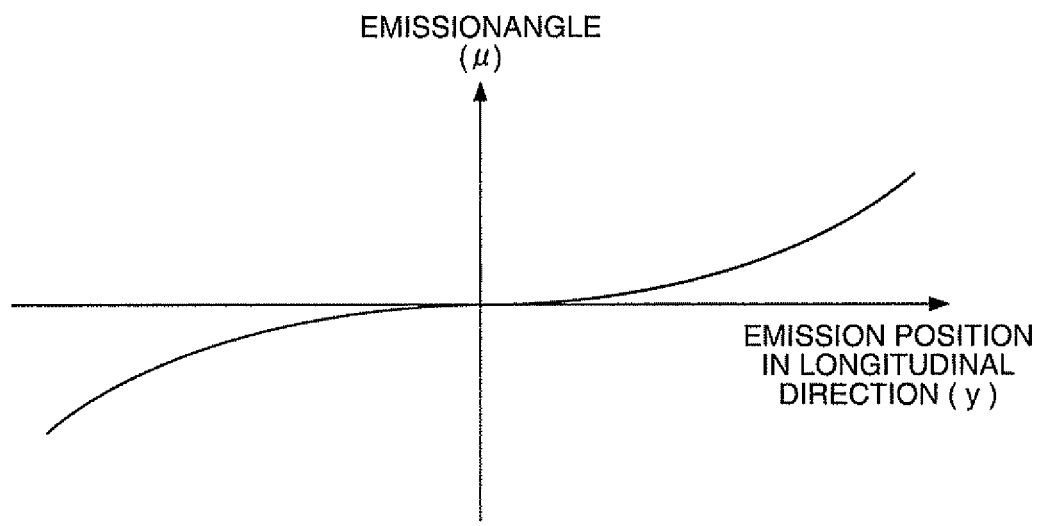
FIG. 6B is a graph for conceptually explaining an angle characteristic of light beam capturing concerning the longitudinal direction.

FIG. 6B is a graph illustrating an angle characteristic in the longitudinal direction at the time when a virtual image is formed by image light emitted from the liquid crystal display device 32, i.e., an angle characteristic of light beam capturing in the virtual image display apparatus 100. In the graph, the abscissa represents the emission position y in the longitudinal first direction D1 in the liquid crystal display device and the ordinate represents the emission angle $\mu$ of the effective image lights FL made incident on the eye EY in the image light from the liquid crystal display device 32. As the emission angle $\mu$, a tilt angle on the upper side in the longitudinal direction with respect to the normal of the liquid crystal display device 32, i.e., in a +y direction is plus. As it is seen from the graph, an angle of a light beam emitted from the liquid crystal display device 32 and effectively captured into the eye EY of the observer is substantially different depending on a position of the liquid crystal display device 32. More specifically, an absolute value of the emission angle $\mu$ of the effectively-utilized image light FL tends to be larger on the peripheral side than on the center side of the display area 32b of the liquid crystal display device 32. In other words, as the emission position y becomes larger and is further away from the center to the peripheral side, the emission angle from the liquid crystal display device 32 of the image light FL made incident on the eye EY via the light guide device tilts to the outer side and increases. The tilt of the emission angle of the image light FL is the maximum at a maximum value of the emission position y, i.e., at the upper end (the peripheral section) of the display area 32b. From the situation explained above, concerning focusing in the longitudinal direction, it is considered that, by imparting directivity corresponding to the angle characteristic of light beam capturing shown in FIG. 6B to the image lights FL emitted from the liquid crystal display device 32, it is possible to improve optical coupling efficiency from the liquid crystal display device 32 to the light guide device 20 and to the eye EY and it is possible to suppress occurrence of luminance spots (luminance unevenness) to improve efficiency of use of illumination light. The phenomenon (the influence of the angle characteristic of light beam capturing) becomes conspicuous as an angle of view of a virtual image increases. Therefore, to increase the angle of view of the virtual image, it is important to impart appropriate directivity to the image lights FL emitted from the liquid crystal display device 32.

Figure 7A:
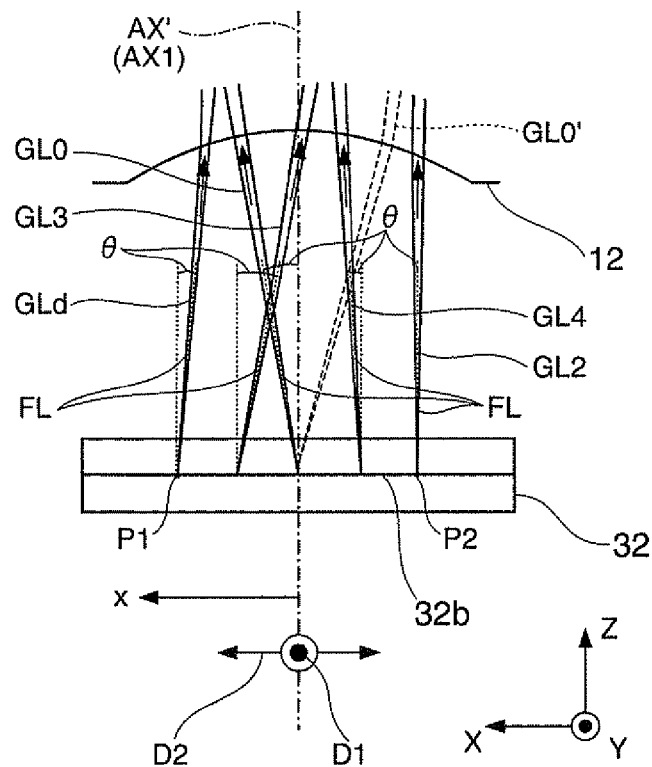
FIG. 7A is a side view for explaining an emission angle concerning the lateral direction of the image light emitted from the liquid crystal display device.

A relation between a position in the lateral direction of the display area 32b of the liquid crystal display device 32 and an emission angle of image light (an angle characteristic of light beam capturing into the projection optical system 12 or the like) is explained with reference to FIG. 7A. In a right half (on the +X side) of the liquid crystal display device 32 as one faces the same, when an emission position (object height in the lateral direction) x in the second direction D2 becomes large in a plus direction while gradually separating from the center of the liquid crystal display device 32 in the lateral direction, an emission angle v of image lights FL from the display area 32b gradually decreases according to the emission position x. On the other hand, an angle of the image lights FL made incident on the eye EY of the observer increases. In a left half (on the −X side) of the liquid crystal display device 32 as one faces the same, when the emission position (object height in the lateral direction) x in the second direction D2 becomes large in a minus direction while gradually separating from the center of the liquid crystal display device 32 in the lateral direction, an absolute value |v| of an emission angle of the image lights FL from the display area 32b gradually decreases according to the emission position x. As a result, although not explained in detail, an angle of the image lights FL made incident on the eye EY of the observer also decreases.

Figure 7B:
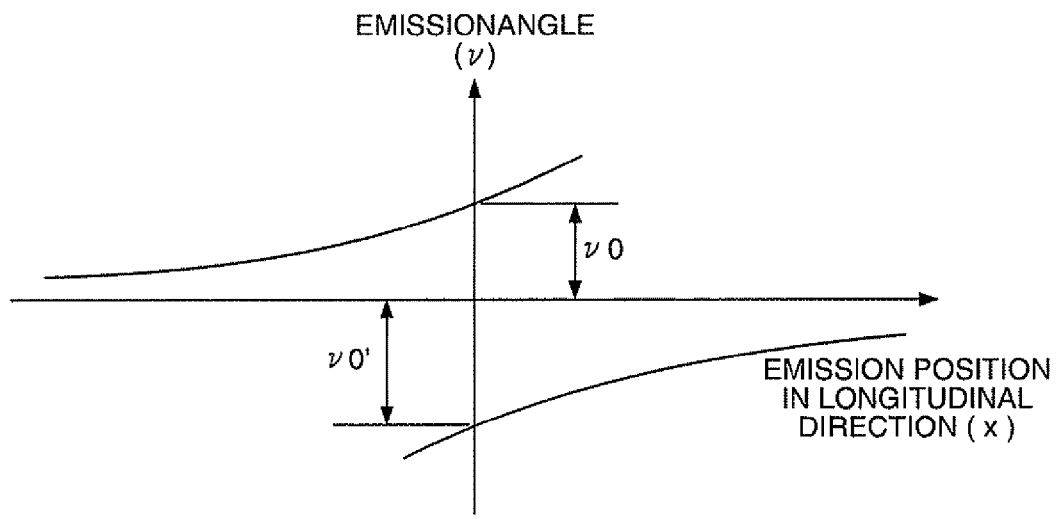
FIG. 7B is a graph for conceptually explaining an angle characteristic of light beam capturing concerning the lateral direction.

FIG. 7B is a graph illustrating an angle characteristic in the lateral direction at the time when a virtual image is formed by image light emitted from the liquid crystal display device 32, i.e., an angle characteristic of light beam capturing in the virtual image display apparatus 100. In the graph, the abscissa represents the emission position x in the lateral second direction D2 in the liquid crystal display device 32 and the ordinate represents the emission angle v of the effective image lights FL made incident on the eye EY in the image light from the liquid crystal display device 32. As the emission angle v, a tilt angle on the left side in the lateral direction with respect to the normal of the liquid crystal display device 32, i.e., in a +x direction is plus. As it is seen from the graph, an angle of a light beam emitted from the liquid crystal display device 32 and effectively captured into the eye EY of the observer is substantially different depending on a position of the liquid crystal display device 32. More specifically, an absolute value of the emission angle v of the effectively-utilized image light FL tends to be larger on the center side than on the peripheral side of the display area 32b of the liquid crystal display device 32. In other words, as the emission position x becomes smaller and is closer to the center, the emission angle from the liquid crystal display device 32 of the image light FL made incident on the eye EY via the light guide device 20 tilts to the inner side and increases. From the situation explained above, concerning focusing in the lateral direction, it is considered that, by imparting directivity corresponding to the angle characteristic of light beam capturing shown in FIG. 7B to the image lights FL emitted from the liquid crystal display device 32, it is possible to improve optical coupling efficiency from the liquid crystal display device 32 to the light guide device 20 and to the eye EY and it is possible to suppress occurrence of luminance spots (luminance unevenness) to improve efficiency of use of illumination light. The phenomenon (the influence of the angle characteristic of light beam capturing) becomes conspicuous as an angle of view of a virtual image increases. Therefore, to increase the angle of view of the virtual image, it is important to impart appropriate directivity to the image lights FL emitted from the liquid crystal display device 32.

Concerning the center in the lateral direction of the liquid crystal display device 32, an image is mainly formed by the image light GL0 totally reflected five times in total in the light guide section B2. An image is also formed to some extent by image light GL0' totally reflected three times in total in the light guide section B2. In this case, from the viewpoint of obtaining a high-luminance image, it is desirable that an emission angle has peaks in two directions v0 and v0'.

Figure 8:
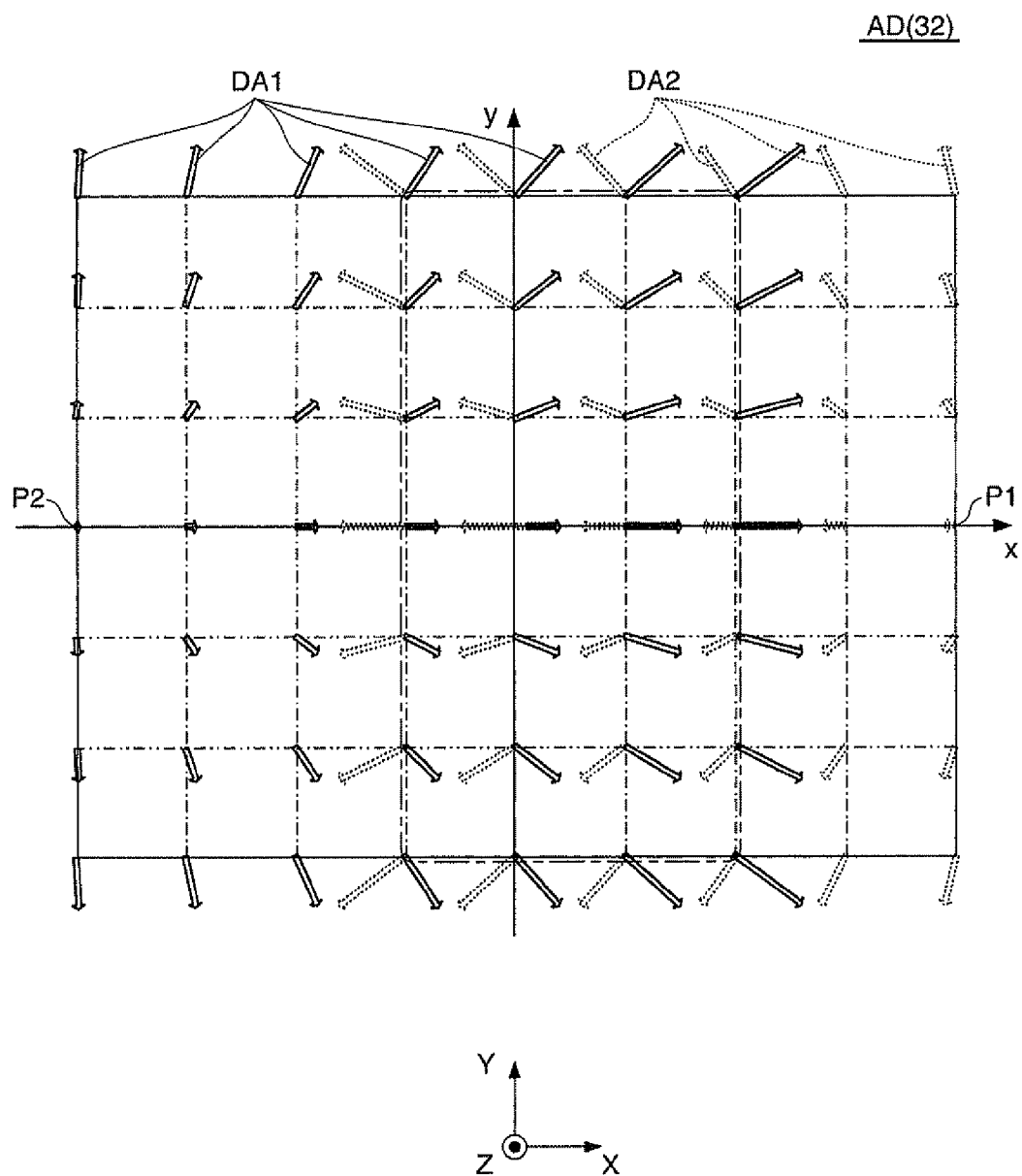
FIG. 8 is a conceptual diagram for explaining an angle characteristic of light beam capturing as a two-dimensional distribution.

FIG. 8 is a diagram for explaining the angle characteristics of light beam capturing shown in FIGS. 6B and 7B as a two-dimensional distribution. An imaginary grid is displayed on the liquid crystal display device 32. The abscissa x of the imaginary grid corresponds to the second direction D2 and the ordinate y of the grid corresponds to the first direction D1. The directions and the sizes of arrows DA1 and DA2 extending from respective grid points indicate tilt directions and tilt amounts (i.e., azimuths and tilt angles) corresponding to peaks of light beam capturing. The arrows DA1 of solid lines indicate light beam capturing directions concerning the image lights GL2 and GL4 (GL0) in FIG. 7A totally reflected five times in total in the light guide section B2. The arrows DA2 of dotted lines indicate light beam capturing directions concerning the image lights GL1 and GL3 (GL0') in FIG. 7A totally reflected three times in total in the light guide section B2. As it is evident from the figure, the light beam capturing directions are non-uniform in both the longitudinal direction and the lateral direction. Image light from the band SA in the center is captured in the directions of the two arrows DA1 and DA2. In other words, for image light coupled to the light guide member 21 via the projection optical system 12 and propagating through the light guide member 21 to reach the eye EY or illumination light as a source of the image light, two peak directions in which luminance is the maximum are set (specifically, the directions of the arrows DA1 and DA2). However, if a peak of an emission angle of the image light is present in the direction of at least one of the arrows DA1 and DA2, sufficient luminance can be secured in the overlapping image SI shown in FIG. 5B and a high-quality image can be formed.

F. Control of the Directivity of Image Light in the Image Display Device

Directivity control for image light using control of the directivity of illumination light in the image display device 11 is explained below.

FIGS. 9A to 9D are a plan view, a side view, a rear view, and a partially cut-out perspective view of the illuminating device 31 and the liquid crystal display device 32 included in the image display device 11. In the image display device 11, the optical-directivity changing section 38 is arranged between the illuminating device 31 and the liquid crystal display device 32 and bonded to the light emission side of the illuminating device 31. The illuminating device 31 includes the light source 31a, which is the light emitting section, and the backlight guide section 31b.

In the illuminating device 31, the light source (the light emitting section) 31a extends along a light capturing surface IP, which is one side of the rectangular plate-like backlight guide section 31b. The light source 31a generates light of a light amount sufficient for illuminating the liquid crystal display device (the image-light forming section) 32 and emits the light to the backlight guide section 31b. As the light source 31a, for example, a slender fluorescent tube or a light source in which plural LED light sources are arrayed can be applied.

The backlight guide section 31b is a tabular member as a whole and is arranged near the back of the liquid crystal display device 32 and in parallel to the back. The backlight guide section 31b includes a flat member 31e, a reflection film 31f, and a diffusing film 31g and has a structure in which the flat member 31e is held between the reflection film 31f and the diffusing film 31g. The backlight guide section 31b makes the illumination light SL from the light source 31a incident on the inside of the backlight guide section 31b via the light capturing surface IP, leads the incident light to be diffused by reflection, and emits the light to the liquid crystal display device 32 on the outside via the diffusing film 31g and an emission surface EP to form illumination light for illuminating the entire liquid crystal display device 32 from the back.

Figure 9A:
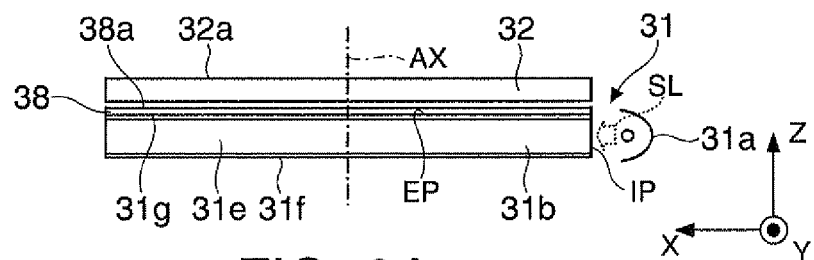
FIGS. 9A to 9D are respectively a plan view, a side view, a rear view, and a partially cut-out perspective view for explaining an optical-directivity changing section for adjusting directivity of image light.
Figures 9B, 9C:
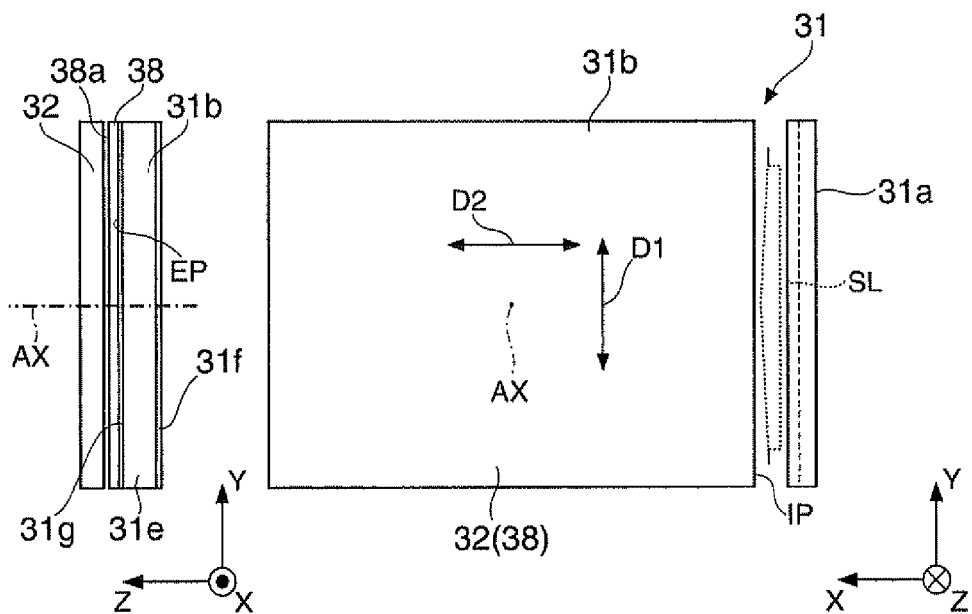
Figure 9D:
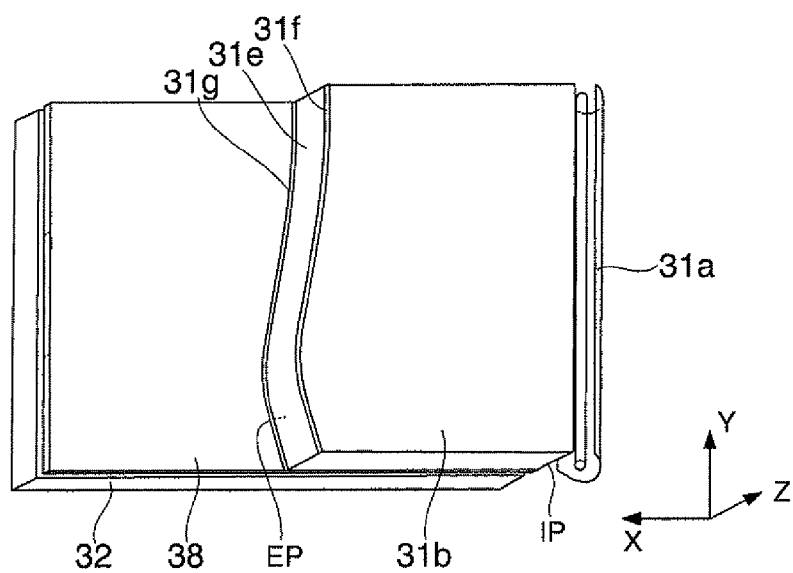
Figure 10A:
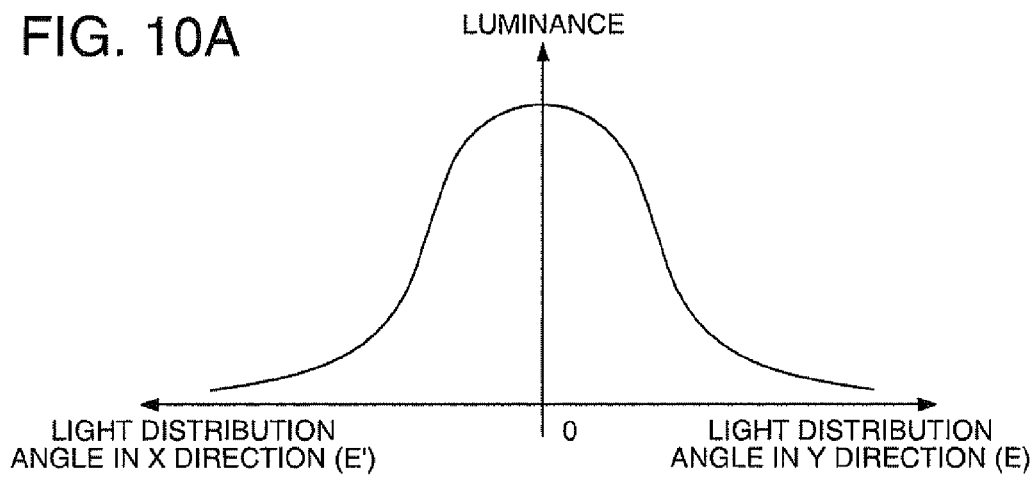
FIG. 10A shows a light distribution characteristic on the entrance side of an optical-directivity changing section.

As shown in a graph of FIG. 10A, the illumination light emitted from the emission surface EP of the backlight guide section 31b shown in FIG. 9A is uniformalized by the backlight guide section 31b and has a general light distribution characteristic or light distribution. In the graph, the right half of the abscissa represents an orientation angle E concerning the longitudinal Y direction of the illumination light emitted from the backlight guide section 31b. The left half of the abscissa represents an orientation angle E' concerning the lateral X direction of the illumination light emitted from the backlight guide section 31b. The ordinate represents the luminance of the illumination light at the respective orientation angles. In the illumination light emitted from the emission surface EP of the backlight guide section 31b, an optical axis AX direction (the Z direction) perpendicular to the emission surface EP is a main directivity direction in which luminance is the highest. The illumination light has a luminance center (an intensity peak) in the optical axis AX direction (the Z direction) perpendicular to the emission surface EP. The luminance of the illumination light falls as tilt angles, i.e., the orientation angles E and E' increase with respect to the optical axis AX. Concerning the illumination light emitted from the backlight guide section 31b, the optical axis AX direction (the Z direction) perpendicular to the emission surface EP is a main directivity direction in which luminance is the highest.

The sheet-like optical-directivity changing section 38 is bonded to the emission surface EP of the backlight guide section 31b and integrated with the backlight guide section 31b. The optical-directivity changing section 38 is a sheet of a prism array and has a function of changing a light distribution characteristic (see FIG. 10A) of the illumination light emitted from the emission surface EP of the backlight guide section 31b. The optical-directivity changing section 38 bends incident light at a different angle according to a position of the emission surface EP (i.e., a pixel position of the liquid crystal display device 32). In other words, the optical-directivity changing section 38 adjusts the light distribution characteristic, which is an angle distribution of the directivity of the illumination light, to thereby adjust the directivity of image light emitted from the liquid crystal display device 32 to directivity corresponding to the angle characteristics of light beam capturing of the virtual image display apparatus 100 shown in FIGS. 6B and 7B. The light distribution characteristic of the optical-directivity changing section 38 is different concerning the first direction D1 and the second direction D2. Specifically, as explained with reference to FIG. 6A, as an absolute value of the emission position y in the longitudinal first direction D1 increases in the display area 32b of the liquid crystal display device 32, a light beam tilting to the outer side is more effectively captured into the eye EY of the observer passing through the projection optical system 12 and the light guide device 20. Therefore, as explained later in detail, a distribution of the directivity of the image light emitted from the liquid crystal display device 32 is adjusted by the optical-directivity changing section 38 to match such an angle characteristic of light beam capturing. As explained with reference to FIG. 7A, as an absolute value of the emission position x in the lateral second direction D2 increases in the display area 32b of the liquid crystal display device 32, a light beam tilting to the inner side is more effectively captured into the eye EY of the observer passing through the projection optical system 12 and the light guide device 20. Therefore, similarly, as explained later in detail, a distribution of the directivity of the image light emitted from the liquid crystal display device 32 is adjusted by the optical-directivity changing section 38 to match such an angle characteristic of light beam capturing. It is possible to efficiently use the illumination light and the image light by adjusting the light distribution of the illumination light using the optical-directivity changing section 38 in this way.

The optical-directivity changing section 38 is a prism array sheet having two-dimensionally-arrayed prism elements. An emission side surface of the optical-directivity changing section 38 is formed as a deflecting surface 38a, both a longitudinal cross-section and a lateral cross-section of which are a saw-teeth like and a step like, by periodical arrangement of the prism elements. The prism elements included in the prism array sheet are arrayed at, for example, a period larger than that of pixels of the liquid crystal display device 32. However, the prism elements can also be arrayed at a period smaller than that of the pixels of the liquid crystal display device 32.

Figure 10B:
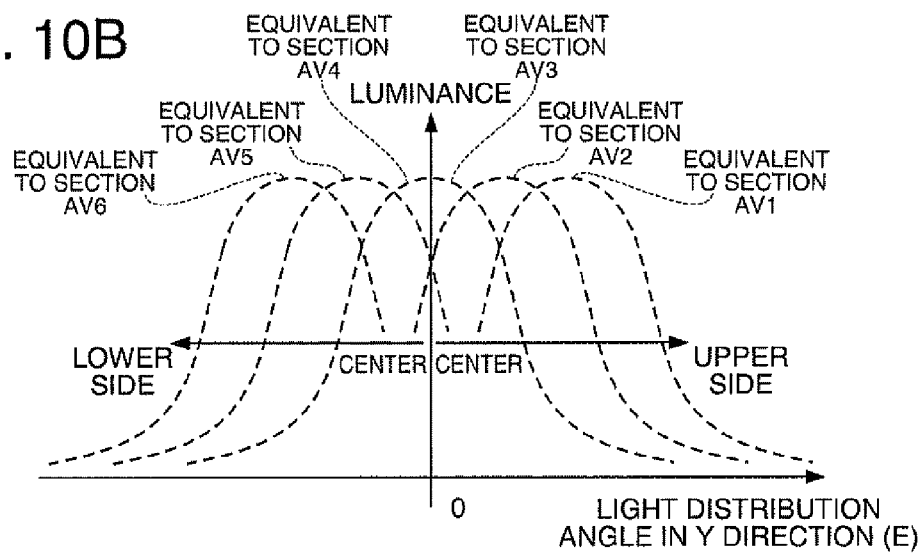
FIG. 10B shows a light distribution characteristic in the longitudinal direction on the exit side of the optical-directivity changing section.
Figure 11:
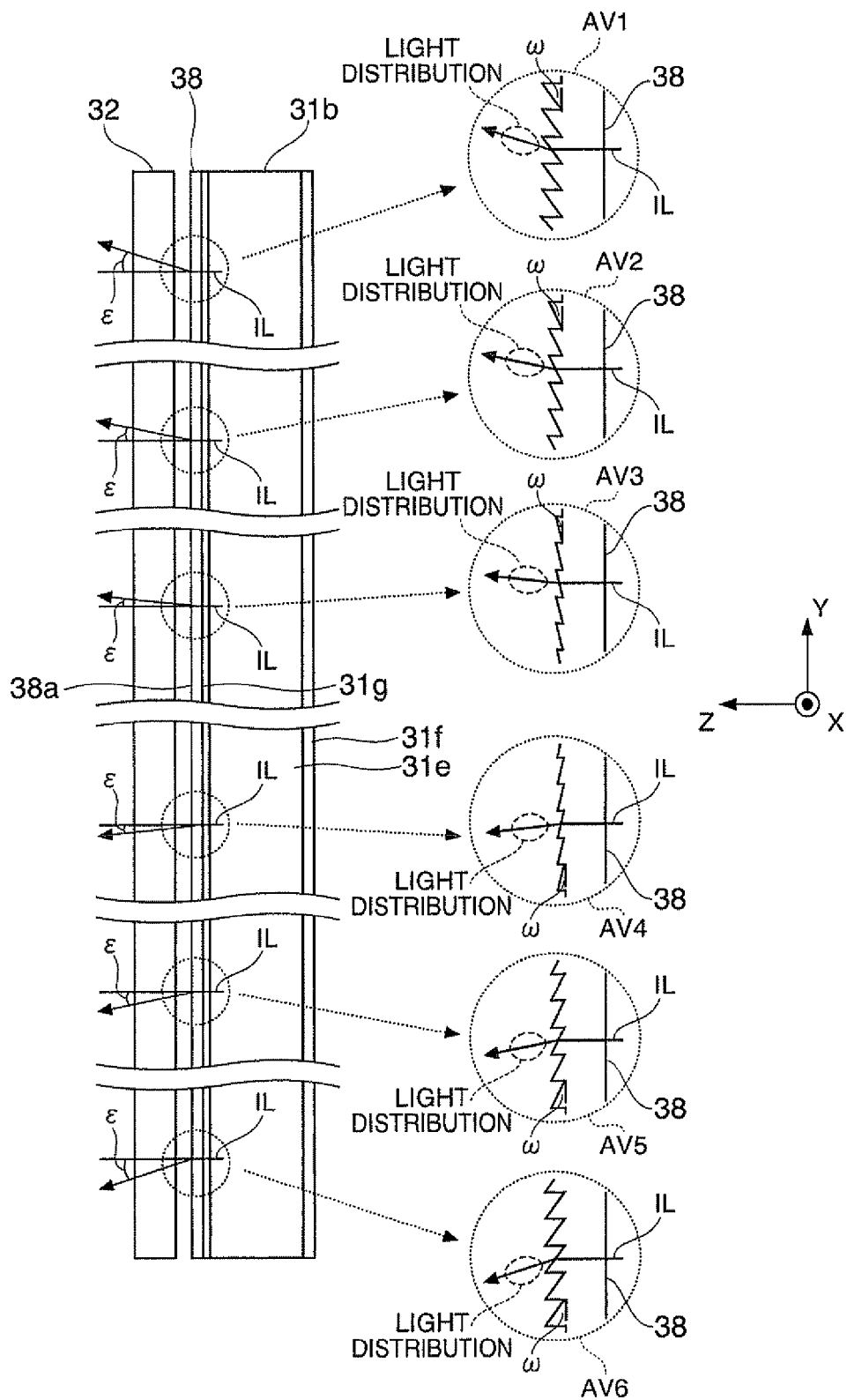
FIG. 11 is an enlarged longitudinal sectional view for explaining the structure and functions of the optical-directivity changing section.

As shown in a longitudinal cross-section of FIG. 11, the optical-directivity changing section 38 has a prism array in which prism elements are non-uniformly arrayed. A main directivity direction of illumination lights IL is changed according to a position and tilted to the outer side on the peripheral side. In other words, slopes of the prism elements included in the optical-directivity changing section 38 face downward further in an upper side area (the +Y side) than the center position concerning the up down direction. A wedge angle ω of the slopes gradually increases in the prism element provided further in the upper side area. The slopes of the prism elements included in the optical-directivity changing section 38 face upward further in a lower side area (the −Y side) than the center position concerning the up down direction. The wedge angle ω of the slopes gradually increases in the prism element provided further in the lower side area. The illumination lights IL uniformly emitted from the backlight guide section 31b are made incident on the liquid crystal display device 32 shown in FIG. 1 with a tilt angle ε given by bending in the prism elements when the illumination lights IL pass through the deflecting surface 38a of the optical-directivity changing section 38. The tilt angle ε is equivalent to a main direction of a light distribution of the illumination lights IL. As illustrated in area sections AV1, AV2, and AV3 included in the upper half of the optical-directivity changing section 38, the tilt angle ε gradually increases from the center to the end on the upper side. In other words, a light distribution or a light distribution characteristic after passage through the optical-directivity changing section 38 has, as indicated by a broken line in FIG. 10B, directivity in which an angle in the main direction (a direction of the luminance center) increases toward the outer side in a position on the upper side (the +Y side) further away from the optical axis AX (i.e., toward an area section (a peripheral section) A21 at the upper end). On the other hand, as illustrated in area sections AV4, AV5, and AV6 included in the lower half of the optical-directivity changing section 38, the tilt angle ϵ of the illumination light IL gradually increases from the center to the end on the lower side. In other words, a light distribution or a light distribution characteristic after passage through the optical-directivity changing section 38 has, as indicated by a broken line in FIG. 10B, directivity in which an angle in the main direction (the direction of the luminance center) increases toward the outer side in a position on the lower side (the −Y side) further away from the optical axis AX (i.e., toward the area section (a peripheral section) AV6 at the lower end).

Concerning the longitudinal direction, bending, i.e., deflection of the illumination lights IL by the optical-directivity changing section 38 deflects the illumination lights IL further to the outer side in the peripheral section than in the center, i.e., diffuses the illumination lights IL to the outer side as a whole. In other words, a distribution of the tilt angle ϵ concerning bending in the longitudinal direction of the illumination lights IL by the optical-directivity changing section 38 corresponds to the angle characteristic of light beam capturing shown in FIG. 6B, Consequently, the liquid crystal display device 32 is illuminated by the illumination light IL having the tilt angle ϵ corresponding to the emission angle μ of the image lights FL emitted from the liquid crystal display device 32 and effectively utilized for virtual image formation. In other words, it is possible to substantially match the emission angle μ equivalent to the luminance center of the effective image lights FL from the liquid crystal display device 32 and the tile angle ϵ equivalent to the luminance center of the illumination lights IL from the illuminating device 31. In this way, the image lights FL emitted from the respective positions of the liquid crystal display device 32 and effectively utilized are high-luminance components. Consequently, illumination light is not wastefully used and luminance spots of a virtual image can be reduced.

Figure 10C:
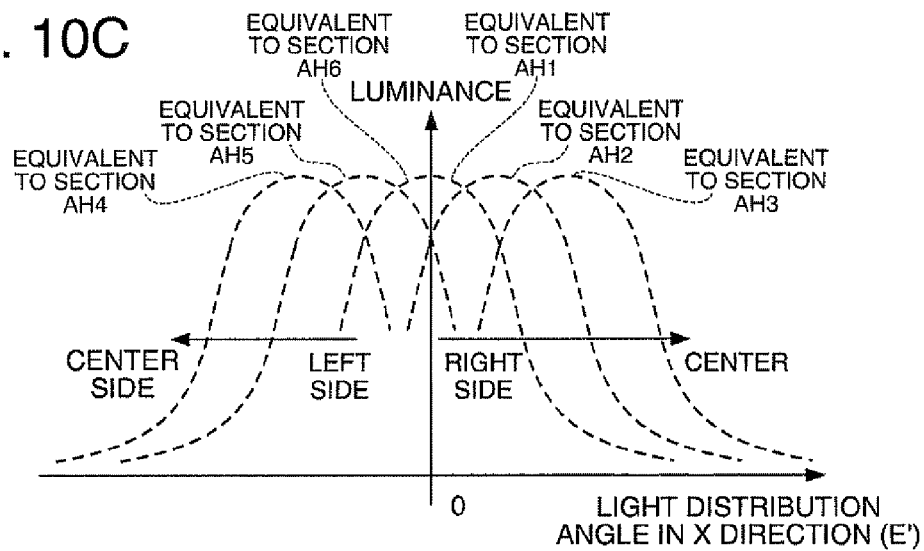
FIG. 10C shows a light distribution characteristic in the lateral direction on the exit side of the optical-directivity changing section.
Figure 12:
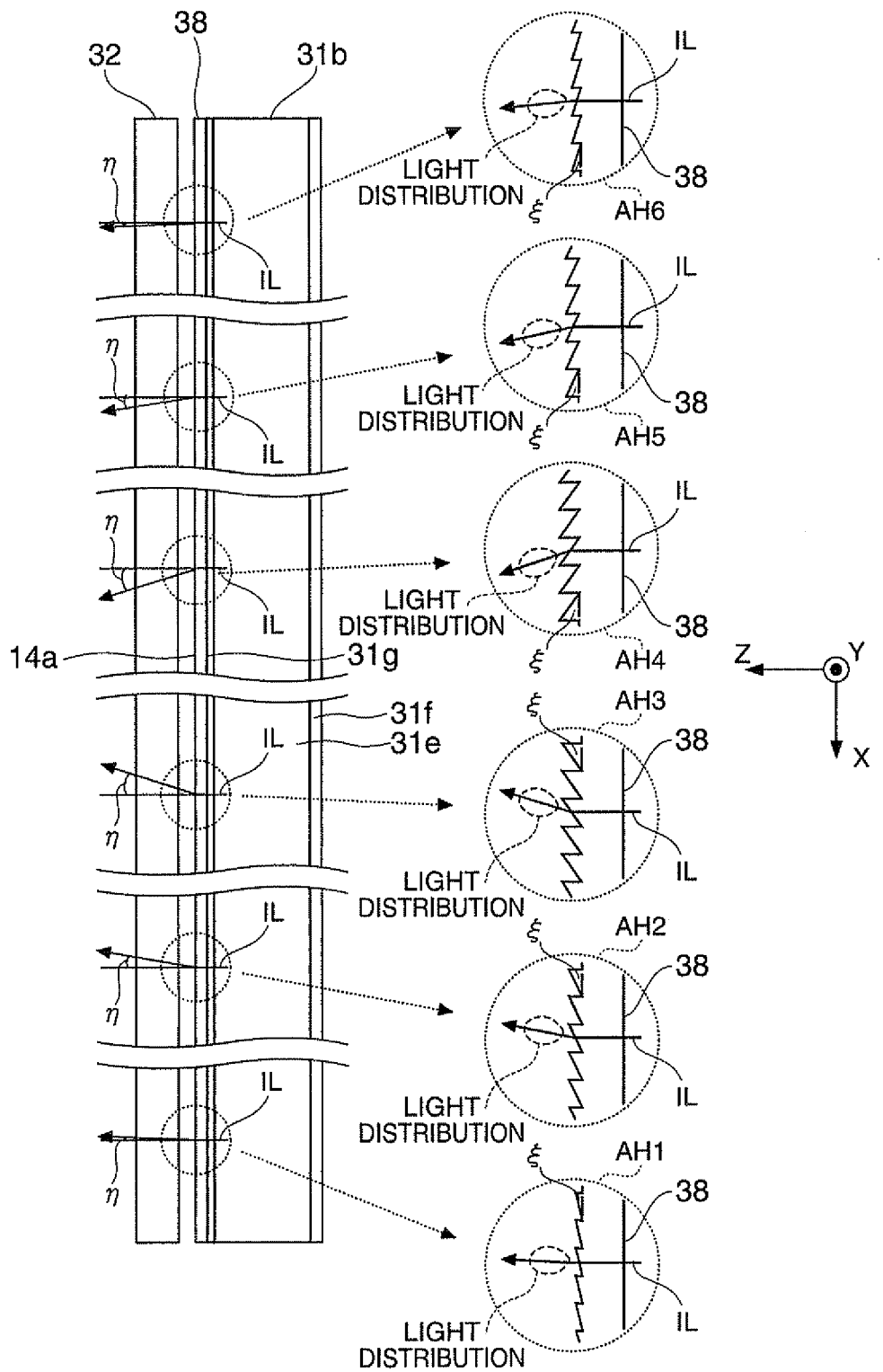
FIG. 12 is an enlarged lateral sectional view for explaining the structure and functions of the optical-directivity changing section.

As shown in a lateral cross-section of FIG. 12, the optical-directivity changing section 38 changes a main directivity direction of the illumination lights IL according to a position and tilts the main directivity direction to the inner side on the center side. In other words, the slopes of the prism elements included in the prism array of the optical-directivity changing section tilt rightward further in a right side area (the +X side) than the center position concerning the left right direction. A wedge angle ζ of the slopes gradually decreases in the prism element provided further in a right side area. The slopes of the prism elements included in the optical-directivity changing section 38 face leftward further in a left side area (the −X side) than the center position concerning the left right direction. The wedge angle ζ of the slopes gradually decreases in the prism element provided further in a left side area. The illumination lights IL uniformly emitted from the backlight guide section 31b are made incident on the liquid crystal display device 32 shown in FIG. 1 with a tilt angle η given by bending in the prism elements when the illumination lights IL pass through the deflecting surface 38a of the optical-directivity changing section 38. The tilt angle η is equivalent to a main direction of a light distribution of the illumination lights IL. As illustrated in area sections AH1, AH2, and AH3 included in the right half of the optical-directivity changing section 38, the tilt angle gradually decreases from the center to the end on the right side. In other words, a light distribution or a light distribution characteristic after passage through the optical-directivity changing section 38 has, as indicated by a broken line in FIG. 10C, directivity in which an angle in the main direction (a direction of the luminance center) increases toward the left side in a position on the optical axis AX side (the −X side) (i.e., toward the area section AH3 in the center). On the other hand, as illustrated in area sections AH4, AH5, and AH6 included in the left half of the optical-directivity changing section 38, the tilt angle η of the illumination light IL gradually decreases from the center to the end on the left side. In other words, a light distribution or a light distribution characteristic after passage through the optical-directivity changing section 38 has, as indicated by a broken line in FIG. 10C, directivity in which an angle in the main direction (the direction of the luminance center) increases toward the outer side in a position on optical axis AX side (the +X side) (i.e., toward the area section AH4 in the center).

Concerning the lateral direction, bending, i.e., deflection of the illumination lights IL by the optical-directivity changing section 38 deflects the illumination lights IL further to the inner side in the center than in the peripheral section, i.e., faces the illumination lights IL to the opposite end or the inner side as a whole. In other words, a distribution of the tilt angle η concerning bending in the lateral direction of the illumination lights IL by the optical-directivity changing section 38 corresponds to the angle characteristic of light beam capturing shown in FIG. 7B. Consequently, the liquid crystal display device 32 is illuminated by the illumination lights IL having the tilt angle η corresponding to the emission angle θ of the image lights FL emitted from the liquid crystal display device 32 and effectively utilized for virtual image formation. In other words, it is possible to substantially match the emission angle θ equivalent to the luminance center of the effective image lights FL from the liquid crystal display device 32 and the tile angle η equivalent to the luminance center of the illumination lights IL from the illuminating device 31. In this way, the image lights FL emitted from the respective positions of the liquid crystal display device and effectively utilized are high-luminance components. Consequently, illumination light is not wastefully used and luminance spots of a virtual image can be reduced.

In the virtual image display apparatus 100 according to the embodiment, the optical-directivity changing section 38 forms a non-uniform distribution concerning the directivity of the image lights GL emitted from the image display device 11. Therefore, even when an angle of a light beam emitted from the image display device 11 and effectively captured into the eye EY of the observer is substantially different depending on a position of the image display device 11, it is possible to form the image lights GL having directivity corresponding to such an angle characteristic of light beam capturing. It is possible to suppress occurrence of luminance spots to improve efficiency of use of illumination light.

In the virtual image display apparatus 100 according to the first embodiment and embodiments explained below, adjustment of the directivity or the light distribution characteristic of the illumination lights IL or the image lights GL by the optical-directivity changing section 38 does not need to be performed concerning both the first and second directions D1 and D2 and can be performed concerning only one of the first and second directions D1 and D2.

Second Embodiment

A virtual image display apparatus according to a second embodiment is explained below. The virtual image display apparatus according to this embodiment is a modification of the virtual image display apparatus 100 according to the first embodiment. Unless specifically explained, the virtual image display apparatus is the same as the virtual image display apparatus 100 according to the first embodiment.

Figure 13A:
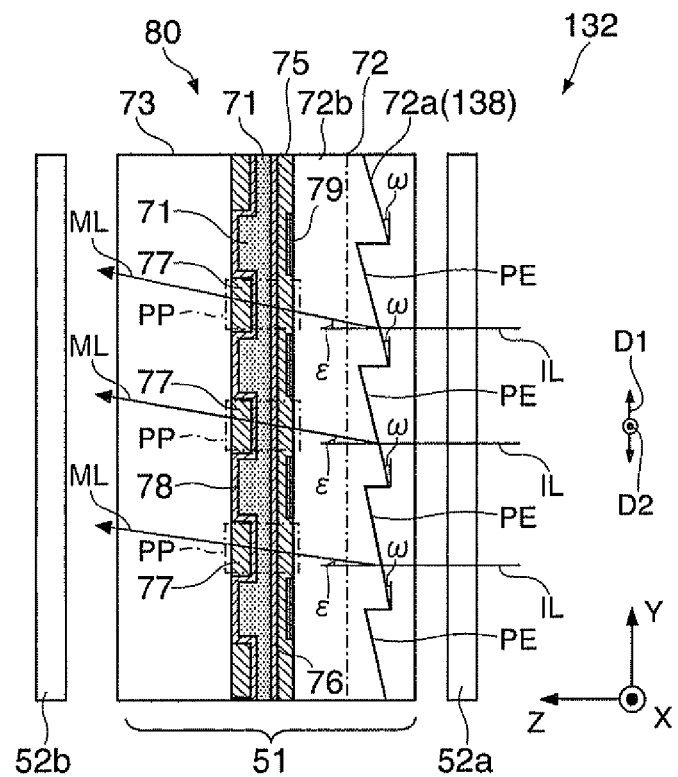
FIGS. 13A and 13B are respectively a longitudinal sectional view and a lateral sectional view for explaining a liquid crystal display device and the like incorporated in a virtual image display apparatus according to a second embodiment.
Figure 13B:
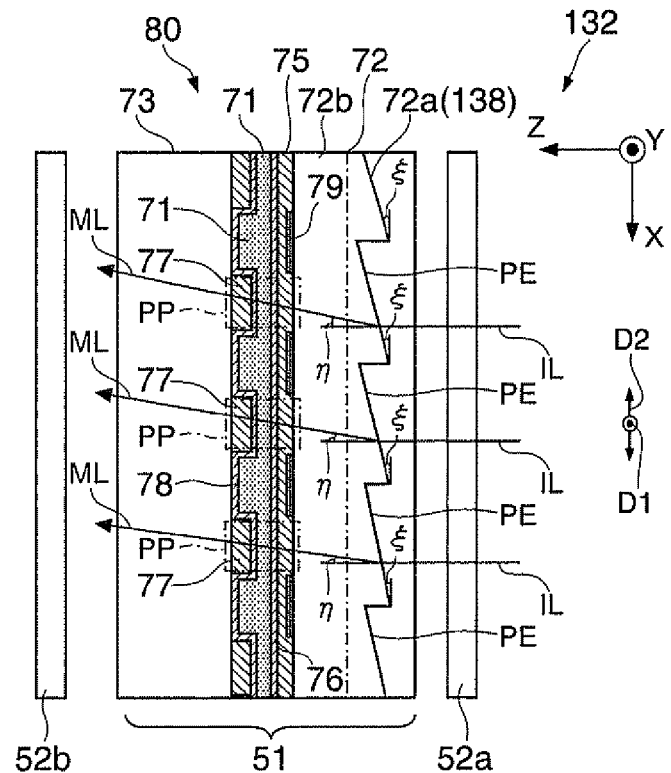

A liquid crystal display device (an image-light forming section) 132 shown in FIGS. 13A and 13B incorporates an optical-directivity changing section 138 for forming a non-uniform distribution concerning the directivity of image light.

The liquid crystal display device (the image-light forming section) 132 is a spatial light modulating device, more specifically, a light-transmissive liquid crystal display element. The liquid crystal display device 132 includes a liquid crystal panel 51 and a pair of polarization filters 52a and 52b that hold the liquid crystal panel 51 therebetween. In the liquid crystal display device (the liquid crystal display element) 132, the first polarization filter 52a on an incident side and the second polarization filter 52b on an emission side are arranged to form a cross-Nicol across the liquid crystal panel 51. The liquid crystal panel 51 two-dimensionally changes, in a pixel unit, according to an input signal, a polarization direction of the illumination lights IL made incident from the first polarization filter 52a side and emits modulated lights after the change to the second polarization filter 52b side as image lights ML.

The liquid crystal panel 51 includes, across a liquid crystal layer 71, a first substrate 72 on the incident side and a second substrate 73 on the emission side. The first substrate 72 on which the incident lights LI are made incident includes a prism array 72a extending along a YZ surface perpendicular to the optical axis AX and a main body section 72b arranged on the inner side of the prism array 72a. The prism array 72a functions as the optical-directivity changing section 138 that adjusts the directivity of the image lights ML. The prism array 72a includes a large number of very small prism elements PE two-dimensionally arrayed in a predetermined pattern corresponding to transparent pixel electrodes 77, i.e., pixel portions PP.

In the liquid crystal panel 51, a transparent common electrode 75 is provided on a surface of the first substrate 72 on the liquid crystal layer 71 side and, for example, a light distribution film 76 is formed on the common electrode 75. On the other hand, plural transparent pixel electrodes 77 arranged in a matrix shape and a thin film transistor (not shown) electrically connected to the transparent pixel electrodes 77 are provided on a surface of the second substrate 73 on the liquid crystal layer 71 side. For example, a light distribution film 78 is formed on the transparent pixel electrodes 77 and the thin film transistor. An inner section (i.e., the main body section 72b) of the first substrate 72, the second substrate 73, the liquid crystal layer 71 held between the first substrate 72 and the second substrate 73, and electrodes 75 and 77 are sections that function as an optical active element, i.e., a liquid crystal device 80 for modulating a polarization state of the incident lights IL according to an input signal. Each of the pixel portions PP included in the liquid crystal display 80 includes one transparent pixel electrode 77, a part of the common electrode 75, a part of the light distribution films 76 and 78, and a part of the liquid crystal layer 71. The illumination lights IL can be made incident on the pixel portions PP with a tilt angle of the illumination lights IL adjusted by elements of the prism array 72a provided on the first substrate 72 on the incident side. A black matrix 79 of a lattice shape is provided between the first substrate 72 and the common electrode 75 to distinguish the pixel portions PP.

The prism array 72a, which is the optical-directivity changing section 138, is incorporated instead of the optical-directivity changing section 38 in the first embodiment shown in FIG. 9A and the like. As in the case of the first embodiment, the prism array 72a bends, concerning the longitudinal direction, illumination light made incident from the backlight guide section 31b to the outer side and bends, concerning the lateral direction, the illumination light made incident from the backlight guide section 31b to the inner side.

Specifically, as shown in a longitudinal cross-section of FIG. 13A, the prism array 72a includes the prism elements PE, the wedge angle ω of which gradually increases toward the upper side (the +Y side) in a section further on the upper side than the center. The illumination lights IL uniformly emitted from the backlight guide section 31b shown in FIG. 2A are made incident on the liquid crystal display device 80 with the upward tilt angle ε given when the illumination lights IL pass through prism elements PE. Although not shown in the figure, the prism array 72a includes the prism elements PE, the wedge angle ω of which gradually increases toward the lower side (the −Y side) in a section further on the lower side than the center. The illumination lights IL uniformly emitted from the backlight guide section 31b are made incident on the liquid crystal display device 80 with the downward tilt angle ε given when the illumination lights IL pass through refracting surfaces or deflecting surfaces of the prism elements PE. As in the case of the first embodiment, a distribution of the tilt angle ε corresponds to the angle characteristic of light beam capturing shown in FIG. 6B. Consequently, the liquid crystal display device 132 is illuminated by the illumination lights IL having the tilt angle ε corresponding to the emission angle μ of the effective image lights FL extracted from the liquid crystal display device 132 and effectively utilized for virtual image formation. Therefore, illumination light is not wastefully used and luminance spots of a virtual image can be reduced.

As shown in a lateral cross-section of FIG. 13B, the prism array 72a includes the prism elements PE, the wedge angle ζ of which gradually increases toward the left side (the −X side) in a section further on the right side than the center. The illumination lights IL uniformly emitted from the backlight guide section 31b shown in FIG. 2A are made incident on the liquid crystal display device 80 with the leftward tilt angle η given when the illumination lights IL pass through the prism elements PE. Although not shown in the figure, the prism array 72a includes the prism elements PE, the wedge angle ζ of which gradually increases toward the right side (the +X side) in a section further on the left side than the center. The illumination lights IL uniformly emitted from the backlight guide section 31b are made incident on the liquid crystal display device 80 with the downward tilt angle η given when the illumination lights IL pass through the refracting surfaces or the deflecting surfaces of the prism elements PE. As in the case of the first embodiment, a distribution of the tilt angle η corresponds to the angle characteristic of light beam capturing shown in FIG. 7B. Consequently, the liquid crystal display device 132 is illuminated by the illumination lights IL having the tilt angle η corresponding to the emission angle θ of the effective image lights FL extracted from the liquid crystal display device 132 and effectively utilized for virtual image formation. Therefore, illumination light is not wastefully used and luminance spots of a virtual image can be reduced.

As explained above, in the case of this embodiment, an image display device includes the liquid crystal display device 132 excluding the optical-directivity changing section 138 and the illuminating device 31.

Figure 14A:
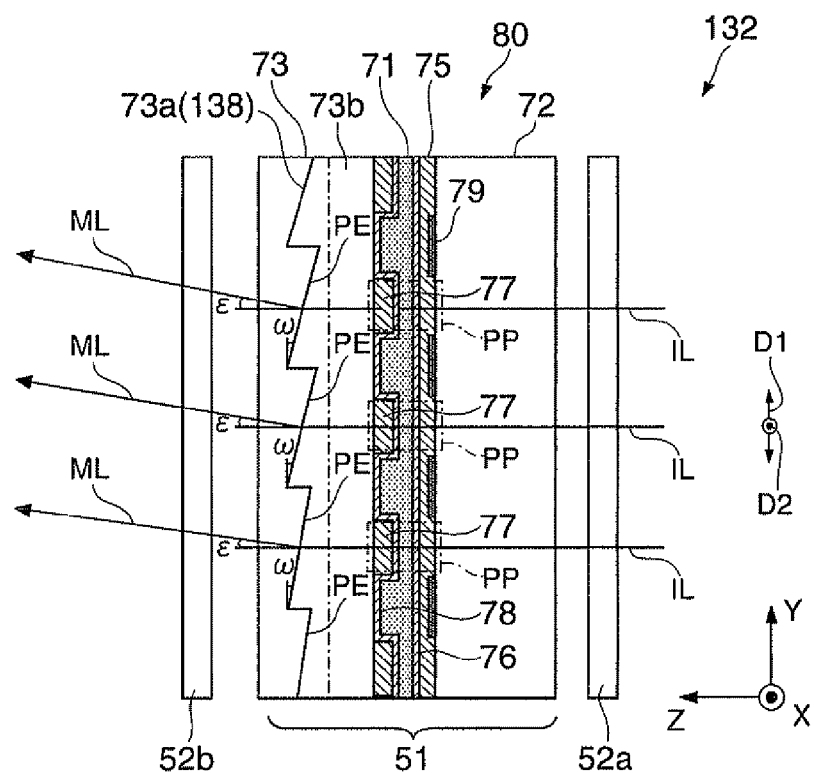
FIGS. 14A and 14B are diagrams for explaining a modification of the second embodiment.
Figure 14B:
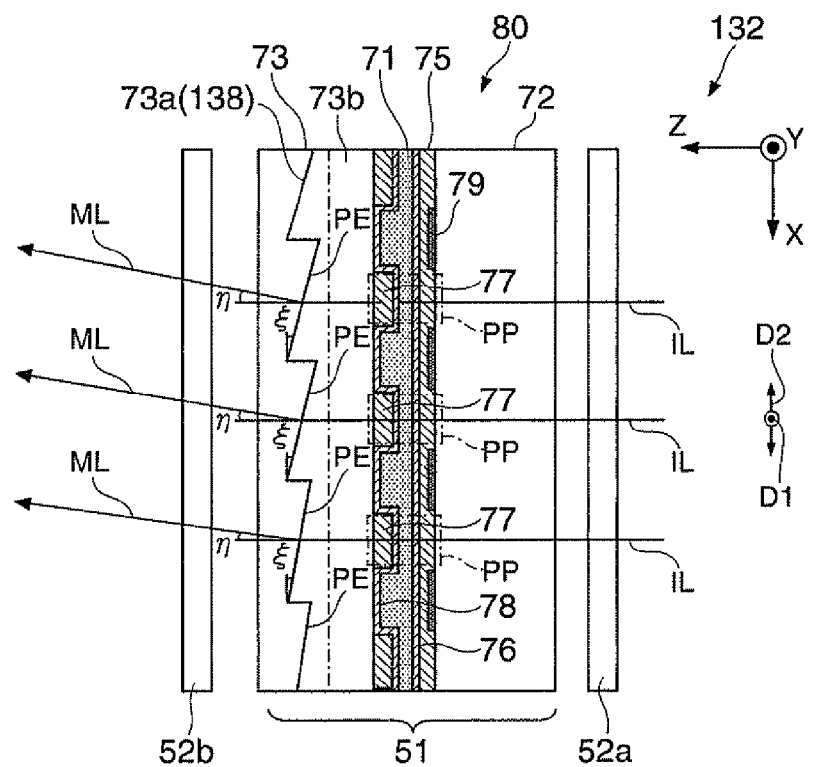

FIGS. 14A and 14B are a modification of the liquid crystal display device 132 shown in FIGS. 13A and 13B. In this case, a prism array 73a is embedded in the second substrate 73 on the emission side. Specifically, the second substrate 73 includes a prism array 73a extending along the YZ plane perpendicular to the optical axis AX and a main body section 73b arranged on the inner side of the prism array 73a. The prism array 73a includes a large number of prism elements PE two-dimensionally arrayed in a predetermined pattern corresponding to the transparent pixel electrodes 77, i.e., the pixel portions PP. As shown in FIG. 14A, the prism array 73a includes the prism elements PE, the wedge angle ω of which gradually increases toward the upper side (the +Y side) in a section further on the upper side than the center of the longitudinal cross-section. The image lights ML emitted from the liquid crystal device 80 are emitted from the liquid crystal display device 132 with the upward tilt angle ε given when the image lights ML pass through the refracting surfaces or the deflecting surfaces of the prism elements PE. As shown in FIG. 14B, the prism array 73a includes the prism elements PE, the wedge angle ζ of which gradually increases toward the left side (the −X side) in a section further on the right side than the center of the lateral cross-section. The image lights ML emitted from the liquid crystal device 80 are emitted from the liquid crystal display device 132 with the upward tilt angle η given when the image lights ML pass through the refracting surfaces or the deflecting surfaces of the prism elements PE.

In the virtual image display apparatus 100 according to this embodiment, an emitting direction of the image lights ML can be adjusted in a pixel unit of the liquid crystal display device 132. Consequently, even when the tilt of the effective image lights FL (image lights ML) emitted from the liquid crystal display device 132 and effectively captured into the eye EY of the observer has deviation to correspond to an area on a screen, it is possible to form the image lights ML having directivity corresponding to the deviation. It is possible to suppress occurrence of luminance spots to improve efficiency of use of illumination light.

The prism array 73a can also be externally attached to the liquid crystal display device 132, for example, bonded to the outer sides of the first and second substrates 72 and 73.

Third Embodiment

A virtual image display apparatus according to a third embodiment is explained below. The virtual image display apparatus according to this embodiment is a modification of the virtual image display apparatus 100 according to the first or second embodiment. Unless specifically explained, the virtual image display apparatus is the same as the virtual image display apparatus 100 according to the first embodiment.

Figure 15A:
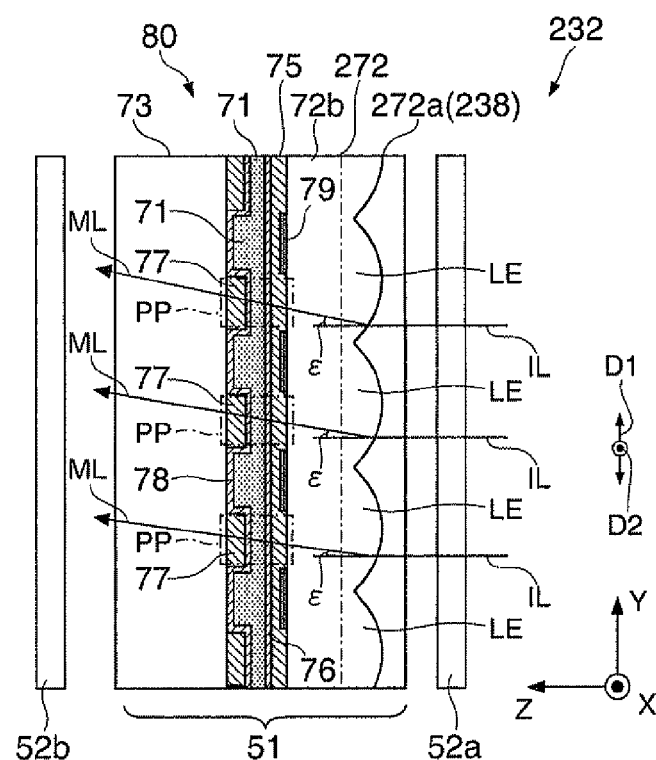
FIGS. 15A and 15B are respectively a longitudinal sectional view and a lateral sectional view for explaining a liquid crystal display device and the like incorporated in a virtual image display apparatus according to a third embodiment.
Figure 15B:
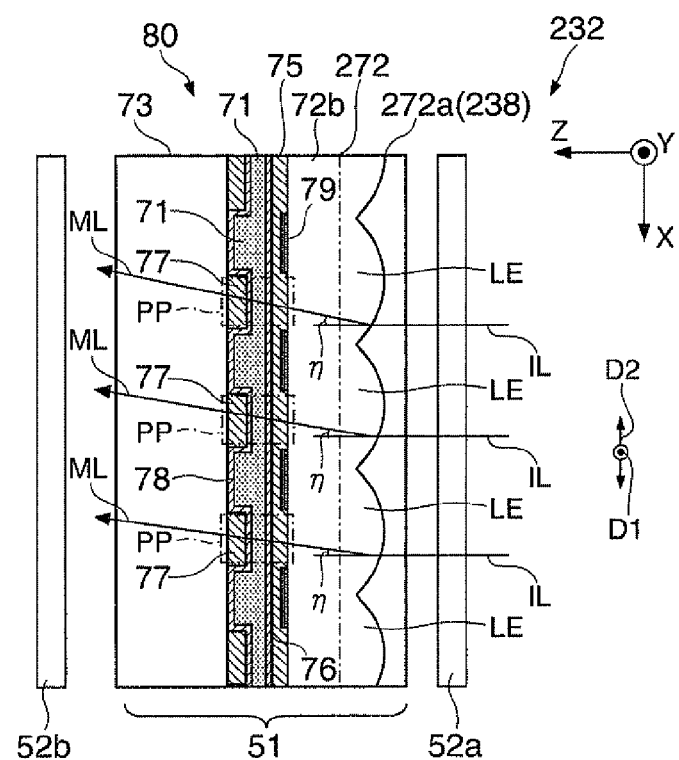

A liquid crystal display device (an image-light forming section) 232 shown in FIGS. 15A and 15B is a light-transmissive liquid crystal display element incorporating an optical-directivity changing section 238 for forming a non-uniform distribution concerning the directivity of image light. In the case of this embodiment, an image display device includes the liquid crystal display device (the image-light forming section) 232 excluding the optical-directivity changing section 238 and the illuminating device 31 not shown in the figure.

In the liquid crystal panel 51 of the liquid crystal display device 232, the first substrate 72 on the light incident side includes a micro lens array 272a extending along the YZ plane perpendicular to the optical axis AX and a main body section 72b arranged on the inner side of the micro lens array 272a. The micro lens array 272a functions as the optical-directivity changing section 238 that adjusts the directivity of the image lights ML. The micro lens array 272a includes a large number of lens elements LE two-dimensionally arrayed in a predetermined pattern corresponding to the transparent pixel electrodes 77, i.e., the pixel portions PP. As shown in FIG. 15A, a pitch Pm in the Y direction of the micro lens array 272a is slightly larger than a pitch Pc in the Y direction of the pixel portions PP. Therefore, concerning the Y direction or the longitudinal direction, the optical axes or the centers of the lens elements LE are gradually decentered from the centers of the pixel portions PP. In other words, in the micro lens array 272a, the decenter gradually increases toward the upper side (the −Y side) in the section further on the upper side than the center. The decenter gradually increases toward the lower side (the −Y side) in a section further on the lower side than the center as well. As shown in FIG. 15B, a pitch Pm' in the x direction of the micro lens array 272a is slightly larger than a pitch Pc' in the Y direction of the pixel portions PP. Therefore, concerning the X direction or the lateral direction, the optical axes or the centers of the lens elements LE are gradually decentered from the centers of the pixel portions PP. In other words, in the micro lens array 272a, the decenter gradually increases toward the left side (the −X side) in the section further on the right side than the center. The decenter gradually increases toward the right side (the +X side) in a section further on the left side than the center as well.

The illumination lights IL uniformly emitted from the backlight guide section 31b shown in FIG. 2A are made incident on the liquid crystal device 80 with the upward or downward tilt angle ε given and with the rightward or leftward tilt angle η given such that the illumination lights IL are diffused rather than being simply focused when the illumination lights IL pass through the refracting surface or the deflecting surface of the micro lens array 272a. As in the case of the first embodiment, a distribution of the tilt angles ε and η corresponds to the angle characteristics of light beam capturing shown in FIG. 6B and FIG. 7B. Consequently, the liquid crystal display device 232 is illuminated by the illumination lights IL having the tilt angles ε and η corresponding to the emission angles μ and θ of the image light FL extracted from the liquid crystal display device 232 and effectively utilized for virtual image formation. Therefore, illumination light is not wastefully used and luminance spots of a virtual image can be reduced. When the micro lens array 272a is used, light beams blocked by the black matrix 79 can be reduced by focusing the illumination lights IL and further improvement of light use efficiency can be expected.

Figure 16A:
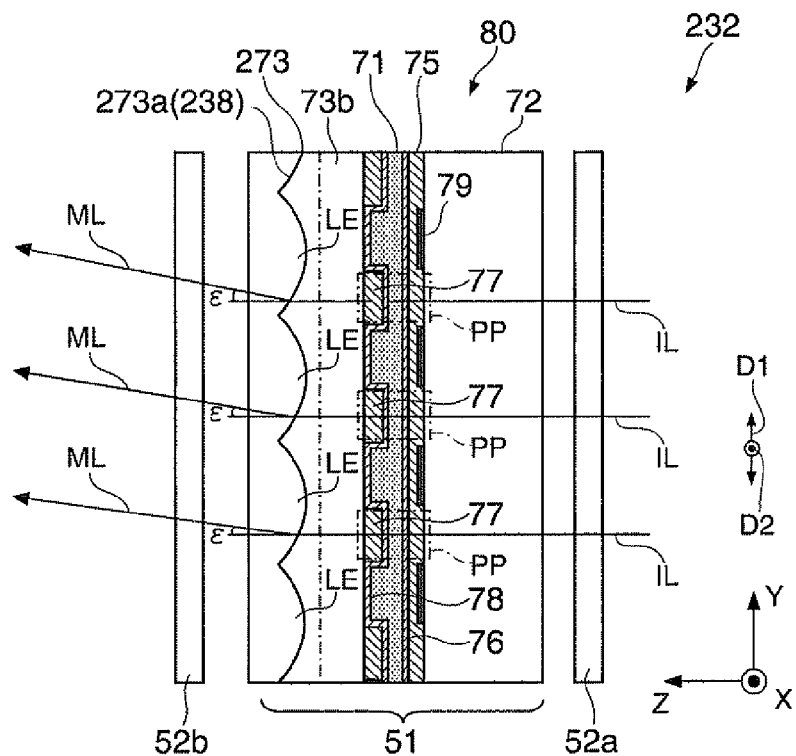
FIGS. 16A and 16B are diagrams for explaining a modification of the second embodiment.
Figure 16B:
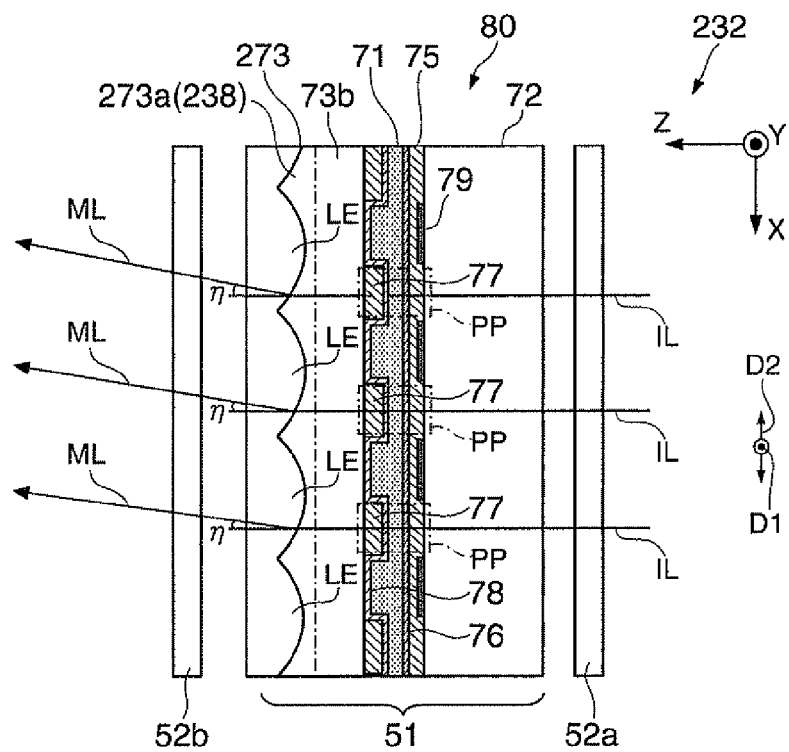

FIGS. 16A and 16B are a modification of the liquid crystal display device 232 shown in FIGS. 15A and 15B. In this case, a micro lens array 273a is embedded in a second substrate 273 on the emission side. Specifically, the second substrate 273 includes a micro lens array 273a extending along the YZ plane perpendicular to the optical axis AX and a main body section 73b arranged on the inner side of the micro lens array 273a. The micro lens array 273a includes the large number of lens elements LE two-dimensionally arrayed in a predetermined pattern corresponding to the transparent pixel electrodes 77, i.e., the pixel portions PP. As shown in a longitudinal cross-section of FIG. 16A, the micro lens array 273a has a structure in which the decenter gradually increases toward the upper side (the +Y side) in a section further on the upper side than the center. The image lights ML emitted from the liquid crystal device 80 are emitted from the liquid crystal display device 232 with the upward tilt angle ε given when the image lights ML pass through the refracting surfaces or the deflecting surfaces of the lens elements LE. Although not shown in the figure, the decenter gradually increases toward the lower side (the −Y side) in a section further on the lower side than the center. As shown in a lateral cross-section of FIG. 16B, the micro lens array 273a has a structure in which the decenter gradually increases toward the left side (the −X side) in a section further on the right side than the center and the decenter gradually increases toward the right side (the +X side) in a section further on the left side than the center.

In the liquid crystal display device 232 shown in FIGS. 16A and 16B, the micro lens array 272a as the optical-directivity changing section 238 can be embedded in the first substrate 72 on the incident side as well.

In the virtual image display apparatus 100 according to this embodiment, an emitting direction of the image lights ML can be adjusted in a pixel unit of the liquid crystal display device 232. Consequently, even when the tilt of the effective image lights FL (image lights ML) emitted from the liquid crystal display device 232 and effectively captured into the eye EY of the observer has deviation to correspond to an area on a screen, it is possible to form the image lights ML having directivity corresponding to the deviation. It is possible to suppress occurrence of luminance spots to improve efficiency of use of illumination light.

The prism array 73a can also be externally attached to the liquid crystal display device 232, for example, bonded to the outer sides of the first and second substrates 72 and 73.

Fourth Embodiment

A virtual image display apparatus according to a fourth embodiment is explained below. The virtual image display apparatus according to this embodiment is a modification of the virtual image display apparatus 100 according to the first embodiment. Unless specifically explained, the virtual image display apparatus is the same as the virtual image display apparatus 100 according to the first embodiment.

Figure 17:
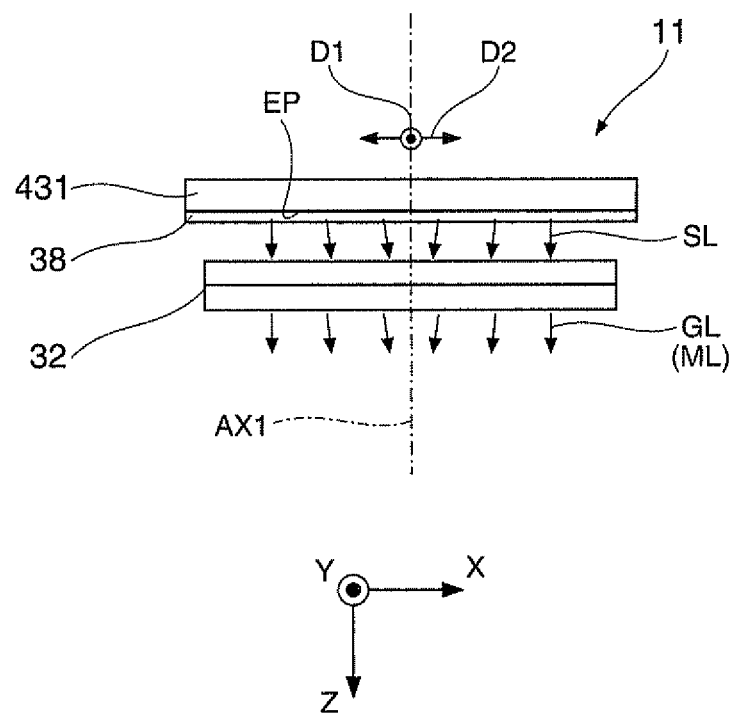
FIG. 17 is a diagram for explaining a main part of a virtual image display apparatus according to a fourth embodiment.

As shown in FIG. 17, the image display device 11 includes an illuminating device 431, which is a surface-light-source-like light emitting section, instead of the light source 31a shown in FIG. 2A. The backlight guide section 31b is unnecessary. In other words, the surface-light-source-like light emitting section is a planar light source that spreads two-dimensionally in itself. The optical-directivity changing section 38 is arranged between the illuminating device 431 and the liquid crystal display device (the image-light forming section) 32. More specifically, the optical-directivity changing section 38 is bonded on the emission surface EP on the liquid crystal display device (the image-light forming section) 32 side of the illuminating device 431 and integrated with the emission surface EP. As in the case of the first embodiment, the optical-directivity changing section 38 can form a distribution of desired directivity in the illumination lights SL and, as a result, can give a distribution of desired directivity to the image lights ML as well. In the surface-emission illuminating device (the surface-light-source-like light emitting section) 431, for example, light emitting elements such as organic EL elements or LEDs are two-dimensionally arrayed uniformly.

Fifth Embodiment

A virtual image display apparatus according to a fifth embodiment is explained below. The virtual image display apparatus according to this embodiment is a modification of the virtual image display apparatus 100 according to the first to fourth embodiments. Unless specifically explained, the virtual image display apparatus is the same as the virtual image display apparatus 100 according to the first embodiment.

Figure 18:
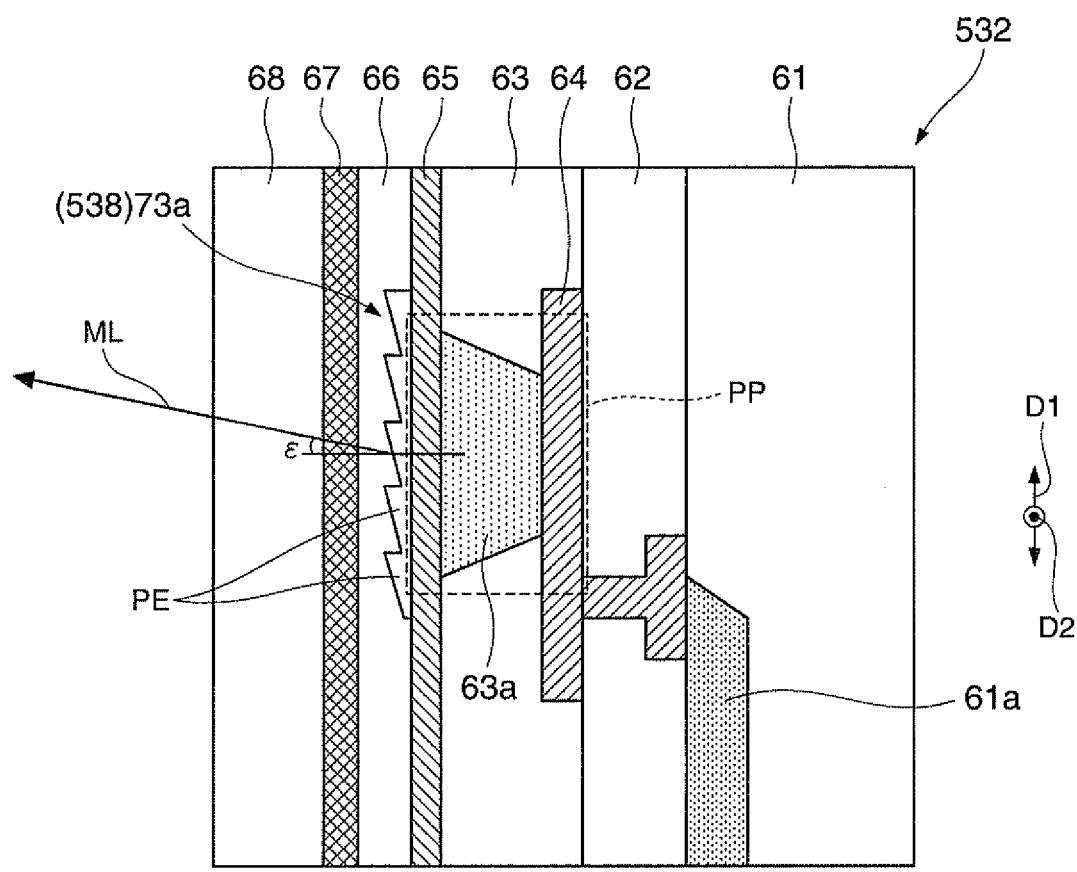
FIG. 18 is a partially enlarged sectional view for explaining a virtual image display apparatus according to a fifth embodiment.

FIG. 18 is a diagram for explaining the image display device 11 incorporated in the virtual image display apparatus according to the fifth embodiment. In the case of the virtual image display apparatus according to the fifth embodiment, in the image display device 11 shown in FIG. 2A, a self-emitting organic EL display device (EL display element) 532 is used instead of the optical-modulation liquid crystal display devices (image-light forming sections) 32 and 232 or the like.

In this case, the illuminating device 31 is unnecessary. Desired directivity is given to an emitting direction of the image light ML by the prism array 73a embedded in the organic EL display device (EL display element) 532.

The organic EL display device 532 shown in the figure is explained using an enlarged longitudinal cross-section of one pixel portion PP and the periphery of the pixel portion PP. The structure of the organic EL display device 532 is briefly explained. The organic EL display device 532 is formed on a Si substrate 61 and has a structure in which an insulating layer 62, a light emitting layer 63, a light-transmissive cathode layer 65, a bonding layer 66, a sealing layer 67, and a light transmission substrate 68 are sequentially laminated on the Si substrate 61. On the Si substrate 61, for example, a driving circuit for the organic EL display device 532 is formed. An electrode area 61a extending from the driving circuit is connected to an anode 64 piercing through the insulating layer 62 and extending to the light emitting layer 63. The light emitting layer 63 includes a light emitting area 63a provided between the anode 64 and the light-transmissive cathode layer 65. On the light-transmissive cathode layer 65, the light transmission substrate 68 is bonded across the bonding layer 66 and the sealing layer 67. In the bonding layer 66 provided between the light-transmissive cathode layer and the sealing layer 67, the prism array 73a is formed as the optical-directivity changing section 538 to be embedded in the bonding layer 66.

The image light ML from the pixel portions PP of the organic EL display device 532 shown in the figure is given, for example, the upward tilt angle ε when the image light ML passes through refracting surfaces or deflecting surfaces of the prism array 73a. In the entire organic EL display device 532, as in the case of the second and third embodiments, for example, the image light ML having directivity in a two-dimensional distribution corresponding to light beam capturing peaks indicated by the arrows DA1 and DA2 in FIG. 8 can be formed.

The prism array 73a as the optical-directivity changing section 538 includes the plural prism elements PE, tilt angles of which are adjusted, in order to adjust the directivity of the image light ML. In an example shown in the figure, the prism array 73a is formed to be separated in a pixel unit of the organic EL display device 532. However, the prism array 73a can also be formed over the entire display surface of the organic EL display device 532. In the example shown in the figure, the plural prism elements PE are provided for one pixel. However, the size of a single prism element PE can be increased to cover one pixel.

In the virtual image display apparatus 100 according to this embodiment, an emitting direction of the image light ML can be adjusted in a pixel unit of the organic EL display device 532. Consequently, even when the tilt of effective image light FL (image light ML) emitted from the organic EL display device 532 and effectively captured into the eye EY of the observer has local deviation to correspond to an area on a screen, it is possible to form the image light ML having directivity corresponding to the deviation. It is possible to suppress occurrence of luminance spots to improve efficiency of use of illumination light.

The prism array 73a can be replaced with a lens array having a function of causing a light beam to converge. The prism array 73a is not always arranged in the organic EL display device 532 and can be arranged on a light emission surface of the organic EL display device 532.

In the above explanation, the organic EL display device 532 is used as a self-emitting display device incorporated in the image display device 11. However, the self-emitting display device is not limited to the organic EL display device 532 and can be a self-emitting display device of another type different from organic EL.

Sixth Embodiment

A virtual image display apparatus according to a sixth embodiment is explained below. The virtual image display apparatus according to this embodiment is a modification of the virtual image display apparatus 100 according to the first to fifth embodiments. Unless specifically explained, the virtual image display apparatus is the same as the virtual image display apparatus 100 according to the first to fifth embodiments.

Figure 19A:
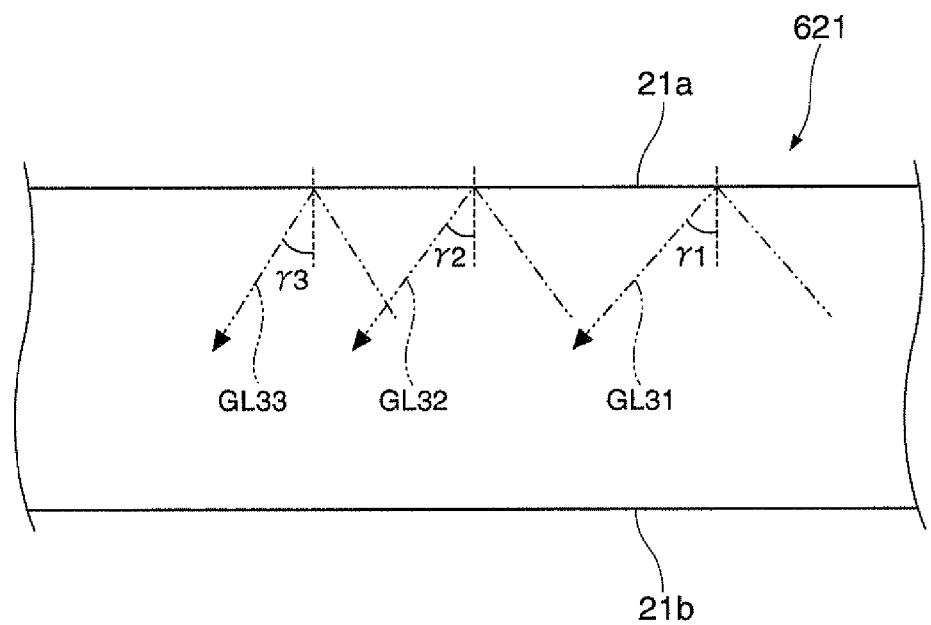
FIGS. 19A and 19B are diagrams for explaining a virtual image display apparatus according to a sixth embodiment.
Figure 19B:
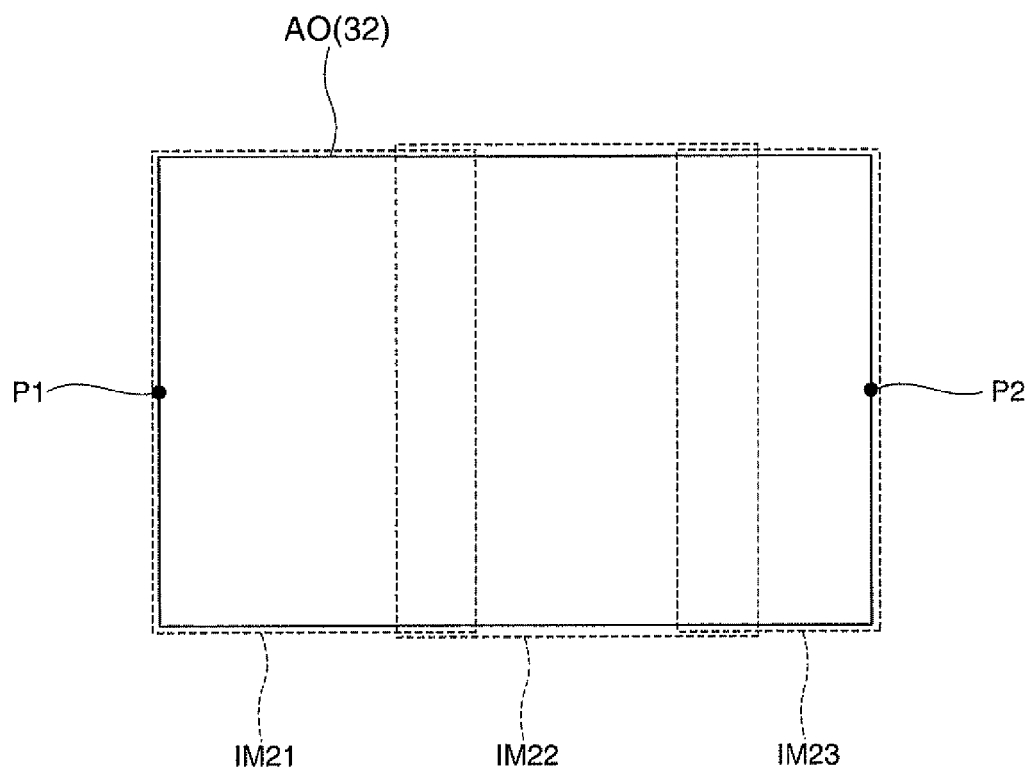

FIG. 19A is a diagram for explaining a light guide member 621 obtained by modifying the light guide member 21 shown in FIG. 2A and the like. In the above explanation, the image light propagating through the light guide member 21 is totally reflected at only the two reflection angles γ1 and γ2 with respect to the first and second reflection surfaces 21a and 21b. However, as in the light guide member 621 according to the modification shown in FIG. 19A, it is also possible to allow image lights GL31, GL32, and GL33 of three components to be respectively totally reflected at reflection angles γ1, γ2, and γ3 (γ1>γ2>γ3). In this case, the image lights GL emitted from the liquid crystal display device 32 are propagated in three modes, combined in the position of the eye EY of the observer, and recognized as a virtual image. In this case, as shown in FIG. 19B, a projected image IM21 totally reflected, for example, three times in total is formed on the left side of an effective display area A0, a projected image IM22 totally reflected, for example, five times in total is formed close to the center of the effective display area A0, and a projected image IM23 totally reflected, for example, seven times in total is formed on the right side of the effective display area A0.

Seventh Embodiment

A virtual image display apparatus according to a seventh embodiment is explained below. The virtual image display apparatus according to this embodiment is modification of the virtual image display apparatus 100 according to the first to sixth embodiments. Unless specifically explained, the virtual image display apparatus is the same as the virtual image display apparatus 100 according to the first to sixth embodiments.

Figure 20A:
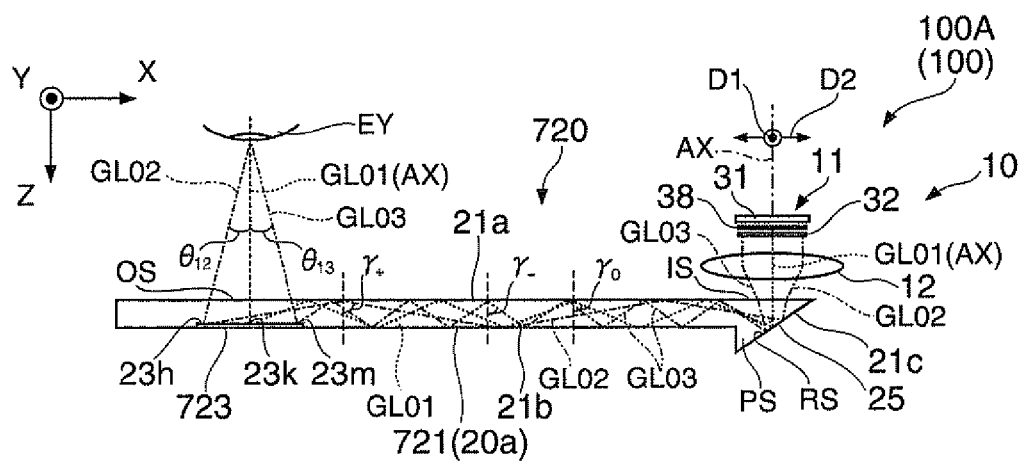
FIG. 20A is a sectional view showing a virtual image display apparatus according to a seventh embodiment.
Figure 20B:
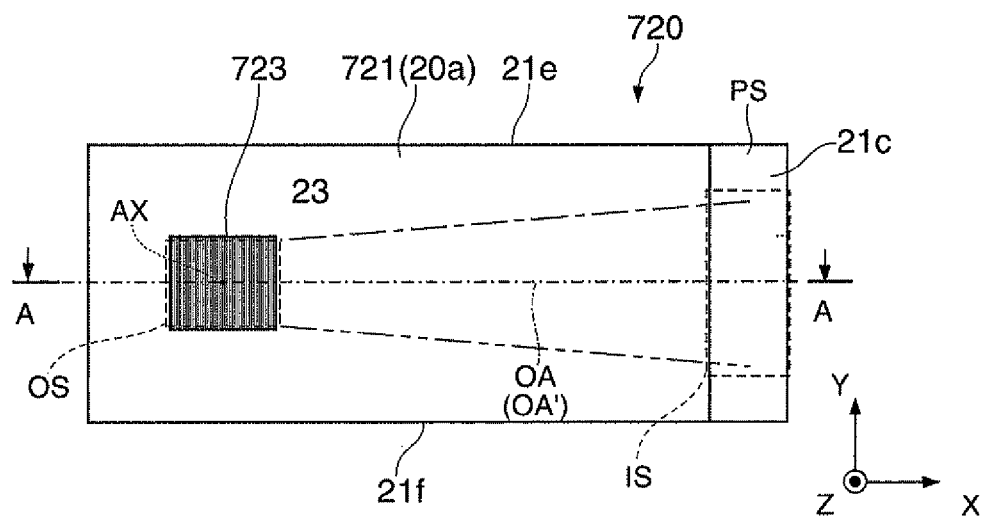
FIGS. 20B and 20C are respectively a front view and a plan view of a light guide device.
Figure 20C:
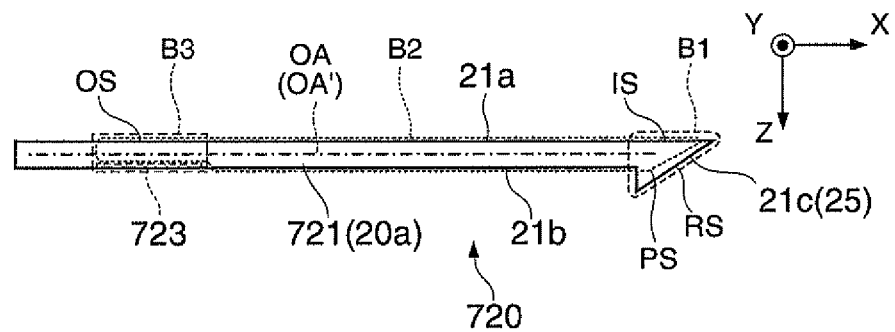

The virtual image display apparatus 100 shown in FIGS. 20A to 20C includes the image forming device 10 and the light guide device 720 as a set. The light guide device 720 includes a light guide member 721 as a part thereof. The light guide member 721 includes a light guide body section 20a and an angle converting section 723, which is an image extracting section. FIG. 20A corresponds to an A-A cross-section of the light guide member 721 shown in FIG. 20B.

The overall external view of the light guide member 721 is formed by the light guide body section 20a, which is a flat plate extending in parallel to the YZ plane in the figure. The light guide member 721 has as sides, the first reflection surface 21a, the second reflection surface 21b, and the third reflection surface 21c. The light guide member 721 has an upper surface 21e and a lower surface 21f adjacent to the first to third reflection surfaces 21a to 21c and opposed to each other. The light guide member 721 includes the angle converting section 723 including a large number of very small mirrors embedded in the light guide body section 20a at an end in a longitudinal direction of the light guide member 721. The light guide member 721 includes the prism section PS formed to expand the light guide body section 20a at the other end in the longitudinal direction and the third reflection surface 21c attached to the prism section PS. The light guide member 721 is an integral component. However, as in the case of the first embodiment, the light guide member 721 can be considered to be divided into the light incident section B1, the light guide section B2, and the light emitting section B3. The light incident section 31 is a section including the third reflection surface 21c and the light incident surface IS explained later. The light guide section B2 is a section including the first and second reflection surfaces 21a and 21b. The light emitting section B3 is a section including the angle converting section 723 and the light emission surface OS explained later.

The light guide body section 20a is formed of a light-transmissive resin material or the like. The light guide body section 20a includes, on a plane on the rear side or the observer side parallel to the XY plane and opposed to the image forming device 10, the light incident surface IS that captures image light from the image forming device 10 and the light emission surface OS that emits the image light to the eye EY of the observer. The light guide body section 20a includes, as a side of the prism section PS, a rectangular slope RS other than the light incident surface IS. The mirror layer 25 is formed on the slope RS to cover the slope RS. The mirror layer 25 functions as, by cooperating with the slope RS, the third reflection surface 21c, which is an incident light bending section arranged to be tilted with respect to the light incident surface IS. The third reflection surface 21c bends image light, which is made incident from the light incident surface IS and travels in the +Z direction as a whole, to travel in the -X direction deviating to the -Z direction as a whole to surely focus the image light in the light guide body section 20a. In the light guide body section 20a, the angle converting section 723, which is a micro structure, is formed along a plane on the rear side of the light emission surface OS. The light guide body section 20a extends from the third reflection surface 21c on the entrance side to the angle converting section 723 on the depth side and leads the image light, which is made incident on the inside of the light guide body section 20a via the prism section PS, to the angle converting section 723.

The first and second reflection surfaces 21a and 21b of the light guide member 721 are principal planes of the tabular light guide body section 20a and function as two planes opposed to each other and extending in parallel to the XY plane to totally reflect image light bent by the prism section PS. Image light reflected on the third reflection surface 21c is first made incident on the first reflection surface 21a and totally reflected. Subsequently, the image light is made incident on the second reflection surface 21b and totally reflected. This operation is repeated, whereby the image light is guided to the depth side of the light guide device 720, i.e., the -X side on which the angle converting section 723 is provided.

The angle converting section 723 arranged to be opposed to the light emission surface OS of the light guide body section 20a is formed along an extended plane of the second reflection surface 21b and near the extended plane on the depth side (the -X side) of the light guide member 721. The angle converting section 723 reflects image light, which is made incident through the light guide member 721 and the first and second reflection surfaces 21a and 21b, at a predetermined angle and bends the image light to the light emission surface OS side. In other words, the angle converting section 723 converts the angle of the image light. It is assumed that image light made incident on the angle converting section 723 first is a target to be extracted as virtual image light. A detailed structure of the angle converting section 723 is explained later with reference to FIG. 21A and the like.

A refractive index n of a transparent resin material used for the light guide body section 20a is equal to or higher than 1.5. Since the transparent resin material having the relatively high refractive index is used for the light guide member 721, it is easy to guide image light on the inside of the light guide member 721 and it is possible to set an angle of view of the image light on the inside of the light guide member 721 relatively small.

Image light emitted from the image forming device 10 and made incident on the light guide member 721 from the light incident surface IS is uniformly reflected and bent on the third reflection surface 21c. The image light is repeatedly totally reflected on the first and second reflection surfaces 21a and 21b of the light guide member 721 and travels while having a fixed spread substantially along the optical axis AX. Further, the image light is bent at a proper angle in the angle converting section 723 to be changed to an extractable state. Finally, the image light is emitted to the outside from the light emission surface OS. The image light emitted to the outside from the light emission surface OS is made incident on the eye EY of the observer as virtual image light. The virtual image light is focused on the retina of the observer, whereby the observer can recognize image light such as video light by a virtual image.

An optical path of image light in the light guide member 721 is explained below. The light guide device 720 in the seventh embodiment functions in the same manner as the light guide device 20 shown in FIG. 1A concerning the longitudinal first direction D1 (the Y direction). On the other hand, the light guide device 720 guides image light in a large number of propagation modes concerning the lateral second direction D2 (the X direction). The light guide device 720 is different from the light guide device 20 shown in FIG. 2A that guides image light in two propagation modes.

As shown in FIG. 20A, in image light emitted from the liquid crystal display device (the image-light forming section) 32 of the image display device 11, a component indicated by a dotted line emitted from the center of the emission surface 32a is represented as image light GL01, a component indicated by an alternate long and short dash line emitted from the right side on the paper surface (the +X side) of the emission surface 32a is represented as image light GL02, and a component indicated by an alternate long and two short dashes line emitted from the left side on the paper surface (the −X side) of the emission surface 32a is represented as GL03.

After being made incident from the light incident surface Is of the light guide member 721, the main components of the image lights GL01, GL02, and GL03 passed through the projection optical system 12 repeat total reflection at angles different from one another on the first and second reflection surfaces 21a and 21b. Specifically, among the image lights GL01, GL02, and GL03, the image light GL01 emitted from the center of the emission surface 32a of the liquid crystal display device (the image-light forming section) 32 is, after being made incident on the light incident surface IS as parallel light beams and reflected on the third reflection surface 21c, made incident on the first reflection surface 21a of the light guide member 721 at a standard reflection angle and totally reflected. Thereafter, the image light GL01 repeats total reflection on the first and second reflection surfaces 21a and 21b while keeping the standard reflection angle $\gamma_0$. The image light GL01 is totally reflected N times (N is a natural number) on the first and second reflection surface 21a and 21b and made incident on a center section 23k of the angle converting section 723. The image light GL01 is reflected in the center section 23k at a predetermined angle and emitted from the light emission surface OS as parallel light beams in the optical axis AX direction perpendicular to the XY plane including the light emission surface OS. The image light GL02 emitted from one end side (the +X side) of the emission surface 32a of the liquid crystal display device 32 is, after being made incident on the light incident surface IS as parallel light beams after passage through the projection optical system 12 and reflected on the third reflection surface 21c, made incident on the first reflection surface 21a of the light guide member 721 at a maximum reflection angle $\gamma_+$ and totally reflected. The image light GL02 is totally reflected, for example, N−M times (M is a natural number) on the first and second reflection surfaces 21a and 21b, reflected in a peripheral section 23h at the end of the depth side (the −X side) of the angle converting section 723 at a predetermined angle and emitted from the light emission surface OS as parallel light beams in a predetermined angle direction. An emission angle in the emission is set to an angle for returning the image light GL02 to the third reflection surface 21c side and is an acute angle with respect to a +X axis. The image light GL03 emitted from the other end side (the −X side) of the emission surface 32a of the liquid crystal display device is, after being made incident on the light incident surface IS as parallel light beams after passage through the projection optical system 12 and reflected on the third reflection surface 21c, made incident on the first reflection surface 21a of the light guide member 721 at a minimum reflection angle $\gamma_-$ and totally reflected. The image light GL03 is totally reflected, for example, N+M times on the first and second reflection surfaces 21a and 21b, reflected in a peripheral section 23m at the end of the entrance side (the +X side) of the angle converting section 723 at a predetermined angle and emitted from the light emission surface OS as parallel light beams in a predetermined angle direction. An emission angle in the emission is set to an angle for separating the image light GL03 from the third reflection surface 21c side and is an obtuse angle with respect to the +X axis.

When a value of the refractive index n of the transparent resin material used for the light guide member 721 is set to n=1.5 as an example, a value of a critical angle $\gamma c$ of the transparent resin material is $\gamma c \equiv 41.8°$. When the value of the refractive index n is set to n=1.6, the value of the critical angle $\gamma c$ is $\gamma c \equiv 38.7°$. The minimum reflection angle $\gamma_-$ among the reflection angles $\gamma_0$, $\gamma_+$, and $\gamma_-$ of the image lights GL01, GL02, and GL03 is set to a value larger than the critical angle $\gamma c$, whereby a total reflection condition in the light guide member 721 can be satisfied concerning necessary image light.

The structure of the angle converting section 723 and bending of an optical path of image light by the angle converting section 723 are explained in detail below with reference to FIG. 21A and the like.

First, the structure of the angle converting section 723 is explained. The angle converting section 723 includes a large number of linear reflection units 2c arrayed in a stripe shape. Specifically, the angle converting section 723 is configured by arraying the slender reflection units 2c, which extend in the Y direction, along the main light guide direction in which the light guide member 721 extends, i.e., the −X direction at predetermined pitches PT. Each of the reflection units 2c includes, as a set, a first reflection surface 2a, which is one reflection surface section, arranged on the depth side, i.e., an optical path downstream side and a second reflection surface 2b, which is another reflection surface section, arranged on the entrance side, i.e., an optical path upstream side. At least the second reflection surface 2b is a partial reflection surface that can transmit a part of light and enables the observer to observe an external image seeing through the second reflection surface 2b. The reflection unit 2c is formed in a V shape or a wedge shape in XZ sectional view by the first and second reflection surfaces 2a and 2b adjacent to each other. More specifically, the first and second reflection surfaces 2a and 2b linearly extend in a longitudinal direction set in the Y direction, i.e., a direction extending perpendicularly to a ±X direction, which is parallel to the second reflection surface 21b and is an array direction in which the reflection units 2c are arrayed. Further, the first and second reflection surfaces 2a and 2b tilt, with the longitudinal direction as an axis, respectively at different angles with respect to the second reflection surface 21b (angles different with respect to the XY plane). As a result, the first reflection surfaces 2a are periodically repeatedly arrayed and extend in parallel to one another. The second reflection surfaces 2b are also periodically repeatedly arrayed and extend in parallel to one another. In a specific example shown in FIGS. 21A to 21C and the like, the first reflection surfaces 2a extend along a direction substantially perpendicular to the second reflection surface 21b (the Z direction). The second reflection surfaces 2b extend in a direction at a predetermined angle (a relative angle) δ in the clockwise direction with respect to the first reflection surfaces 2a corresponding to the second reflection surfaces 2b. The relative angle δ is set to, for example, 54.7° in the specific example.

In the specific example shown in FIG. 21A and the like, the first reflection surfaces 2a are substantially perpendicular to the second reflection surface 21b. However, the direction of the first reflection surfaces 2a is adjusted as appropriate according to the specifications of the light guide device 720 and can be set, with respect to the second reflection surface 21b, at any tilt angle in a range of, for example, 80° to 100° counterclockwise with reference to the +X direction. The direction of the second reflection surfaces 2b can be set at any tilt angle in a range of, for example, 30° to 40° counterclockwise with reference to the +X direction. As a result, the second reflection surfaces 2b have any relative angle in a range of 40° to 70° with respect to the first reflection surface 2a.

The reflection unit 2c including a pair of the reflection surfaces 2a and 2b is formed by, for example, applying film formation such as aluminum vapor deposition to one slope of a V groove of a base. Thereafter, the reflection unit 2c is embedded in the light guide device 720 by filling resin.

Bending of optical paths of image lights by the angle converting section 723 is explained in detail below. Among the image lights, the image light GL02 and the image light GL03 made incident on both end sides of the angle converting section 723 are explained below. Since other optical paths are the same as those of the image light GL02 and the image light GL03, illustration and the like of the optical paths are omitted.

As shown in FIGS. 21A and 21B, the image light GL02 guided at the reflection angle $\gamma_+$ of largest total reflection angle among the image lights is made incident on one or more reflection units 2c arranged in the peripheral section 23h on the −X side most distant from the light incident surface IS (see FIG. 20A) in the angle converting section 723. In the reflection unit 2c, the image light GL02 is first reflected on the first reflection surface 2a on the depth side, i.e., the −X side and subsequently reflected on the second reflection surface 2b on the entrance side, i.e., the +X side. The image light GL02 passed through the reflection unit 2c is emitted from the light emission surface OS shown in FIG. 20A and the like without passing through the other reflection units 2c. In other words, the image light GL02 is bent at a desired angle by passing through the angle converting section 723 only once and is extracted to the observer side.

As shown in FIGS. 21A and 21C, the image light GL03 guided at the smallest reflection angle $\gamma_-$ of the total reflection angle is made incident on one or more reflection units 2c arranged in the peripheral section 23m on the +X side closest to the light incident surface IS (see FIG. 20A) in the angle converting section 723. In the reflection unit 2c, the image light GL03, similarly to the image light GL02, is first reflected on the first reflection surface 2a on the depth side, i.e., the −X side and subsequently reflected on the second reflection surface 2b on the entrance side, i.e., the +X side. The image light GL03 passed through the reflection unit 2c is bent at a desired angle by passing through the angle converting section 723 only once without passing through the other reflection units 2c and is extracted to the observer side.

In the case of the reflection in the two stages on the first and second reflection surfaces 2a and 2b explained above, as shown in FIGS. 21B and 21C, all bending angles φ, which are angles formed by directions during incidence and directions during emission of image lights are φ=2(R−δ) (R: right angle). In other words, the bending angles φ are fixed irrespective of values of incident angles on the angle converting section 723, i.e., the reflection angles $\gamma_0$, $\gamma_+$, $\gamma_-$, and the like, which are total reflection angles of the image lights. Consequently, even when a component having a relatively large total reflection angle of image lights is made incident on the peripheral section 23h side on the −X side in the angle converting section 723 and a component having a relatively small total reflection angle is made incident on the peripheral section 23m side on the +x side in the angle converting section 723 as explained above, it is possible to efficiently extract the image lights in an angle state in which the image lights are collected in the eye EY of the observer as a whole. Since the image lights are extracted in such an angle relation, the light guide member 721 can cause the image lights to pass only once without causing the image lights to pass plural times in the angle converting section 723 and makes it possible to extract the image lights as virtual image lights with a small loss.

In an optical design of the shape and the refractive index of the light guide member 721, the shape of the reflection unit 2c included in the angle converting section 723, and the like, angles and the like at which the image lights GL02 and GL03 and the like are guided are adjusted as appropriate. This makes it possible to make image lights emitted from the light emission surface OS incident on the eye EY of the observer as virtual image lights with symmetry of the image lights kept as a whole with the basic image light GL01, i.e., the optical axis AX as the center. An angle $\theta_{12}$ ($\theta_{12}'$ in the light guide device 720) with respect to the X direction or the optical axis AX of the image light GL02 at one end and an angle $\theta_{13}$ ($\theta_{13}'$ in the light guide device 720) with respect to the X direction or the optical axis AX of the image light GL03 at the other end have substantially equal sizes and are in opposite directions. In other words, the image lights are emitted to the eye EY in a state in which the image lights have symmetry with the optical axis AX as the center. In this way, the angle $\theta_{12}$ and the angle $\theta_{13}$ are equal and have symmetry with respect to the optical axis AX. Therefore, the angle $\theta_{12}$ and the angle $\theta_{13}$ are lateral half angles of view, which are half values of a lateral angle of view.

As already explained, the first reflection surfaces 2a or the second reflection surfaces 2b included in a group of the reflection units 2c have the fixed pitch and are parallel to one another. Consequently, image lights, which are virtual image lights, made incident on the eye EY of the observer can be set uniform and deterioration in the quality of an image to be observed can be suppressed. A specific numerical value range of the pitches PT, which is a space among the reflection units 2c included in the angle converting section 723, is set to 0.2 mm or more, more desirably, 0.2 mm to 1.3 mm. Since the pitches PT are in this range, it is possible to prevent image lights that should be extracted from being affected by diffraction in the angle converting section 723 and prevent cross stripes due to the reflection units 2c form being conspicuous to observers.

When the light guide member 721 explained above is used, an angle characteristic of light beam capturing of image lights emitted from the liquid crystal display device 32 and passed through the projection optical system 12 is different in the longitudinal direction and the lateral direction. Concerning the longitudinal first direction D1 (the Y direction), like the tendency or the characteristic shown in FIG. 6A and the like, image light closer to the peripheral section more tends to tilt to the outer side to be captured. On the other hand, concerning the lateral second direction D2 (the X direction), for example, a tilt angle of image light in an overlapping section of images having different numbers of times of reflection on the first and second reflection surfaces 21a and 21b tends to be large. In other words, image light closer to the center less tends to tilt to the inner side to be captured. It is necessary to estimate, with simulation or the like, for each screen position, a peak direction in which image light is captured.

In the case of the virtual image display apparatus 100 according to the seventh embodiment, like the virtual image display apparatus 100 according to the first embodiment, desired directivity can be imparted to image light by the image forming device 10 including the optical-directivity changing section 38. Consequently, even if the tilt of the effective image light ML emitted from the liquid crystal display device 232 and effectively captured into the eye EY of the observer has deviation to correspond to a position or an area on a screen, it is possible to form the image light ML having directivity corresponding to the deviation. It is possible to suppress occurrence of luminance spots to improve efficiency of use of illumination light.

Eighth Embodiment

A virtual image display apparatus according to an eighth embodiment is explained below. The virtual image display apparatus according to this embodiment is a modification of the virtual image display apparatus 100 according to the seventh embodiment. Unless specifically explained, the virtual image display apparatus is the same as the virtual image display apparatus 100 according to the seventh embodiment.

In the case of this embodiment, concerning the lateral second direction D2 (the X direction), luminance spots are suppressed to a low level. Therefore, concerning only the longitudinal first direction D1 (the Y direction), the directivity of the image light ML is controlled and occurrence of luminance spots is suppressed to improve efficiency of use of illumination light.

Figure 22A:
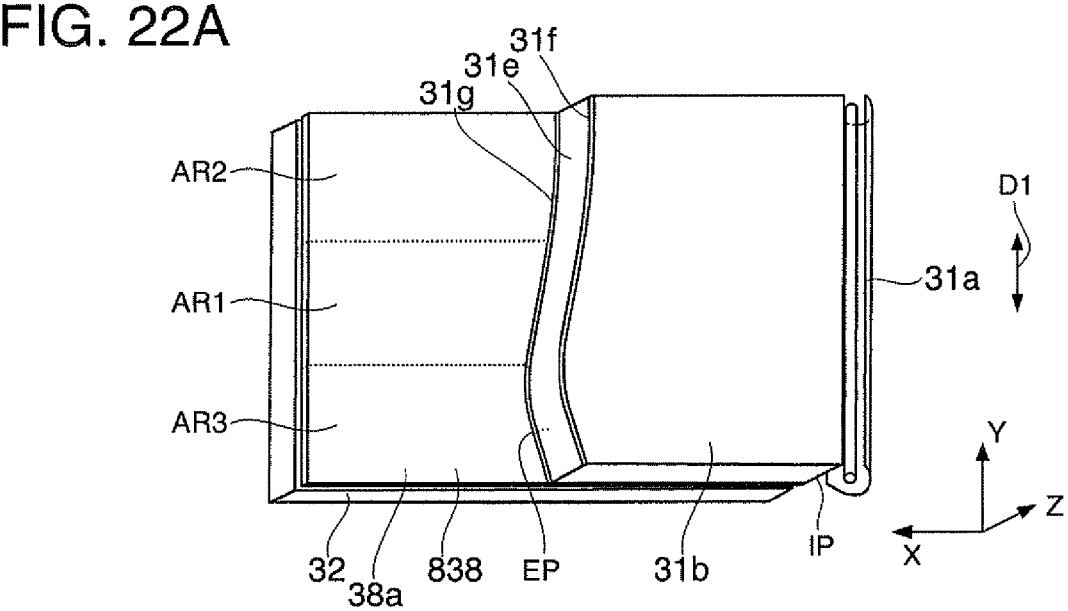
FIGS. 22A to 22D are diagrams for explaining a main part of a virtual image display apparatus according to an eighth embodiment.

In the image display device 11 shown in FIG. 22A, an optical-directivity changing section 838 is a prism array sheet divided into, for example, three in the longitudinal Y direction. The optical-directivity changing section 838 has slender belt-like first to third areas AR1, AR2, and AR3 in the lateral Z direction. An emission side of the optical-directivity changing section 838 is a deflecting surface 38a that is a saw-teeth like and a step like. The first area AR1 is a flat sheet and arranged in the center. The second area AR2 is a prism array sheet and arranged on the upper side (the +Y side). The third area AR3 is a prism array sheet and arranged on the lower side (the −Y side). The first area AR1 is a layer-like or a flat plate-like and causes illumination light to substantially directly pass. The second area AR2 has a prism array extending in the lateral direction (the X direction) and bends illumination light incident from the backlight guide section 31b to the outer side (the +Y side). The third area AR3 also has a prism array extending in the lateral direction (the Z direction) and bends illumination light incident from the backlight guide section 31b to the outer side (the −Y side).

Figure 22B:
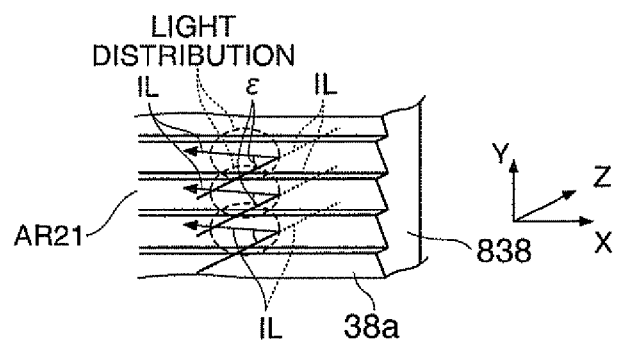
Figure 22C:
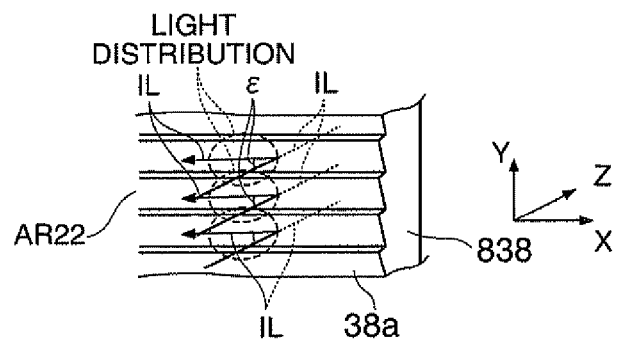
Figure 22D:
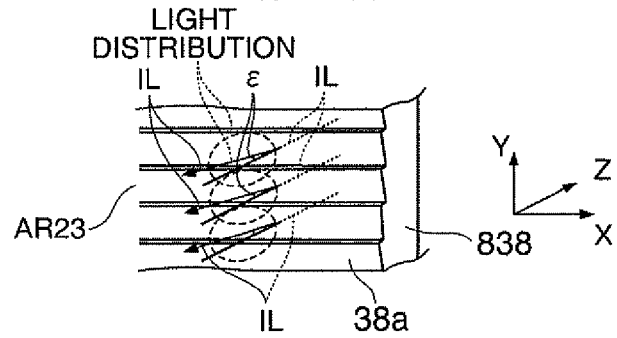

As shown in FIGS. 22B to 22D, the second area AR2 of the optical-directivity changing section 838 has a non-uniform prism array, the wedge angle ω of which gradually increases toward the upper side (the +Y side). The illumination lights IL uniformly emitted from the backlight guide section 31b are given the tilt angle ε by bending when the illumination lights IL pass through the deflecting surface 38a of the second area AR2 and are made incident on the liquid crystal display device (the image-light forming section) 32 shown in FIG. 20A. The tilt angle ε is equivalent to a main direction of a light distribution of the illumination lights IL and gradually increases from the lower side to the upper side as shown in the examples of respective areas AR21, AR22 and AR23 included in the second area AR2. Specifically, a light distribution or a light distribution characteristic after passage through the second area AR2 has directivity in which an angle in the main direction (the direction of the luminance center) increases in a position on the upper side (the +Y side) farther away from the optical axis AX (i.e., closer to the area section (the peripheral section) AR21 at the upper end). On the other hand, the first area AR1 does not have a prism array. The illumination lights IL emitted from the backlight guide section 31b is made incident on the liquid crystal display device (the image-light forming section) 32 while keeping a light distribution or a light distribution characteristic. Although not shown in the figures, the third area AR3 has a structure same as that of the second area AR2 but is vertically reversed. Specifically, the third area AR3 has a non-uniform prism array, the wedge angle ω of which gradually increases toward the lower side (the −Y side). The illumination lights IL uniformly emitted from the backlight guide section 31b are given the larger tilt angle ε on the lower side than on the upper side when the illumination lights IL pass through the third area AR3 and are made incident on the liquid crystal display device 32.

In the above explanation, bending, i.e., deflection of the illumination lights IL by the optical-directivity changing section 838 deflects the illumination lights IL further to the outer side from the center toward the peripheral section concerning the longitudinal direction, i.e., diffuses the illumination lights IL to the outer side as a whole. In other words, a distribution of the tilt angle ε concerning bending in the longitudinal direction of the illumination lights IL by the optical-directivity changing section 838 corresponds to the angle characteristic of light beam capturing shown in FIG. 6B. Consequently, the liquid crystal display device 32 is illuminated by the illumination lights IL having the tilt angle ε corresponding to the emission angle μ of the image lights FL emitted from the liquid crystal display device 32 and effectively utilized for virtual image formation. In other words, it is possible to substantially match the emission angle μ equivalent to the luminance center of the effective image lights FL from the liquid crystal display device 32 and the tilt angle ε equivalent to the luminance center of the illumination lights IL from the illuminating device 31. In this way, the image lights FL emitted from the respective positions of the liquid crystal display device 32 and effectively utilized are high-luminance components. Consequently, illumination light is not wastefully used and luminance spots of a virtual image can be reduced.

In the above explanation, in a section close to the first area AR1 in the second area AR2, the wedge angle ω is set close to zero. This makes it possible to prevent luminance spots from occurring in a joint of both the areas AR1 and AR2. If a prism array is provided in the first area AR1 as well, it is possible to surely prevent luminance spots from occurring around the center in the longitudinal direction and further improve light use efficiency.

In the above explanation, the wedge angle ω continuously changes in the second and third areas AR2 and AR3. However, the wedge angle ω can also be changed stepwise. Specifically, in both the areas AR2 and AR3, it is also possible to further form plural divided areas in the Y direction, fix the wedge angle ω in each of the divided areas, and set the wedge angle ω different between the divided areas adjacent to each other.

Figure 23A:
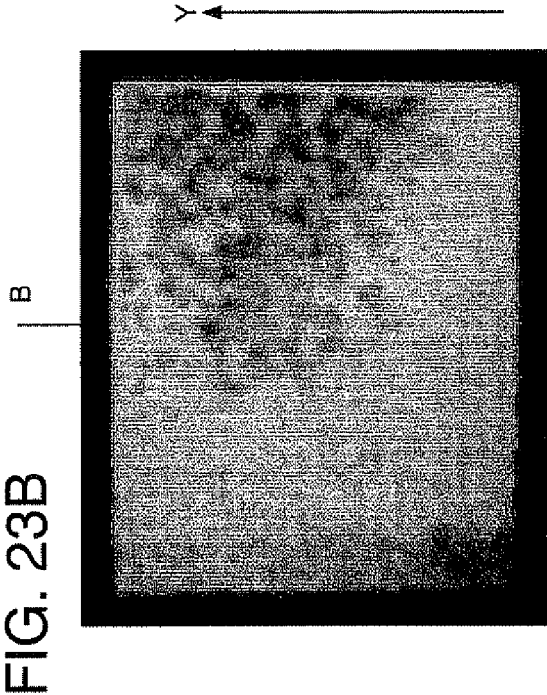
FIGS. 23A and 23C are diagrams for explaining a two-dimensional luminance distribution and a sectional luminance distribution of an image formed by the virtual image display apparatus according to the eighth embodiment.
Figure 23B:
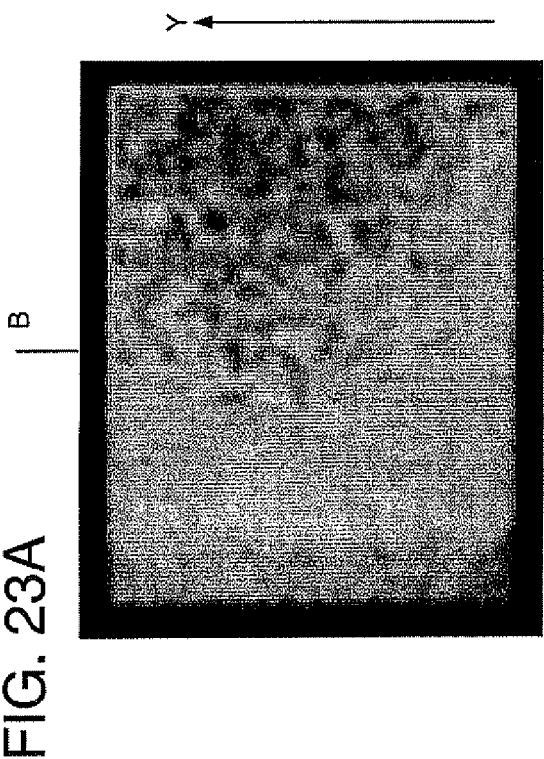
FIGS. 23B and 23D are diagrams for explaining a two-dimensional luminance distribution and a sectional luminance distribution of an image formed by a virtual image display apparatus according to a comparative example.

FIG. 23A is a diagram for explaining a two-dimensional luminance distribution of image lights of a virtual image type formed by the virtual image display apparatus 100 according to the eighth embodiment. FIG. 23B is a diagram for explaining a two-dimensional luminance distribution of image lights of a virtual image type formed by a virtual image display apparatus according to a comparative example. As it is evident when both the figures are compared, in the case of the virtual image display apparatus 100 according to this embodiment, occurrence of luminance unevenness is substantially reduced. The virtual image display apparatus according to the comparative example has a structure same as the structure of the virtual image display apparatus 100 according to this embodiment. However, the virtual image display apparatus according to the comparative example is different from the virtual image display apparatus 100 in that the optical-directivity changing section 838 is not provided on the light emission side of the illuminating device 31.

Figure 23C:
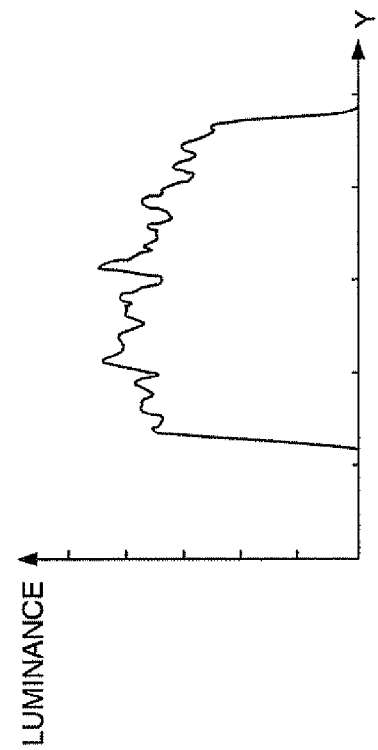
Figure 23D:
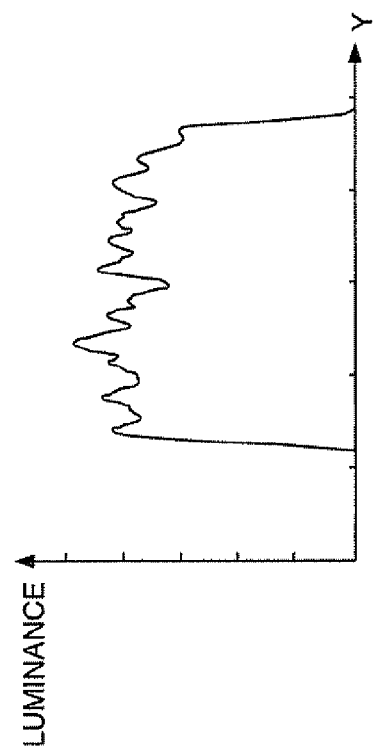

FIG. 23C is a graph showing a luminance distribution in the Y direction along a B-B cross-section of image lights formed by the virtual image display apparatus 100 according to this embodiment. FIG. 23D is a graph showing a luminance distribution in the Y direction along a B-B cross-section of image lights formed by the virtual image display apparatus according to the comparative example. As it is evident when both the graphs are compared, in the case of the virtual image display apparatus 100 according to this embodiment, a luminance distribution in the longitudinal Y direction is uniform at relatively high luminance.

As explained above, with the virtual image display apparatus 100 according to the eighth embodiment, the optical-directivity changing section 838 forms a non-uniform distribution concerning the directivity of image lights emitted from the angle converting section 723, specifically, a distribution in which the tilt angle ε gradually increases in the periphery in the longitudinal direction. Therefore, when the emission angle μ of a light beam emitted from the liquid crystal display device and effectively captured into the eye EY of the observer gradually increases according to a position in the Y direction of the liquid crystal display device 32, it is possible to match the directivity of image lights to such an angle characteristic of light beam capturing into the eye EY. It is possible to suppress occurrence of luminance spots to improve efficiency of use of illumination light.

In this embodiment, instead of incorporating the optical-directivity changing section 38 in the illuminating device 31, as in the second or third embodiment, the optical-directivity changing section 138 or 238 can be incorporated in the liquid crystal display device (the image-light forming section) 132 or 232.

Ninth Embodiment

A virtual image display apparatus according to a ninth embodiment is explained below. The virtual image display apparatus according to this embodiment is a modification of the virtual image display apparatus 100 according to the seventh embodiment. Unless specifically explained, the virtual image display apparatus is the same as the virtual image display apparatus 100 according to the seventh embodiment.

Figure 24A:
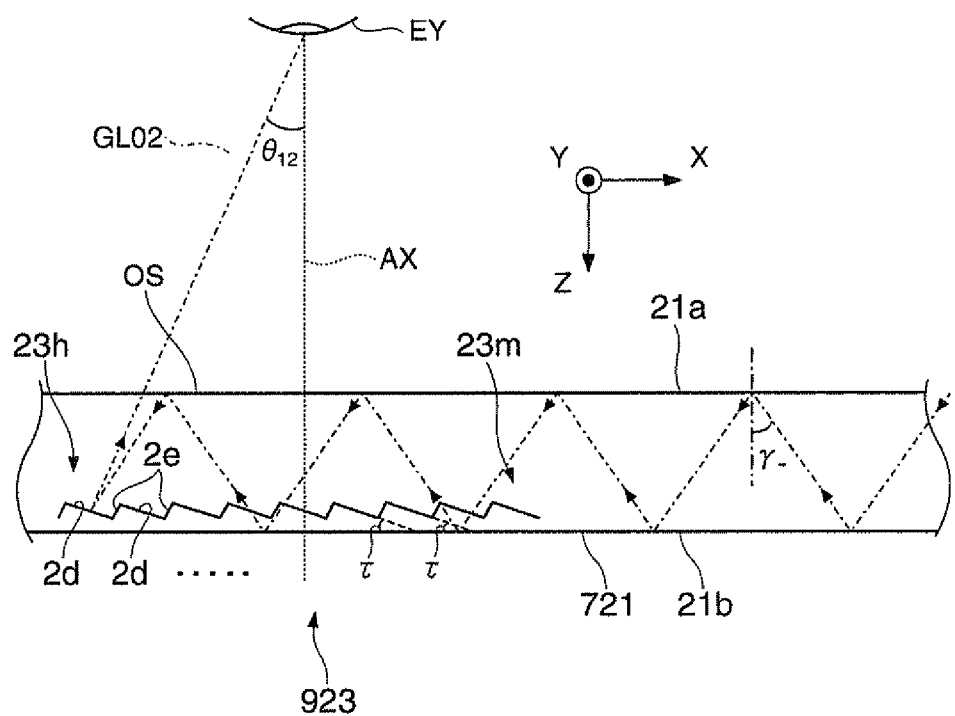
FIGS. 24A and 24B are diagrams for explaining a part of a virtual image display apparatus according to a ninth embodiment.
Figure 24B:
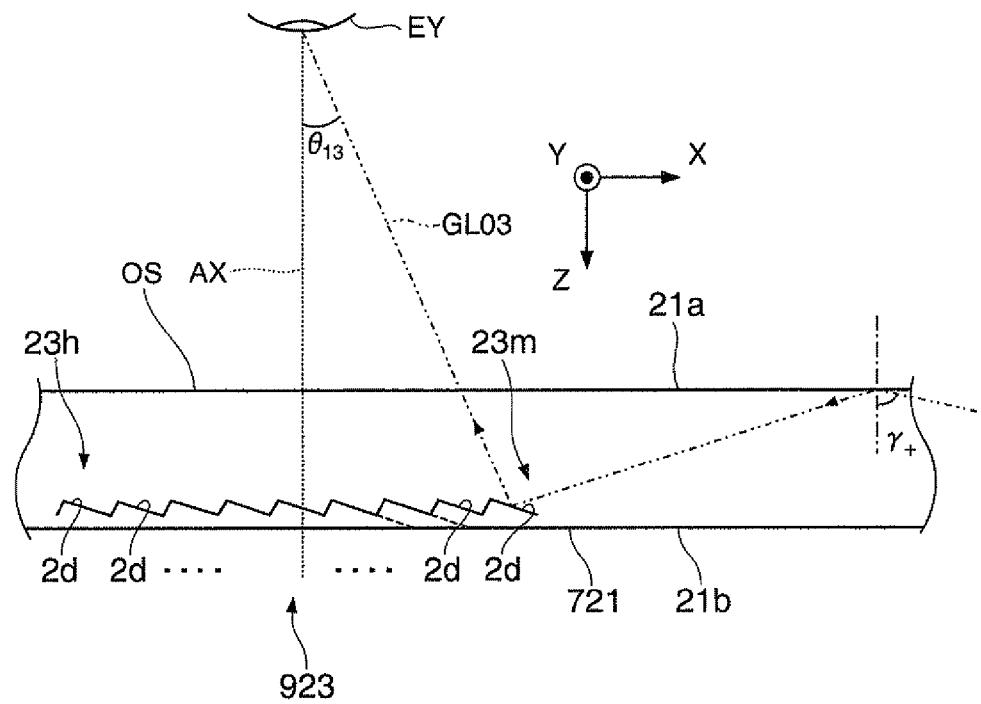

As shown in FIGS. 24A and 24B, in the case of this embodiment, an angle converting section 923 of the light guide member 721 has a structure in which a large number of image light reflection surfaces 2d are arrayed in the X direction at a predetermined pitch. The image light reflection surfaces 2d extends in a belt shape in a longitudinal direction set in the Y direction, i.e., a main light guide direction, which is a direction extending perpendicularly to the −X direction in which the image light reflection surfaces 2d are arrayed. The image light reflection surfaces 2d are parallel to one another and are formed at the same angle τ with respect to the second reflection surface 21b. The image light reflection surface 2d is a partial reflection surface that transmits a part of light components of image light and reflects the remainder according to adjustment of reflectance. The image light reflection surfaces 2d adjacent to each other are connected by a boundary section 2e not having a function of a reflection surface or the like for extracting image light. As a result, the image light reflection surfaces 2d are periodically repeatedly arrayed and extend in parallel to one another along the main light guide direction, i.e., the Z direction in a separated state. The image light reflection surfaces 2d are formed by, for example, applying film formation such as aluminum vapor deposition to one slope of a V groove of a base. Thereafter, the image light reflection surfaces 2d are embedded in the light guide member 721 by filling resin.

As shown in FIG. 24A, after passing through the angle converting section 923 plural times, the image light GL02 totally reflected on the first and second reflection surfaces 21a and 21b of the light guide member 721 at the minimum reflection angle $γ_-$ reaches the peripheral section 23h at the end of the depth side (the −X side) in the angle converting section 923 and is emitted as parallel light beams from the light emission surface OS to the eye EY at an angle $θ_{12}$ with respect to the optical axis AX of the eye EY according to reflection in the peripheral section 23h. On the other hand, as shown in FIG. 24B, the image light GL03 totally reflected on the first and second reflection surfaces 21a and 21b of the light guide member 721 at the maximum reflection angle $γ_+$ reaches the peripheral section 23m at the end of the entrance side (the +X side) in the angle converting section 923 and is emitted as parallel light beams from the light emission surface OS to the eye EY at an angle $θ_{13}$ with respect to the optical axis AX of the eye EY according to reflection in the peripheral section 23m.

In this embodiment, instead of incorporating the optical-directivity changing section 38 or 838 in the illuminating device 31, as in the second or third embodiment, the optical-directivity changing section 138 or 238 can be incorporated in the liquid crystal display device (the image-light forming section) 132 or 232.

Tenth Embodiment

A virtual image display apparatus according to a tenth embodiment is explained below. The virtual image display apparatus according to this embodiment is a modification of the virtual image display apparatus 100 according to the seventh embodiment. Unless specifically explained, the virtual image display apparatus is the same as the virtual image display apparatus 100 according to the seventh embodiment.

Figure 25:
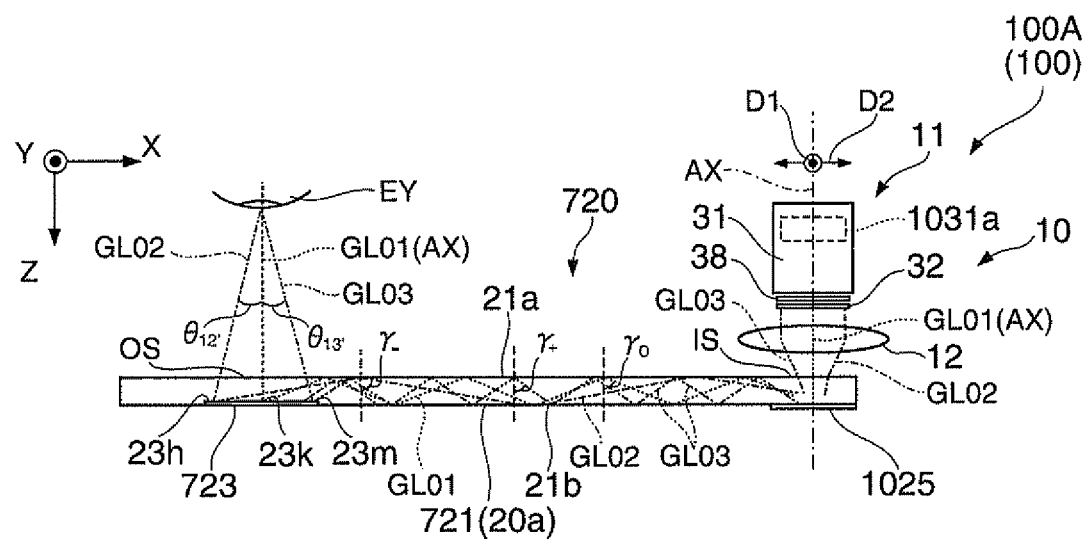
FIG. 25 is a diagram for explaining a virtual image display apparatus according to a tenth embodiment.

As shown in FIG. 25, the virtual image display apparatus 100 includes a hologram element 1025 instead of the prism section PS and the mirror layer 25 (see FIG. 2A). In this case, the image display device 11 includes, as the illuminating device 31, for example, an illuminating device incorporating a light source 1031a including an LED that generates light beams of three colors. The hologram element 1025 is bonded to an extended surface of the second reflection surface 21b at an incident side end of the light guide member 721. The hologram element 1025 includes a hologram layer of a three-layer structure corresponding to the three colors generated by the light source 1031a. Consequently, the hologram element 1025 functions as an imaginary mirror formed near the second reflection surface 21b at the entrance side end and has a function of reflecting respective color lights from the image display device 11 in a desired direction. In other words, the hologram element 1025 enables adjustment of a reflecting direction of image light. It is possible to efficiently capture the image light into the light guide member 721 using the hologram element 1025.

A hologram element can also be used instead of the angle converting section 723 (see FIG. 21A). On the third reflection surface 21c and the fourth reflection surface 21d of the light guide member 721 of the light guide device 720, a hologram element can also be used instead of a mirror or a half mirror.

Others

The invention is explained above according to the embodiments. However, the invention is not limited to the embodiments and can be carried out in various forms without departing from the spirit of the invention. For example, modifications explained below are possible.

In the first to third embodiments and the like, the emission angles of the image lights FL or the image lights GL tilt larger outwards as the image lights FL or the image lights GL is further away from the center of the liquid crystal display device 32 in the up down direction and an emission position tilts larger inwards as the image lights FL or the image lights GL travel from the left and right to the center and the emission position becomes smaller. However, the method of the invention can also be used when the projection optical system 12 and the light guide device 20 having an angle characteristic of light beam capturing different from such a tendency are used. For example, when the light guide device 20 guides image lights in the longitudinal direction rather than the lateral direction, an emission angle of the image lights FL has a tilt characteristic in which the length and the width are interchanged. Therefore, in this case, the length and the width are also interchanged in a light distribution characteristic given by the optical-directivity changing sections 38, 138, 238, and the like. The same holds true for the seventh embodiment. When the light guide device 720 guides image lights in the longitudinal direction rather than the lateral direction, the length and the width are also interchanged in a light distribution characteristic given by the optical-directivity changing section 38.

In the embodiment, the optical-directivity changing sections 38, 138, and 238 are the tabular members. However, the optical-directivity changing sections 38, 138, and 238 can be replaced with thick lenses, prisms, or diffractive optical elements. When the optical-directivity changing section is formed of the diffractive optical element, a degree of freedom of adjustment of directivity is improved.

In the eighth embodiment, the optical-directivity changing section 838 includes the first to third areas A1, A2, and A3 divided into three in the longitudinal Y direction. However, the optical-directivity changing section 838 can be divided into four or more in the longitudinal direction. The optical-directivity changing section 838 can be divided into plural areas in the lateral X direction as well to set different prism shapes in the respective areas.

In the embodiments, the prism array 72a, the micro lens array 273a, and the like are used. However, a diffractive optical element and the like can be used instead of the prism array 72a, the micro lens array 273a, and the like.

In the second and third embodiments, although not specifically explained, a phase-difference compensation plate can be inserted between the liquid crystal panel 51 and at least one of the pair of polarization filters 52a and 52b to realize improvement of contrast.

In the above explanation, the transmissive liquid crystal display device 32 and the like are used as the image-light forming section. However, the image-light forming section is not limited to the transmissive liquid crystal display device and various liquid crystal display devices can be used. For example, a reflective liquid crystal display device can also be used. A digital micro mirror device and the like can also be used instead of the liquid crystal display device 32.

In the above explanation, in the first and second reflection surfaces 21a and 21b, a mirror, a half mirror, or the like is not applied on the surfaces and image lights are totally reflected and guided by an interface with the air. However, the total reflection in the invention includes reflection performed by forming a mirror coat or a half mirror film over the entire first and second reflection surfaces 21a and 21b or a part of the first and second reflection surfaces 21a and 21b. For example, on the premise that an incident angle of image lights satisfies a total reflection condition, a mirror coat or the like is applied to the entire first and second reflection surfaces 21a and 21b or a part of the first and second reflection surfaces 21a and 21b and substantially all the image lights are reflected. The total reflection includes the reflection in this case. If image lights having sufficient brightness can be obtained, the entire first and second reflection surfaces 21a and 21b or a part of the first and second reflection surfaces 21a and 21b may be coated by a mirror having some transparency.

In the above explanation, the light incident surface IS and the light emission surface OS are arranged on the same plane. However, the arrangement of the light incident surface IS and the light emission surface OS is not limited to this. For example, the light incident surface IS can be arranged on a plane same as the first reflection surface 21a and the light emission surface OS can be arranged on a plane same as the second reflection surface 21b.

In the above explanation, the light guide member 21 extends in the lateral direction in which the eye EY is present. However, the light guide member 21 can extend in the longitudinal direction. In this case, the optical panel 110 is arranged in parallel rather than in series.

In the above explanation, the virtual image display apparatus 100 is specifically explained as the head-mounted display. However, the virtual image display apparatus 100 can be modified into a head-up display.

In the virtual image display apparatus 100 according to the embodiments, the one set of display devices 100A and 100B (specifically, the image forming devices 10, the light guide devices 20, etc.) are provided to correspond to both the right and left eyes. However, for example, the image forming device 10 and the light guide device 20 may be provided only for one of the right and left eyes to view an image with one eye.

In the embodiments, the first optical axis AX1 passing through the light incident surface IS and the second optical axis AX2 passing through the light incident surface IS are parallel. However, the optical axes AX1 and AX2 can be nonparallel.

In the embodiments, the display luminance of the liquid crystal display device 32 is not specifically adjusted. However, the display luminance can be adjusted according to a range and an overlap of the projected images IM1 and IM2 shown in FIG. 5B.

In the embodiments, the reflectance of the half mirror layer 28 provided on the fourth reflection surface 21d of the light guide member 21 is set to 20% to give priority to see-through. However, the reflectance of the half mirror layer 28 can be set to 50% or more to give priority to image lights. The half mirror layer 28 does not need to be formed only in a necessary area in a part of the fourth reflection surface 21d and can be formed over the entire surface of the fourth reflection surface 21d. The half mirror layer 28 can be formed on the third surface 23c of the light transmission member 23 as well.

The pitches PT of the array of the reflection units 2c included in the angle converting section 723 are not always the same among the first reflection surfaces 2a and may be different to some extent.

In the above explanation, the see-through type virtual image display apparatus is explained. However, the angle converting section 723 and the like can be applied to virtual image display apparatuses of types other than the see-through type. When it is unnecessary to observe an external image, the optical reflectance of the first and second reflection surfaces 2a and 2b can be set to about 100%.

In the above explanation, tilt angles of the mirror layer 25 and the slope RS included in the prism section PS are not specifically referred to. However, in the invention, the tilt angles of the mirror layer 25 and the like can be set to various values with respect to the optical axis AX according to an application and other specifications.

In the above explanation, the V groove formed by the reflection units 2c is shown as having a pointed end. However, the shape of the V groove is not limited to this and may be a flat cut end or a rounded end.

Figure 26:
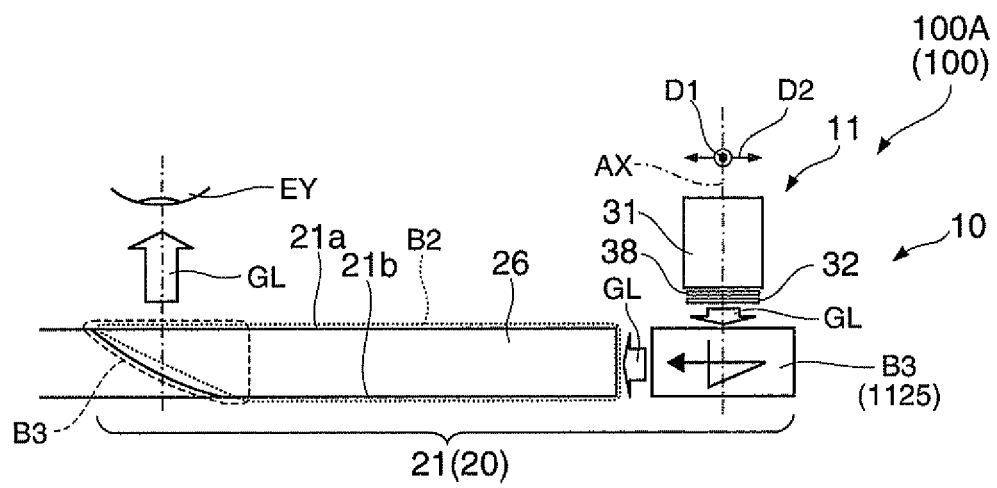
FIG. 26 is a diagram for conceptually explaining a modification of the virtual image display apparatus.

In the above explanation, the light guide device 20 or 720 including the light incident section B1, the light guide section B2, and the light emission section B3 is used. However, in the light incident section B1 and the light emission section B3, a plane mirror does not need to be used. A lens-like function can be imparted to the light incident section B1 and the light emission section B3 by a spherical or aspherical curved surface mirror. Further, as shown in FIG. 26, a prism or block-like relay member 1125 separated from the light guide section B2 can be used as the light incident section B1. A lens-like function can be imparted to an incident and emission surface and a reflection inner surface of the relay member 1125. In the light guide member 21 included in the light guide section B2, the first and second reflection surfaces 21a and 21b that propagate the image lights GL through reflection are provided. However, the reflection surfaces 21a and 21b do not need to be parallel to each other and can be curved surfaces.

The entire disclosure of Japanese Patent Application Nos. 2010-228183, filed Oct. 8, 2010 and 2011-174638, filed Aug. 10, 2011 are expressly incorporated by reference herein.

What is claimed is:

1. A virtual image display apparatus comprising:
an image display device that forms image light, the image light comprising a plurality of light rays;
an optical-directivity changing section that changes directivity of the image light emitted from the image display device such that different light rays are directed at different angles to form a non-uniform distribution, the optical-directivity changing section bending the plurality of light rays in different angles along a first direction according to an emission position of each of the plurality of light rays from an emission surface of the image display device;
a projection optical system that modulates the image light emitted from the optical-directivity changing section to form a virtual image; and
a light guide device including a light incident section that captures the image light passed through the projection optical system into an inside of the light incident section, a light guide section that guides the image light captured from the light incident section using total reflection on first and second reflection surfaces extending while being opposed to each other, and a light emitting section that extracts the image light passed through the light guide section to an outside,
wherein
the first reflection surface and the second reflection surface of the light guide section are arranged in parallel to each other and enable light guide by total reflection,
the light incident section has a third reflection surface formed at a first predetermined angle with respect to the first reflection surface,
the light emitting section has a fourth reflection surface formed at a second predetermined angle with respect to the first reflection surface, and
the first, second, third and fourth reflection surfaces are different faces of the light guide device,
the first predetermined angle and the second predetermined angle are equal to each other.

2. The virtual image display apparatus according to claim 1, wherein the optical-directivity changing section bends, concerning a second direction perpendicular to the first direction, light at a different angle according to the position of the image display device.

3. The virtual image display apparatus according to claim 2, wherein, in the optical-directivity changing section, a light distribution characteristic, which is an angle distribution of directivity, is different concerning the first direction and the second direction.

4. The virtual image display apparatus according to claim 1, wherein the image display device includes an illuminating device and an image-light forming section that controls light from the illuminating device and forms image light.

5. The virtual image display apparatus according to claim 4, wherein
the illuminating device includes a light emitting section and a backlight guide section that spreads a light beam from the light emitting section in a surface light source shape, and
the optical-directivity changing section is arranged between the backlight guide section and the image-light forming section.

6. The virtual image display apparatus according to claim 4, wherein
the illuminating device includes a surface-light-source-like light emitting section, and
the optical-directivity changing section is arranged between the surface-light-source-like light emitting section and the image-light forming section.

7. The virtual image display apparatus according to claim 5, wherein the optical-directivity changing section is at least one of a prism array sheet, a Fresnel lens, a diffractive optical element, and a micro lens array.

8. The virtual image display apparatus according to claim 5, wherein the optical-directivity changing section is bonded to the backlight guide section or the surface-light-source-like light emitting section and integrated with the backlight guide section or the surface-light-source-like light emitting section.

9. The virtual image display apparatus according to claim 5, wherein the optical-directivity changing section includes plural area sections for causing illumination light from the backlight guide section or the surface-light-source-like light emitting section to pass such that main directivity directions having highest luminance are different from each other.

10. The virtual image display apparatus according to claim 9, wherein the optical-directivity changing section includes a prism array having different shapes to correspond to the plural area sections.

11. The virtual image display apparatus according to claim 1, wherein
the first direction corresponds to a returning direction perpendicular to the first and second reflection surfaces of the light guide device and the second direction corresponds to a non-returning direction parallel to the first and second reflection surfaces of the light guide device and perpendicular to the first direction, and
in at least one of the first direction and the second direction, plural peak directions in which luminance is a maximum are set.

12. The virtual image display apparatus according to claim 11, wherein
plural peak directions in which luminance is a maximum are set in the second direction.

13. The virtual image display apparatus according to claim 4, wherein the optical-directivity changing section is incorporated in or externally attached to the image-light forming section.

14. The virtual image display apparatus according to claim 13, wherein
the image-light forming section is an EL display element, and
the optical-directivity changing section is arranged on a light emission side of a pixel portion of the EL display element.

15. The virtual image display apparatus according to claim 13, wherein
the image-light forming section is a liquid crystal display element of a light-transmissive type, and
the optical-directivity changing section is arranged on at least one of a light incident side and a light emission side of a pixel portion of the liquid crystal display element.

16. The virtual image display apparatus according to claim 1, wherein the light emitting section includes an angle converting section that has plural reflection surfaces and converts an angle of the image light through reflection on the plural reflection surfaces to enable the image light to be extracted to the outside.

17. The virtual image display apparatus according to claim 16, wherein
the angle converting section includes plural reflection units that respectively have first reflection surfaces and second reflection surfaces formed at a predetermined angle with respect to the first reflection surfaces and are arrayed in a predetermined array direction, and
the reflection units reflect, with the first reflection surfaces, the image light made incident through the light guide section and further reflect, with the second reflection surfaces, the image light reflected by the first reflection surfaces to thereby bend an optical path of the image light and enable the image light to be extracted to the outside.

18. The virtual image display apparatus according to claim 1, wherein emission angles of image light emitted from the optical-directivity changing section change differently in a first direction of a light-emitting surface of the optical-directivity changing section than in a second direction of the light-emitting surface of the optical-directivity changing section.

19. The virtual image display apparatus according to claim 1, wherein the projection optical system has a different emission aperture size in a first direction of an emission surface than in a second direction of the emission surface.

20. A virtual image display apparatus according to claim 1, wherein
the projection optical system has an image light incident surface facing the optical-directivity changing section, and has an image light emission surface facing a light guide device, the projection optical system modulating the image light to form a virtual image with the image light emitted from the optical-directivity changing section, collimating the image light from the optical-directivity changing section, and emitting collimated image light from the light emission surface to the light guide device.

21. The virtual image display apparatus according to claim 5, wherein the optical-directivity changing section is a sheet of a prism array that imparts directivity corresponding to an angle characteristic of light beam capturing to an image light emitted from the image-light forming section.

* * * * *